(12) United States Patent
Ichikawa et al.

(10) Patent No.: US 12,066,603 B2
(45) Date of Patent: Aug. 20, 2024

(54) WIDE-ANGLE OPTICAL SYSTEM INCLUDING THREE LENS UNITS OF −++ REFRACTIVE POWERS, AND IMAGE PICKUP APPARATUS USING THE SAME

(71) Applicant: OLYMPUS CORPORATION, Hachioji (JP)

(72) Inventors: Keisuke Ichikawa, Tama (JP); Takashi Fujikura, Hamura (JP); Shinichi Mihara, Tama (JP)

(73) Assignee: OLYMPUS CORPORATION, Tokyo (JP)

( * ) Notice: Subject to any disclaimer, the term of this patent is extended or adjusted under 35 U.S.C. 154(b) by 816 days.

(21) Appl. No.: 17/184,784

(22) Filed: Feb. 25, 2021

(65) Prior Publication Data

US 2021/0239950 A1 Aug. 5, 2021

Related U.S. Application Data

(63) Continuation of application No. PCT/JP2019/008032, filed on Mar. 1, 2019.

(51) Int. Cl.
*G02B 15/14* (2006.01)
*G02B 9/64* (2006.01)
(Continued)

(52) U.S. Cl.
CPC ............... *G02B 13/06* (2013.01); *G02B 9/64* (2013.01); *G02B 13/0045* (2013.01); *G02B 15/143507* (2019.08)

(58) Field of Classification Search
CPC ...... G02B 13/06; G02B 9/64; G02B 13/0045; G02B 15/143507
See application file for complete search history.

(56) References Cited

U.S. PATENT DOCUMENTS 5,949,589 A    9/1999  Nakazawa
6,246,529 B1 * 6/2001  Sensui ............... G02B 15/177
                                                    359/689
(Continued)

FOREIGN PATENT DOCUMENTS

JP    H10260346 A    9/1998
JP    2000131606 A   5/2000
(Continued)

OTHER PUBLICATIONS

International Search Report (ISR) (and English translation thereof) dated Apr. 23, 2019 issued in International Application No. PCT/JP2019/008032.
(Continued)

*Primary Examiner* — Wen Huang
(74) *Attorney, Agent, or Firm* — Holtz, Holtz & Volek PC

(57) ABSTRACT

A wide-angle optical system includes in order from an object side, a first lens unit having a negative refractive power, a second lens unit having a positive refractive power, and a third unit having a positive refractive power. At the time of carrying out a focal-position adjustment from a far point to a near point, the second lens unit is moved from a first position toward a second position. The third lens unit includes not less than three lens components, and not less than three lens components include a first lens component and a second lens component. The first lens component is a single lens and the second lens component is a cemented lens. Following conditional expression (1) is satisfied:

$$-0.60 < (n2C' - n2C)/r2C < -0.05 \qquad (1).$$

36 Claims, 33 Drawing Sheets

(51) Int. Cl.
   *G02B 13/00* (2006.01)
   *G02B 13/06* (2006.01)

(56) References Cited

U.S. PATENT DOCUMENTS

| | | | |
|---|---|---|---|
| 6,317,270 | B2 | 11/2001 | Nagaoka |
| 7,016,120 | B2 | 3/2006 | Achtner et al. |
| 8,203,793 | B2 | 6/2012 | Wada et al. |
| 8,345,357 | B2 | 1/2013 | Imaoka |
| 8,665,537 | B2 | 3/2014 | Roth et al. |
| 8,717,684 | B2 | 5/2014 | Sano et al. |
| 8,824,059 | B2 | 9/2014 | Kato et al. |
| 8,867,147 | B2 | 10/2014 | Kimura |
| 8,908,273 | B2 | 12/2014 | Fujimoto |
| 8,934,176 | B2 | 1/2015 | Yamagami et al. |
| 9,097,881 | B2 | 8/2015 | Yamagami |
| 9,110,278 | B2 | 8/2015 | Sugita |
| 9,459,443 | B2 | 10/2016 | Uzawa et al. |
| 9,766,437 | B2 | 9/2017 | Sato |
| 9,952,416 | B2 | 4/2018 | Ichikawa |
| 9,958,653 | B2 | 5/2018 | Ichikawa |
| 9,958,656 | B2 | 5/2018 | Kawamura et al. |
| 10,095,012 | B2 | 10/2018 | Yamagami |
| 10,114,200 | B2 | 10/2018 | Ichikawa |
| 10,191,253 | B2 | 1/2019 | Ichikawa et al. |
| 10,191,258 | B2 | 1/2019 | Ichikawa et al. |
| 10,197,768 | B2 | 2/2019 | Ichikawa et al. |
| 10,197,769 | B2 | 2/2019 | Ichikawa et al. |
| 10,274,705 | B2 | 4/2019 | Ichikawa et al. |
| 10,288,856 | B2 | 5/2019 | Fujikura et al. |
| 10,656,399 | B2 | 5/2020 | Fujikura et al. |
| 10,663,705 | B2 | 5/2020 | Ichikawa et al. |
| 10,768,396 | B2 | 9/2020 | Kawamura et al. |
| 10,830,991 | B2 | 11/2020 | Ichikawa et al. |
| 2003/0189767 | A1 | 10/2003 | Achtner et al. |
| 2010/0290133 | A1 | 11/2010 | Sano et al. |
| 2011/0002046 | A1 | 1/2011 | Wada et al. |
| 2011/0032606 | A1 | 2/2011 | Imaoka |
| 2011/0116172 | A1 | 5/2011 | Yamagami et al. |
| 2011/0317282 | A1 | 12/2011 | Kimura |
| 2012/0019926 | A1 | 1/2012 | Yamagami |
| 2012/0069441 | A1 | 3/2012 | Fujimoto et al. |
| 2012/0307374 | A1 | 12/2012 | Kato et al. |
| 2013/0265653 | A1 | 10/2013 | Kimura |
| 2014/0002910 | A1 | 1/2014 | Roth et al. |
| 2014/0125858 | A1 | 5/2014 | Sugita |
| 2015/0042773 | A1 | 2/2015 | Uzawa et al. |
| 2015/0268460 | A1 | 9/2015 | Takada |
| 2015/0293353 | A1 | 10/2015 | Chin et al. |
| 2017/0038563 | A1 | 2/2017 | Sato |
| 2017/0068079 | A1 | 3/2017 | Kawamura et al. |
| 2017/0168281 | A1 | 6/2017 | Furuya et al. |
| 2018/0052311 | A1 | 2/2018 | Machida |
| 2018/0210179 | A1 | 7/2018 | Kawamura et al. |
| 2019/0079269 | A1 | 3/2019 | Kimura |
| 2019/0086658 | A1 | 3/2019 | Takato |
| 2019/0302432 | A1 | 10/2019 | Iwasawa et al. |
| 2020/0018947 | A1 | 1/2020 | Tsuyuki |

FOREIGN PATENT DOCUMENTS

| | | |
|---|---|---|
| JP | 2003307672 A | 10/2003 |
| JP | 2004233797 A | 8/2004 |
| JP | 2010266577 A | 11/2010 |
| JP | 2011013469 A | 1/2011 |
| JP | 2011053663 A | 3/2011 |
| JP | 2011107267 A | 6/2011 |
| JP | 2012027309 A | 2/2012 |
| JP | 2012027451 A | 2/2012 |
| JP | 2012068303 A | 4/2012 |
| JP | 2012247689 A | 12/2012 |
| JP | 2013015621 A | 1/2013 |
| JP | 2014056133 A | 3/2014 |
| JP | 2014092728 A | 5/2014 |
| JP | 2015114509 A | 6/2015 |
| JP | 2016139087 A | 8/2016 |
| JP | 2016184136 A | 10/2016 |
| JP | 2017068114 A | 4/2017 |
| JP | 2017122743 A | 7/2017 |
| JP | 2018004726 A | 1/2018 |
| JP | 2018040948 A | 3/2018 |
| JP | 2018045097 A | 3/2018 |
| JP | 2018189733 A | 11/2018 |
| JP | 2019015958 A | 1/2019 |
| JP | 2019184733 A | 10/2019 |
| WO | 2014129089 A1 | 8/2014 |
| WO | 2016067838 A1 | 5/2016 |
| WO | 2017199614 A1 | 11/2017 |
| WO | 2018173412 A1 | 9/2018 |
| WO | 2020178883 A1 | 9/2020 |
| WO | 2020178884 A1 | 9/2020 |
| WO | 2020178885 A1 | 9/2020 |
| WO | 2020178886 A1 | 9/2020 |

OTHER PUBLICATIONS

Written Opinion dated Apr. 23, 2019 issued in International Application No. PCT/JP2019/008032.
International Preliminary Report on Patentability (IPRP) (and English language translation thereof) dated Sep. 16, 2021, issued in counterpart International Application No. PCT/JP2019/008032.
International Preliminary Report on Patentability (IPRP) (and English language translation thereof) dated Sep. 16, 2021 issued in counterpart International Application No. PCT/JP2019/008033 (which is an International counterpart of related U.S. Appl. No. 17/189,353).
International Preliminary Report on Patentability (IPRP) (and English language translation thereof) dated Sep. 16, 2021, issued in International Application No. PCT/JP2019/008034 (which is an International counterpart of related U.S. Appl. No. 17/189,679).
Chinese Office Action (and English language translation thereof) dated Feb. 14, 2022, issued in Chinese U.S. Appl. No. 17/190,453.3 (which is a counterpart of related U.S. Appl. No. 17/190,453).
International Preliminary Report on Patentability (IPRP) (and English language translation thereof) dated Sep. 16, 2021 issued in International Application No. PCT/JP2019/008028 (which is an International counterpart of related U.S. Appl. No. 17/190,453).
Japanese Office Action (and English language translation thereof) dated Apr. 20, 2022, issued in Japanese Application No. 2021-503242 (which is a counterpart of related U.S. Appl. No. 17/189,353).
International Search Report (ISR) (and English language translation thereof) dated Jun. 4, 2019, issued in International Application No. PCT/JP2019/008028.
International Search Report (ISR) (and English translation thereof) dated Jun. 4, 2019, issued in International Application No. PCT/JP2019/008034.
International Search Report (ISR) (and English translation thereof) dated May 14, 2019 issued in International Application No. PCT/JP2019/008033.
U.S. Appl. No. 17/189,353, First Named Inventor: Keisuke Ichikawa; Title: "Wide-Angle Optical System and Image Pickup Apparatus Using the Same"; Filed: Mar. 2, 2021.
U.S. Appl. No. 17/189,679, First Named Inventor: Takashi Fujikura; Title: "Wide-Angle Optical System and Image Pickup Apparatus Using the Same"; Filed: Mar. 2, 2021.
U.S. Appl. No. 17/190,453, First Named Inventor: Takashi Fujikura; Title: "Wide-Angle Optical System and Imaging Device Comprising Same"; Filed: Mar. 3, 2021.
Written Opinion dated Jun. 4, 2019, issued in International Application No. PCT/JP2019/008028.
Written Opinion dated Jun. 4, 2019, issued in International Application No. PCT/JP2019/008034.
Written Opinion dated May 14, 2019, issued in International Application No. PCT/JP2019/008033.
Chinese Office Action (and English language translation thereof) dated Feb. 14, 2022, issued in Chinese Application No. 17189353.6 (which is a Chinese counterpart of related U.S. Appl. No. 17/189,353).
Japanese Office Action (and English language translation thereof) dated Mar. 30, 2022, issued in Japanese Application No. 2021-503240 (which is a Japanese counterpart of related U.S. Appl. No. 17/190,453).

(56) References Cited

OTHER PUBLICATIONS

1 Non-Final Office Action dated Feb. 6, 2024, issued in related U.S. Appl. No. 17/189,679.
Office Action (Non-Final Rejection) dated May 25, 2023, issued in related U.S. Appl. No. 17/190,453.
Office Action (Non-Final Rejection) dated Apr. 11, 2024, issued in related U.S. Appl. No. 17/189,353.

* cited by examiner

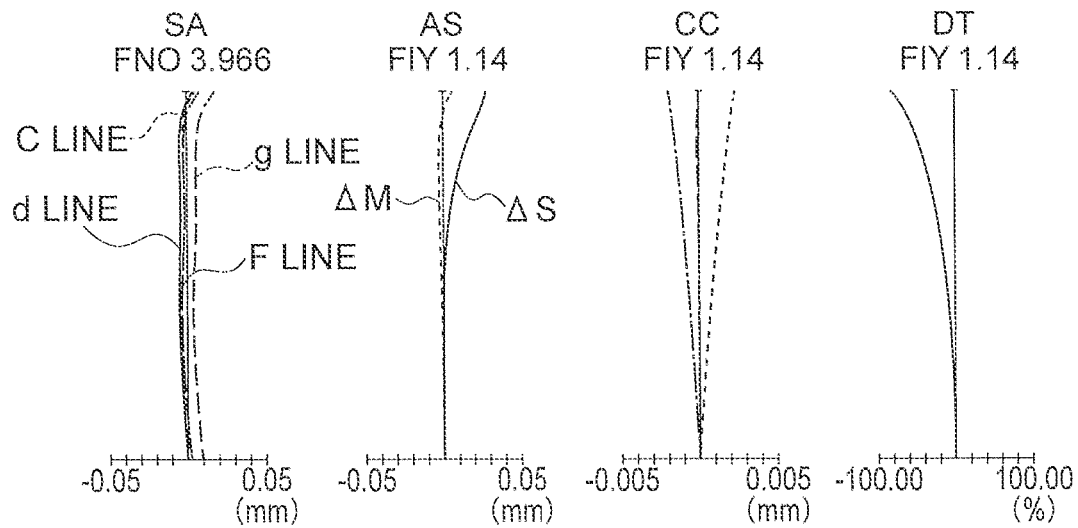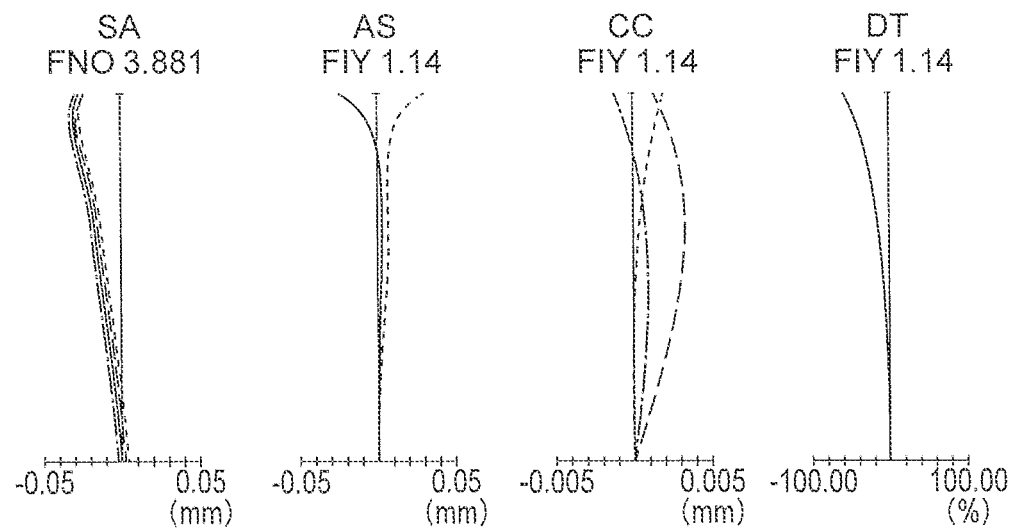

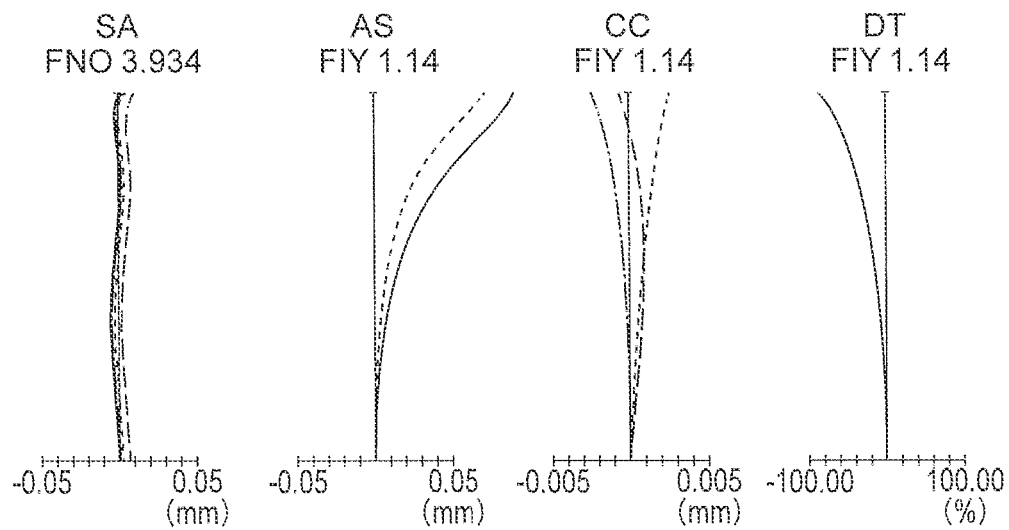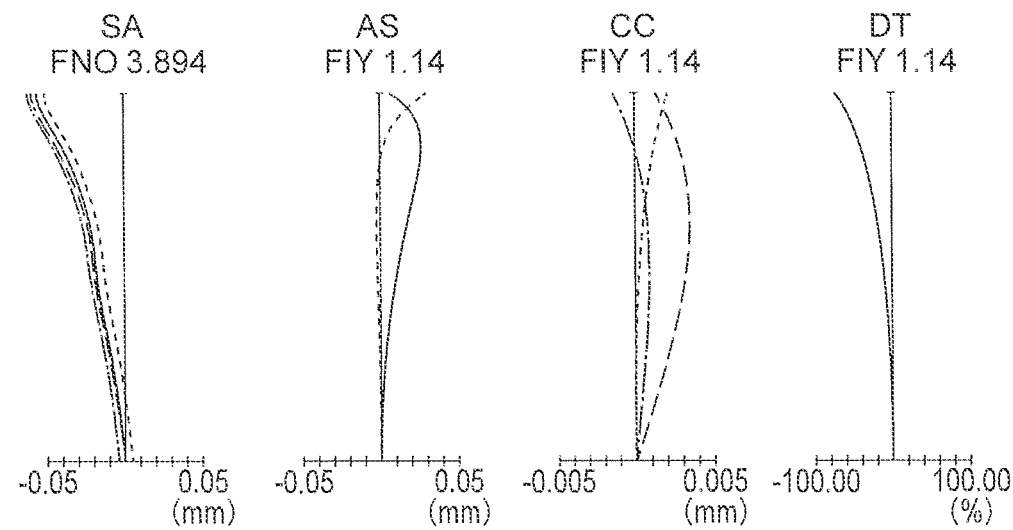

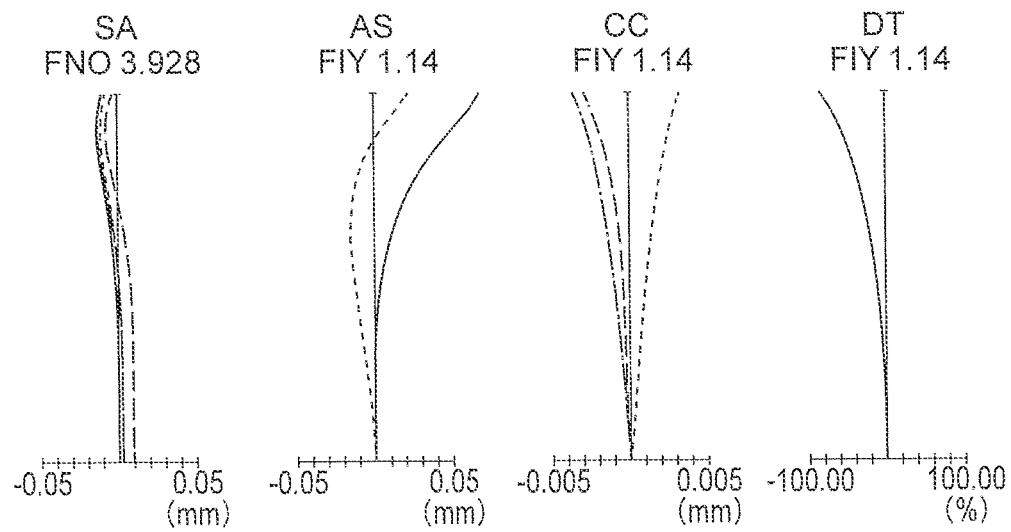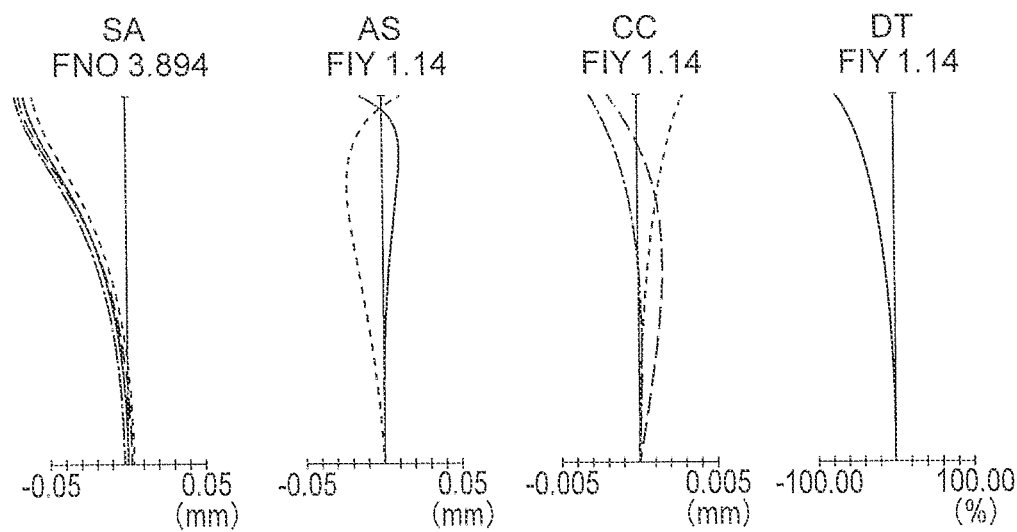

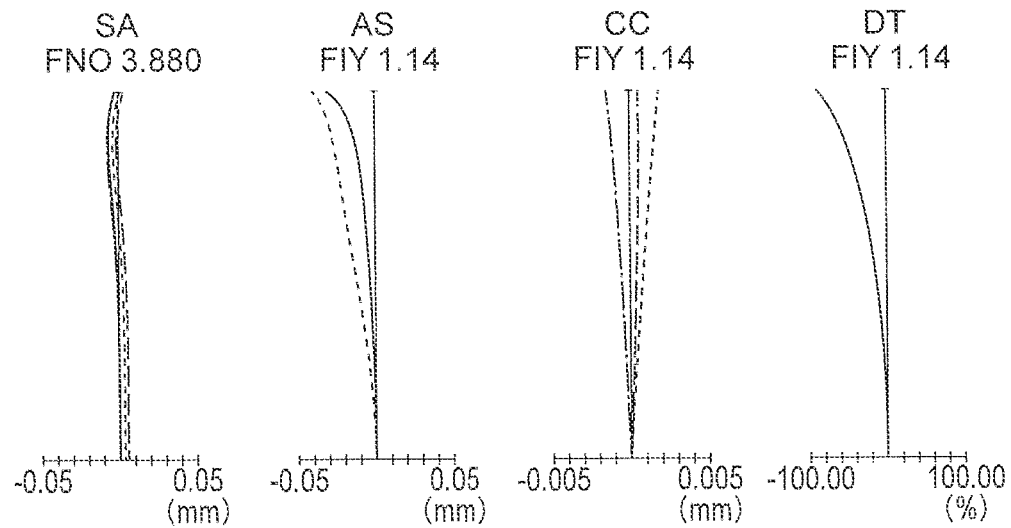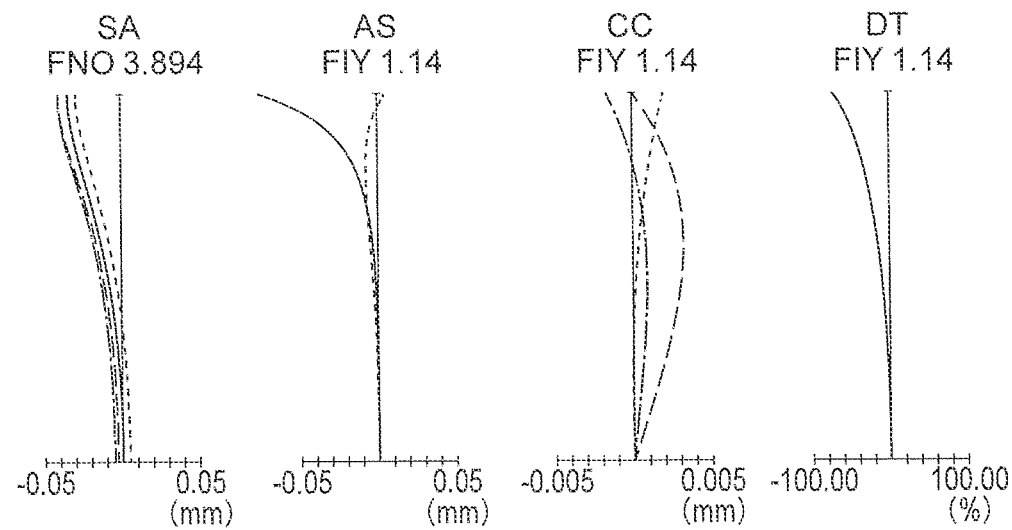

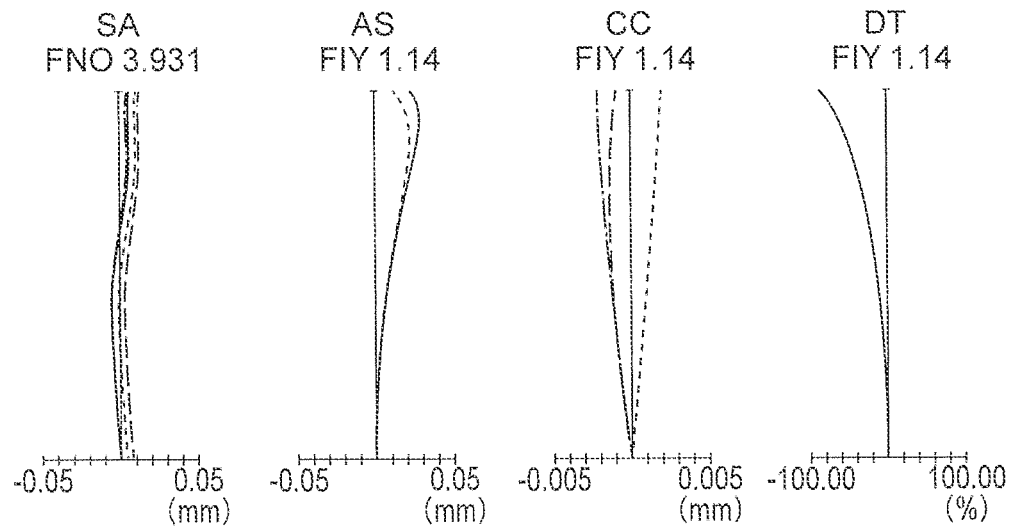
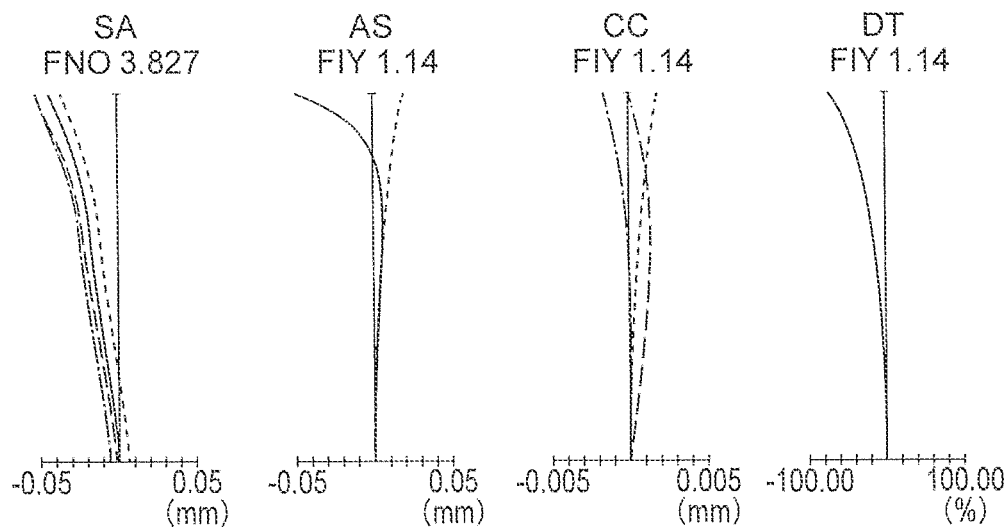

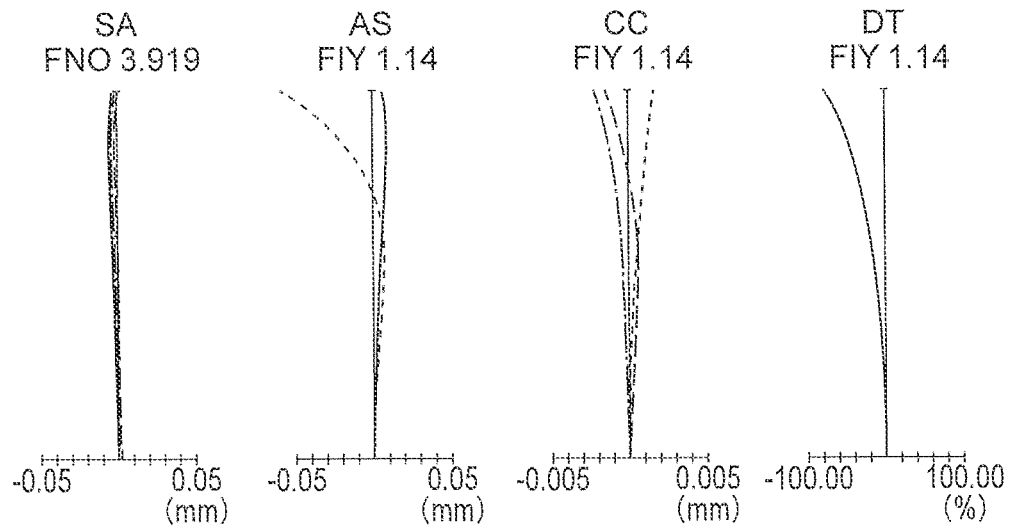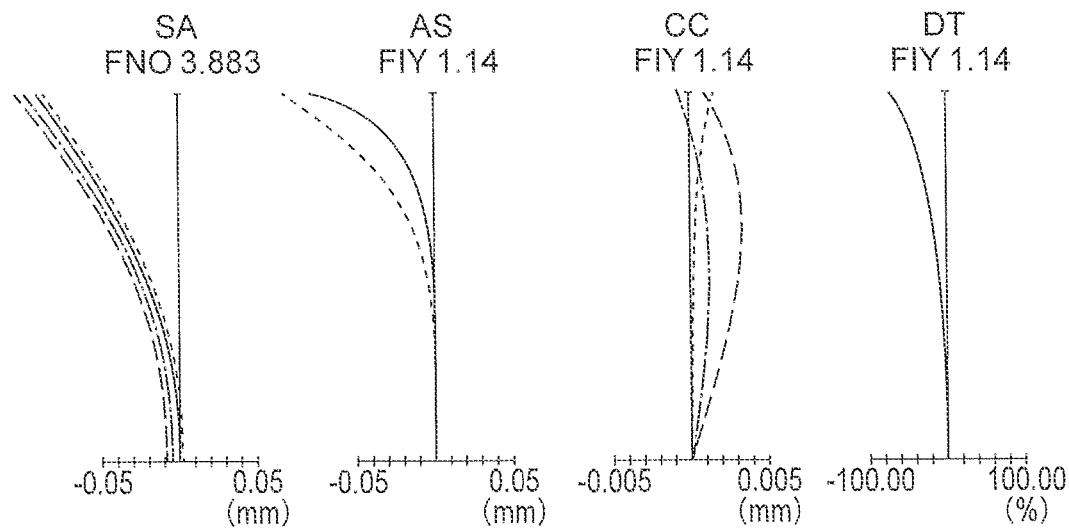

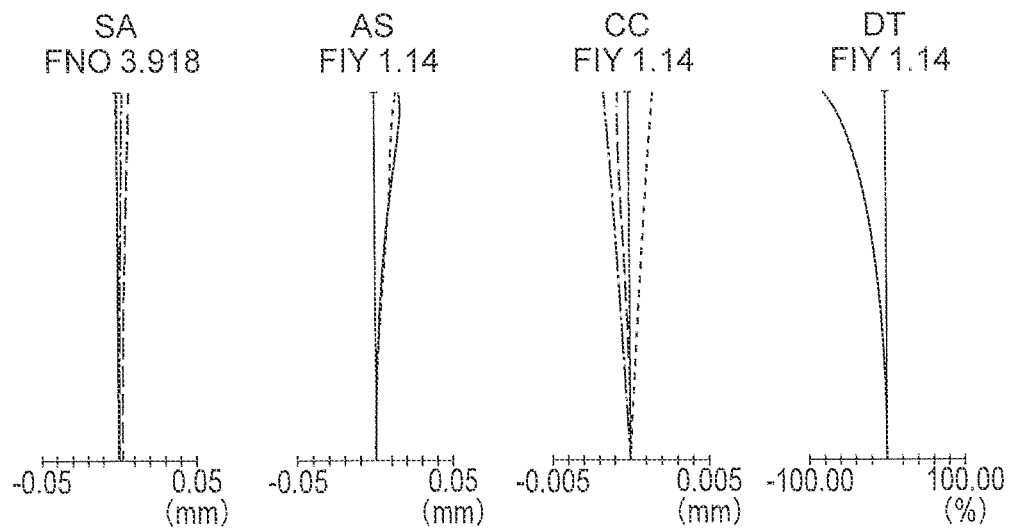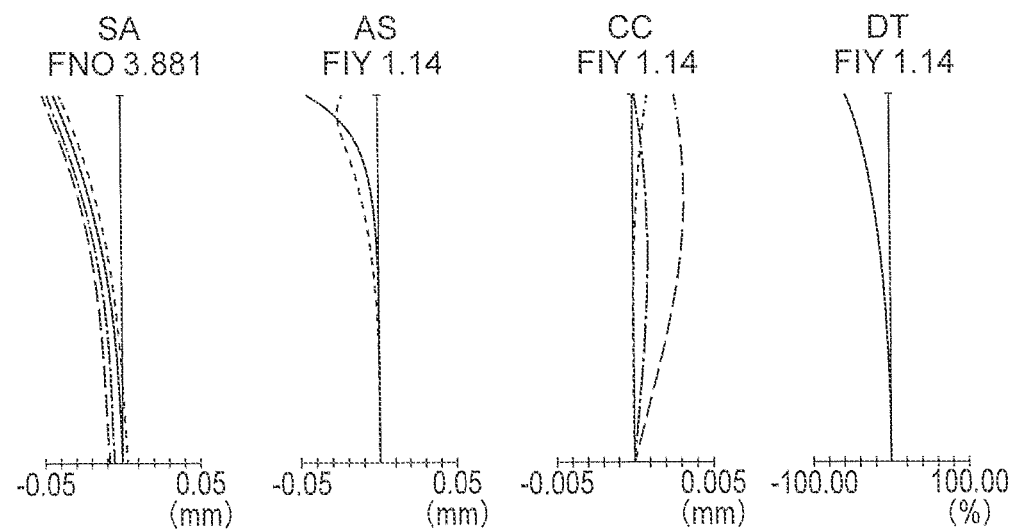

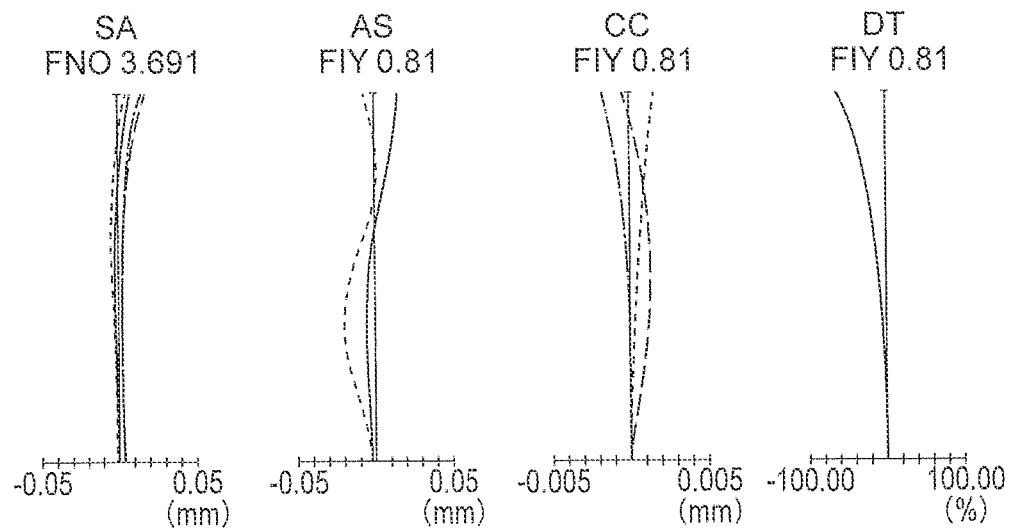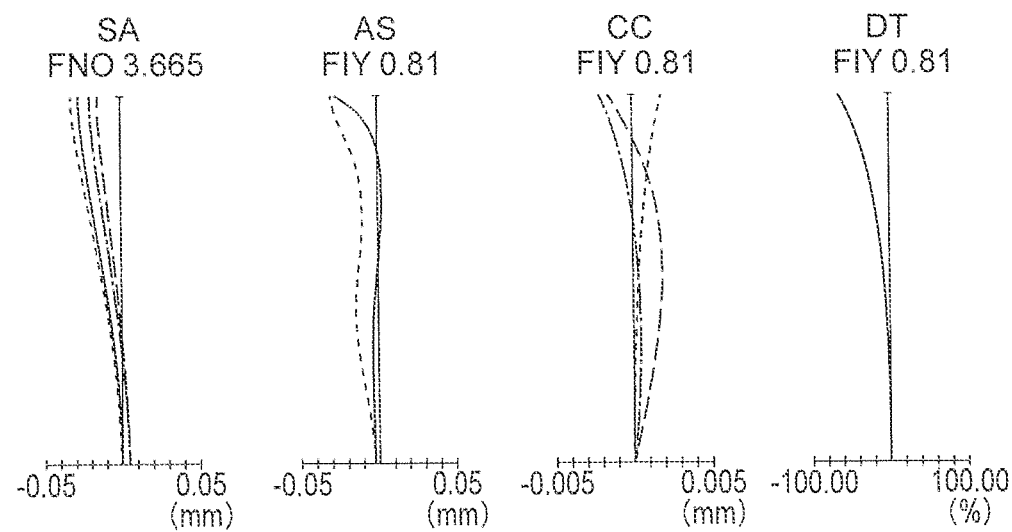

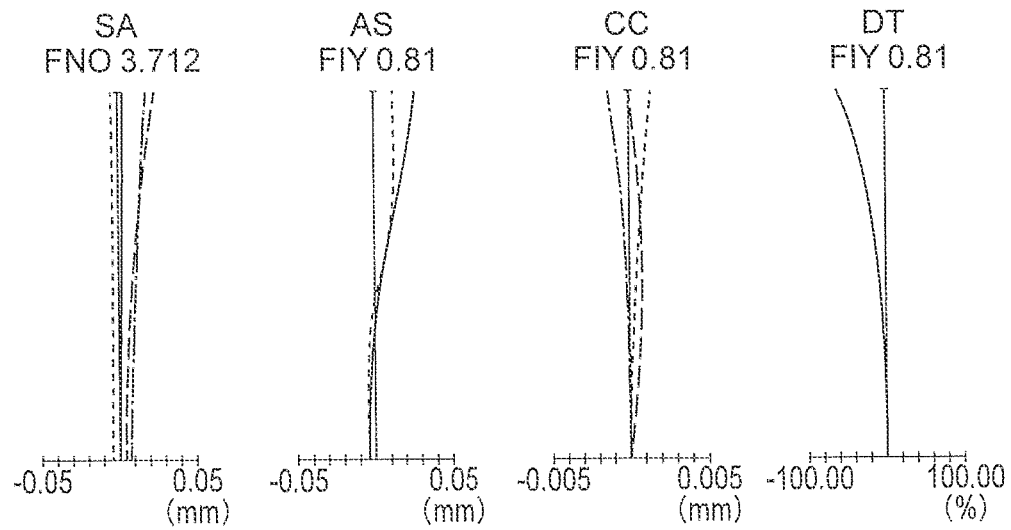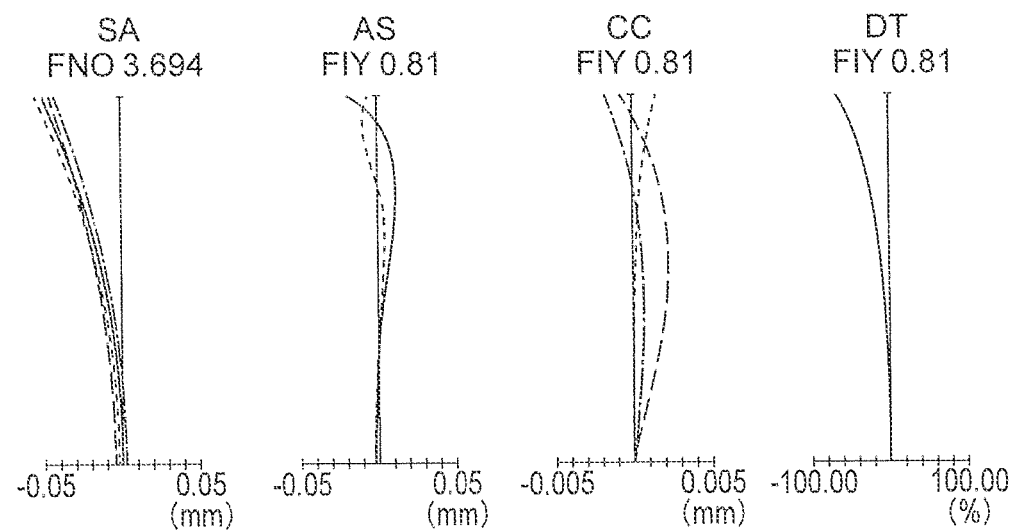

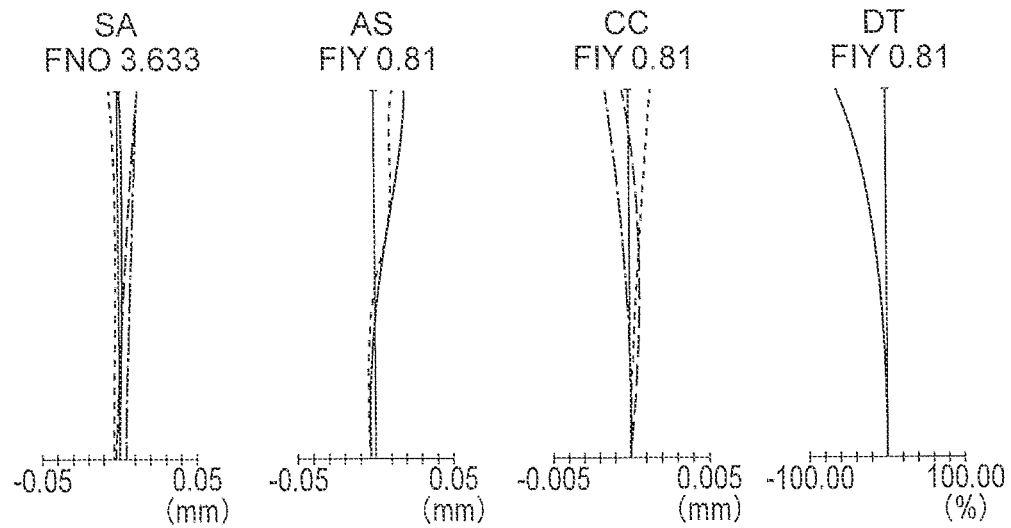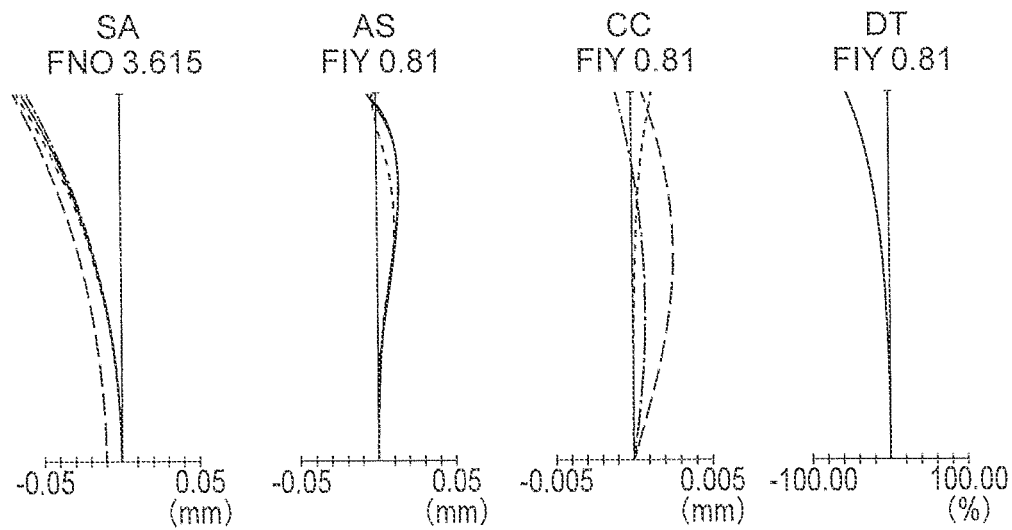

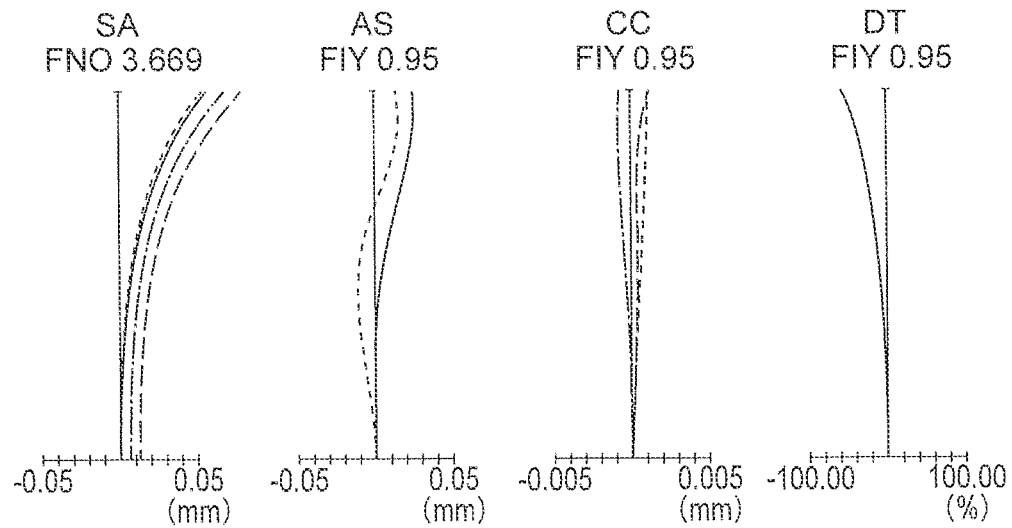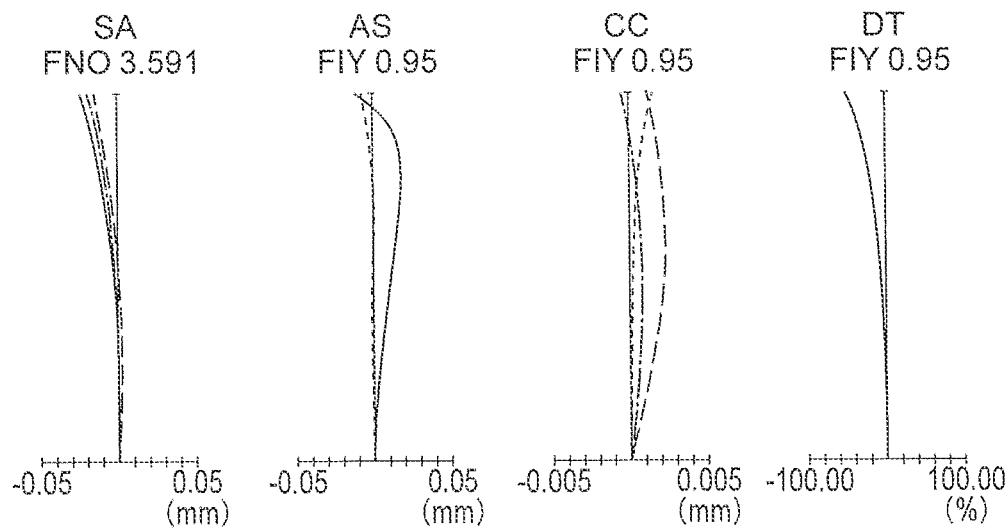

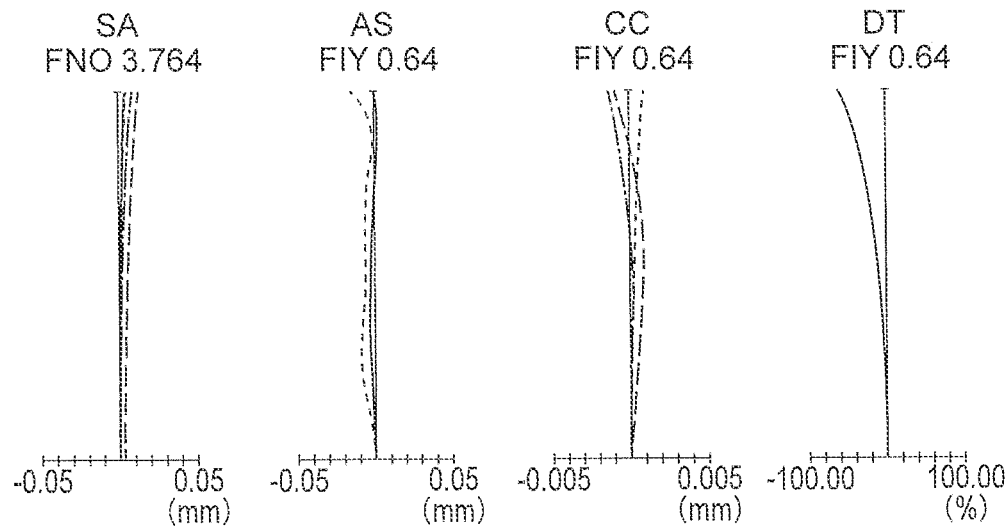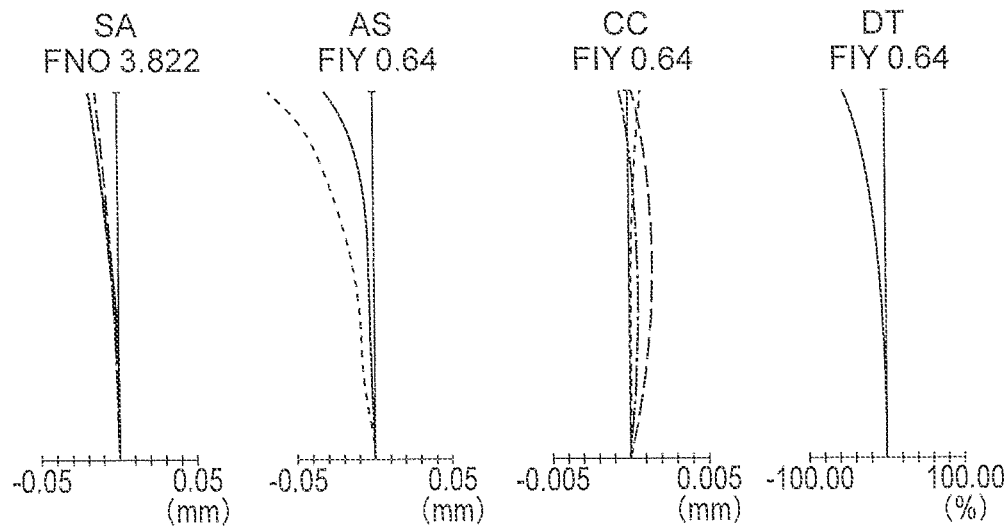

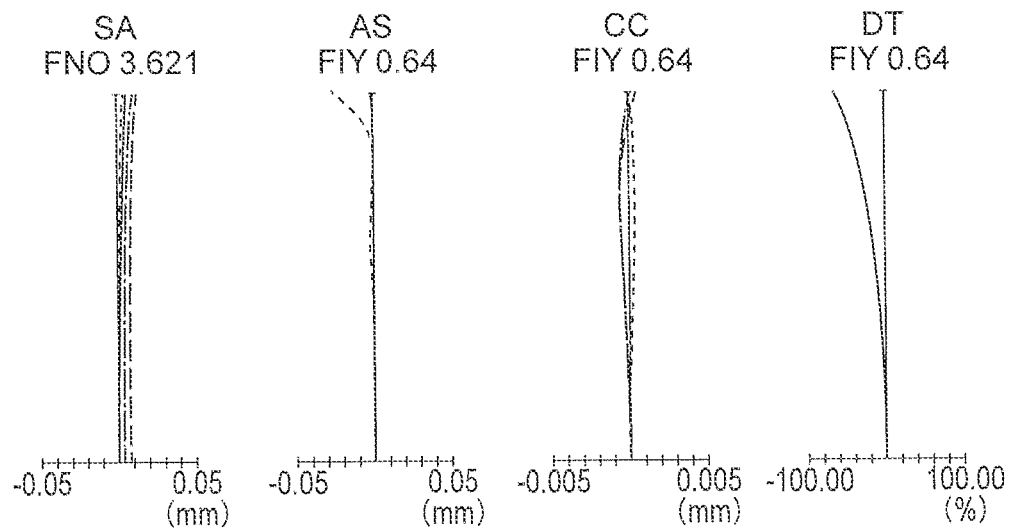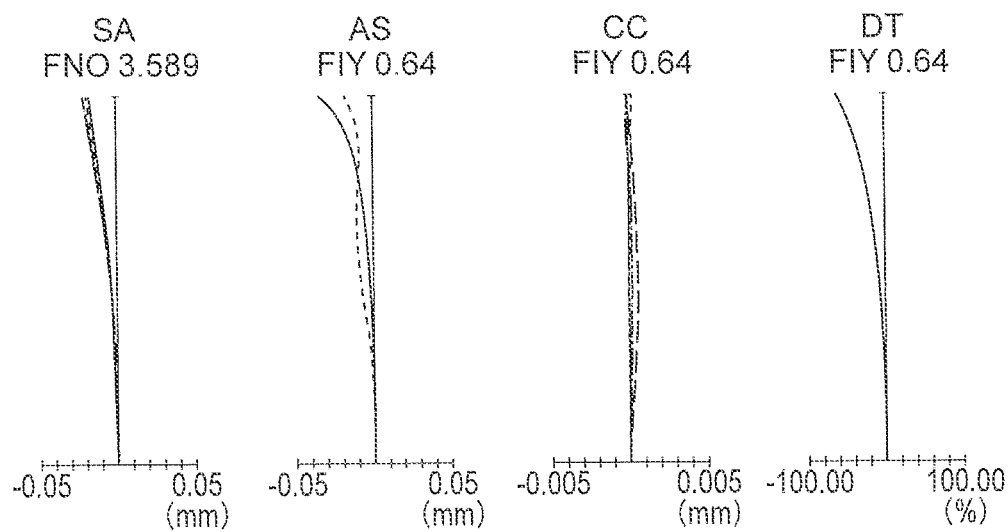

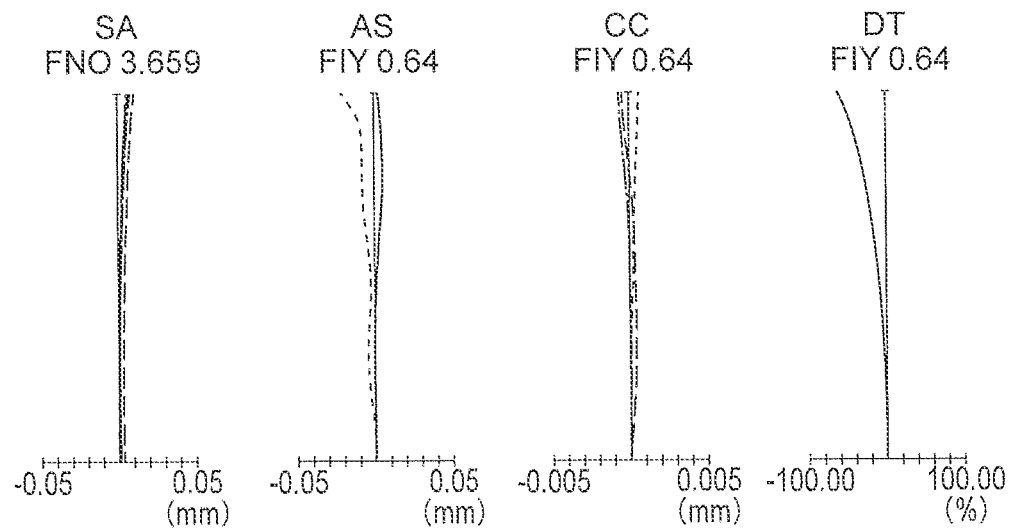
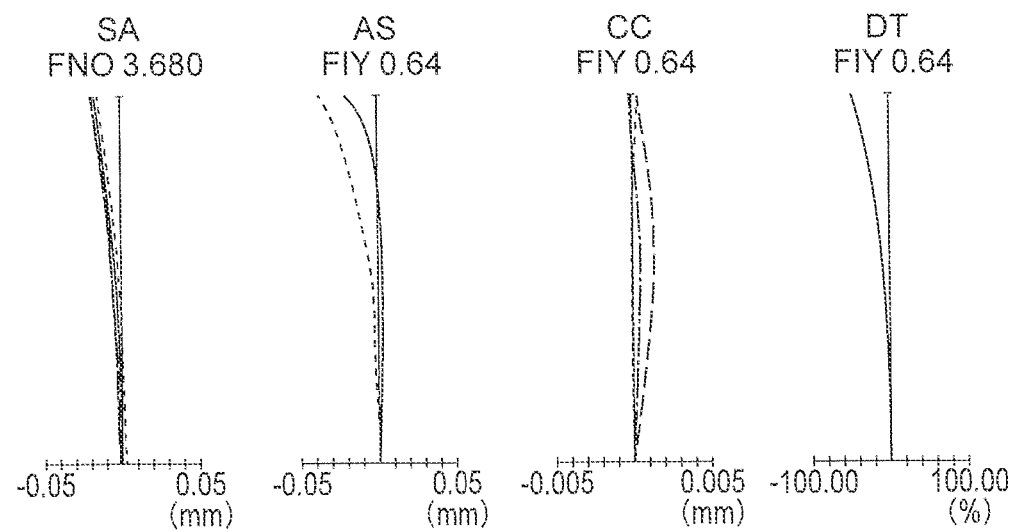

WIDE-ANGLE OPTICAL SYSTEM INCLUDING THREE LENS UNITS OF −++ REFRACTIVE POWERS, AND IMAGE PICKUP APPARATUS USING THE SAME

CROSS-REFERENCE TO RELATED APPLICATION

The present application is a continuation application of International Application No. PCT/JP2019/008032 filed on Mar. 1, 2019, the entire contents of which are incorporated herein by reference.

TECHNICAL FIELD

The present disclosure relates to a wide-angle optical system and an image pickup apparatus using the same.

DESCRIPTION OF THE RELATED ART

As an optical system having a wide angle of view, an objective optical system for endoscope has been known. In the objective optical system for endoscope, a wide-angle optical system with the angle of view of more than 100 degrees has been used.

In conventional endoscopes, an image sensor with a small number of pixels was used. Therefore, in an objective optical system for endoscope, an optical system with a fixed focus was used. Even when the optical system with a fixed focus was used, it was possible to cover a range of an object distance required to be observed (observation depth), by a depth of field.

However, in recent years, for improving a quality of an observed image, an image sensor with a large number of pixels has been used. In an endoscope in which the image sensor with a large number of pixels is used, a high resolution is sought even for the optical system.

When an optical system is made to have a high resolution, the depth of field becomes narrower than the required observation depth. Consequently, it becomes difficult to observe the required observation depth in a focused state. For such reasons, a need arose to impart a function of adjusting a focal position to an optical system.

An objective optical system for endoscope which enables to adjust the focal position has been known. In this objective optical system for endoscope, an inner focusing has been used for adjusting the focal position. For carrying out the inner focusing, an actuator is provided around an optical system.

An optical unit, for instance, includes an optical system and an actuator. In an endoscope, it is necessary to seal the optical unit. Moreover, the angle of view is 140° or more, and there are restrictions on a size and an output of the actuator. Therefore, in the focal-position adjustment, it is difficult to move the optical system. A light-weight and space-saving inner focusing is necessary.

Objective optical systems for endoscope in which, the inner focusing is used, have been disclosed in International Unexamined Patent Application Publication No. 2014/129089 and International Unexamined Patent Application Publication No. 2016/067838.

A wide-angle optical system according to at least some embodiments of the present disclosure is a wide-angle optical system having a lens component, the lens component has a plurality of optical surfaces, and in the lens component, two optical surfaces are in contact with air, and at least one optical surface is a curved surface, includes in order from an object side:

a first lens unit having a negative refractive power, a second lens unit having a positive refractive power, and a third lens unit having a positive refractive power, wherein at the time of carrying out a focal-position adjustment from a far point to a near point, the second lens unit is moved from a first position toward a second position, the first position is a position at which a distance between the first lens unit and the second lens unit becomes the minimum, and the second position is a position at which a distance between the second lens unit and the third lens unit becomes the minimum, the third lens unit includes not less than three lens components, not less than three lens components include a first lens component and a second lens component, the first lens component is a lens component located nearest to an object in the third lens unit, and the second lens component is a lens component located second from the object side in the third lens unit, the first lens component is a single lens and the second lens component is a cemented lens, and following conditional expression (1) is satisfied:

$$-0.60 < (n2C' - n2C)/r2C < -0.05 \quad (1)$$

where, n2C denotes a refractive index for a d-line of a medium located on the object side of a cemented surface of the second lens component, n2C' denotes a refractive index for the d-line of a medium located on an image side of the cemented surface of the second lens component, and r2C denotes a radius of curvature of the cemented surface.

Moreover, an image pickup apparatus of the present disclosure includes:

an optical system, and an image sensor which is disposed on an image plane, wherein the image sensor has an image pickup surface, and converts an image formed on the image pickup surface by the optical system to an electric signal, and the optical system is the abovementioned wide-angle optical system.

BRIEF DESCRIPTION OF THE DRAWINGS

FIG. 15A, FIG. 15B, FIG. 15C, FIG. 15D, FIG. 15E, FIG. 15F, FIG. 15G, and FIG. 15H are aberration diagrams of the wide-angle optical system of the example 1;

FIG. 16A, FIG. 16B, FIG. 16C, FIG. 16D, FIG. 16E, FIG. 16F, FIG. 16G, and FIG. 16H are aberration diagrams of the wide-angle optical system of the example 2;

FIG. 17A, FIG. 17B, FIG. 17C, FIG. 17D, FIG. 17E, FIG. 17F, FIG. 17G, and FIG. 17H aberration diagrams of the wide-angle optical system of the example 3;

FIG. 18A, FIG. 18B, FIG. 18C, FIG. 18D, FIG. 18E, FIG. 18F, FIG. 18G, and FIG. 18H are aberration diagrams of the wide-angle optical system of the example 4;

FIG. 19A, FIG. 19B, FIG. 19C, FIG. 19D, FIG. 19E, FIG. 19F, FIG. 19G, and FIG. 19H are aberration diagrams of the wide-angle optical system of the example 5;

FIG. 20A, FIG. 20B, FIG. 20C, FIG. 20D, FIG. 20E, FIG. 20F, FIG. 20G, and FIG. 20H are aberration diagrams of the wide-angle optical system of the example 6;

FIG. 21A, FIG. 21B, FIG. 21C, FIG. 21D, FIG. 21E, FIG. 21F, FIG. 21G, and FIG. 21H are aberration diagrams of the wide-angle optical system of the example 7;

FIG. 22A, FIG. 22B, FIG. 22C, FIG. 22D, FIG. 22E, FIG. 22F, FIG. 22G, and FIG. 22H are aberration diagrams of the wide-angle optical system of the example 8;

FIG. 23A, FIG. 23B, FIG. 23C, FIG. 23D, FIG. 23E, FIG. 23F, FIG. 23G, and FIG. 23H are aberration diagrams of the wide-angle optical system of the example 9;

FIG. 24A, FIG. 24B, FIG. 24C, FIG. 24D, FIG. 24E, FIG. 24F, FIG. 24G, and FIG. 24H are aberration diagrams of the wide-angle optical system of the example 10;

FIG. 25A, FIG. 25B, FIG. 25C, FIG. 25D, FIG. 25E, FIG. 25F, FIG. 25G, and FIG. 25H are aberration diagrams of the wide-angle optical system of the example 11;

FIG. 26A, FIG. 26B, FIG. 26C, FIG. 26D, FIG. 26E, FIG. 26F, FIG. 26G, and FIG. 26H are aberration diagrams of the wide-angle optical system of the example 12;

FIG. 27A, FIG. 27B, FIG. 27C, FIG. 27D, FIG. 27E, FIG. 27F, FIG. 27G, and FIG. 27H are aberration diagrams of the wide-angle optical system of the example 13;

FIG. 28A, FIG. 28B, FIG. 28C, FIG. 28D, FIG. 28E, FIG. 28F, FIG. 28G, and FIG. 28H are aberration diagrams of the wide-angle optical system of the example 14;

DETAILED DESCRIPTION

Figure 1A:
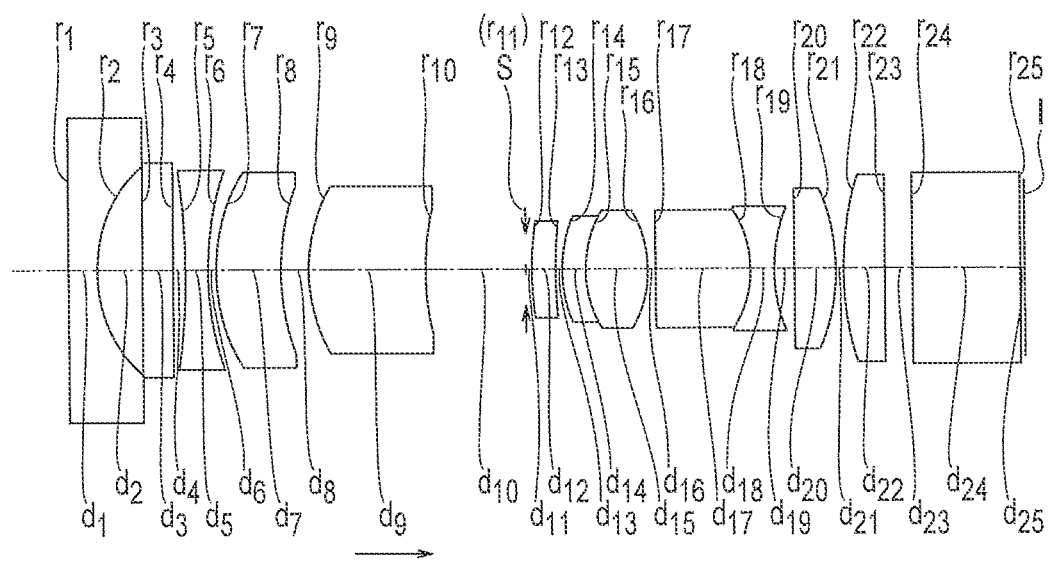
FIG. 1A and FIG. 1B are lens cross-sectional views of a wide-angle optical system of an example 1.
Figure 1B:
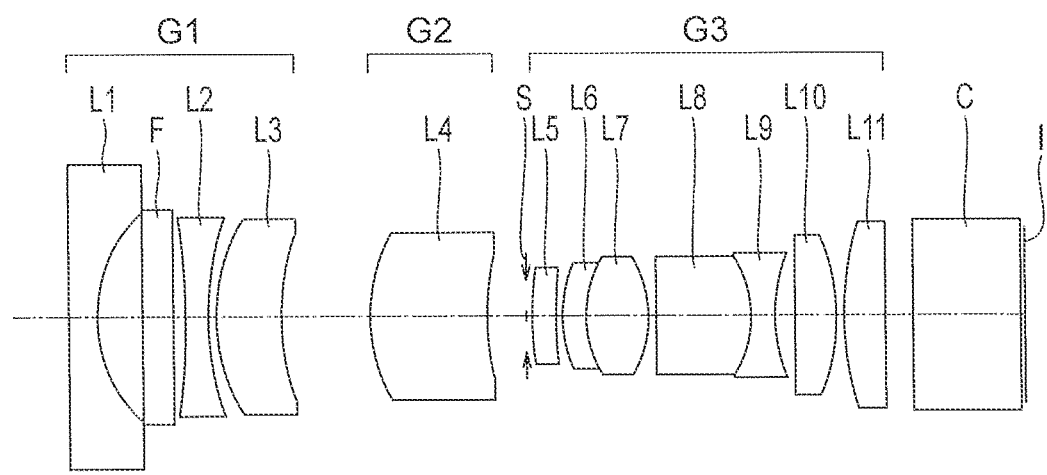
Figure 2A:
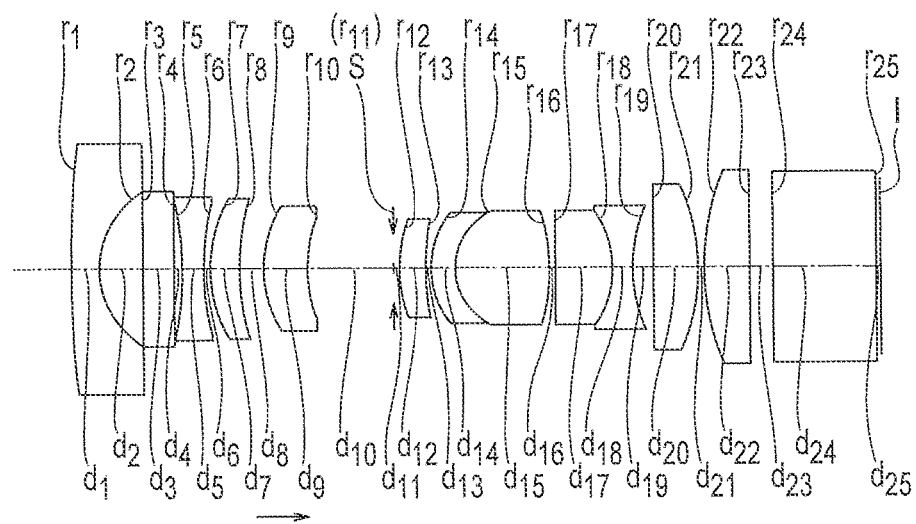
FIG. 2A and FIG. 2B are lens cross-sectional views of a wide-angle optical system of an example 2.
Figure 2B:
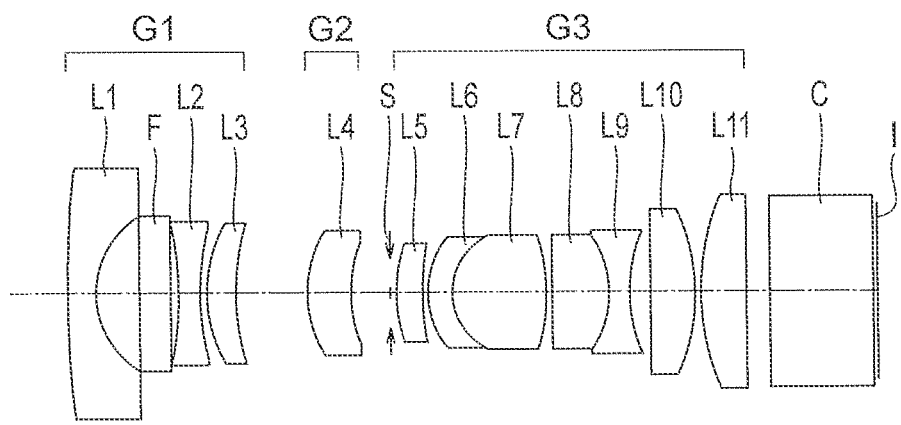
Figure 3A:
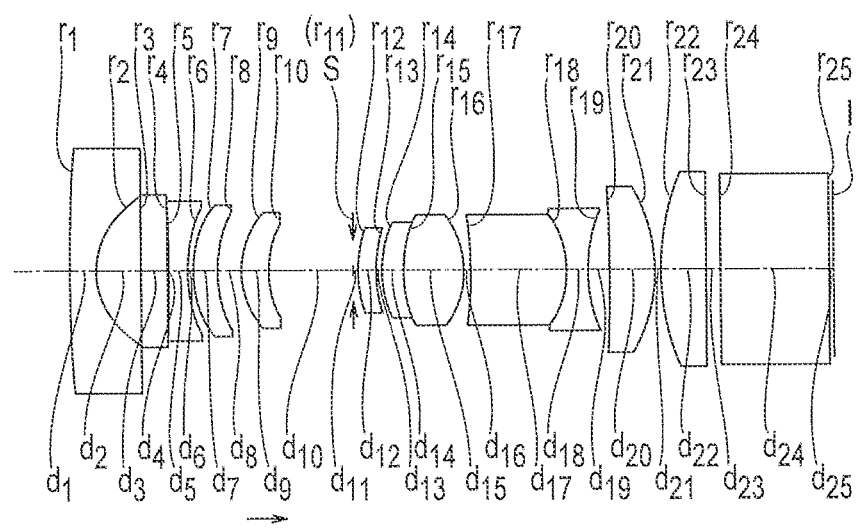
FIG. 3A and FIG. 3B are lens cross-sectional views of a wide-angle optical system of an example 3.
Figure 3B:
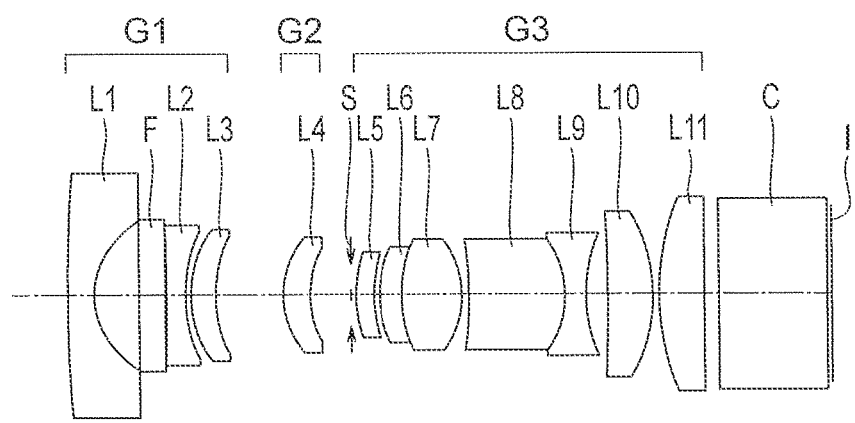
Figure 4A:
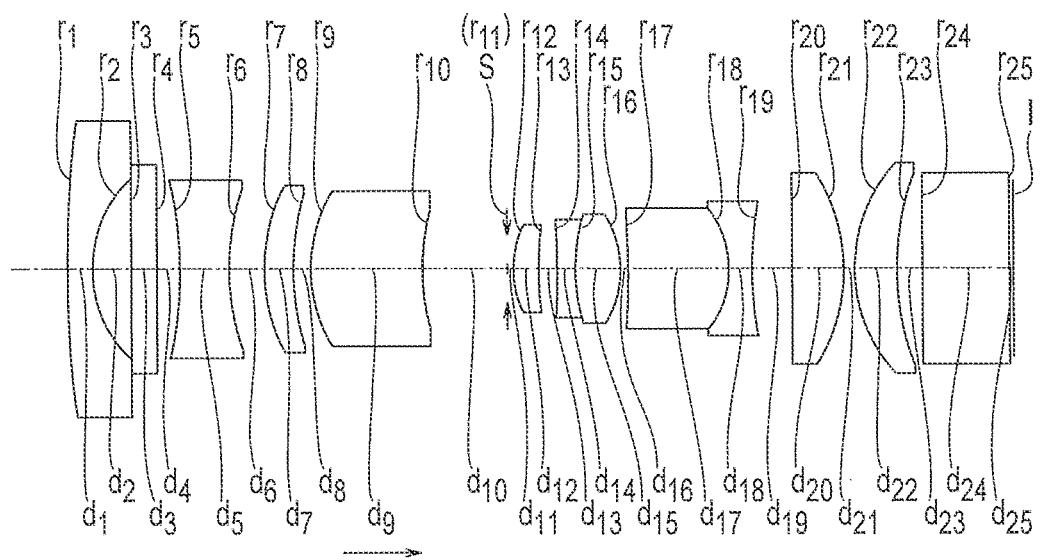
FIG. 4A and FIG. 4B are lens cross-sectional views of a wide-angle optical system of an example 4.
Figure 4B:
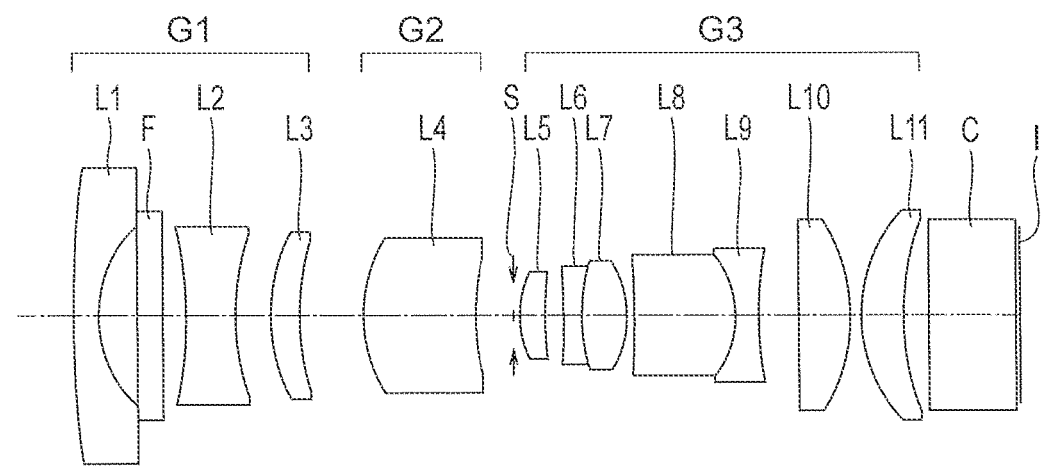
Figure 5A:
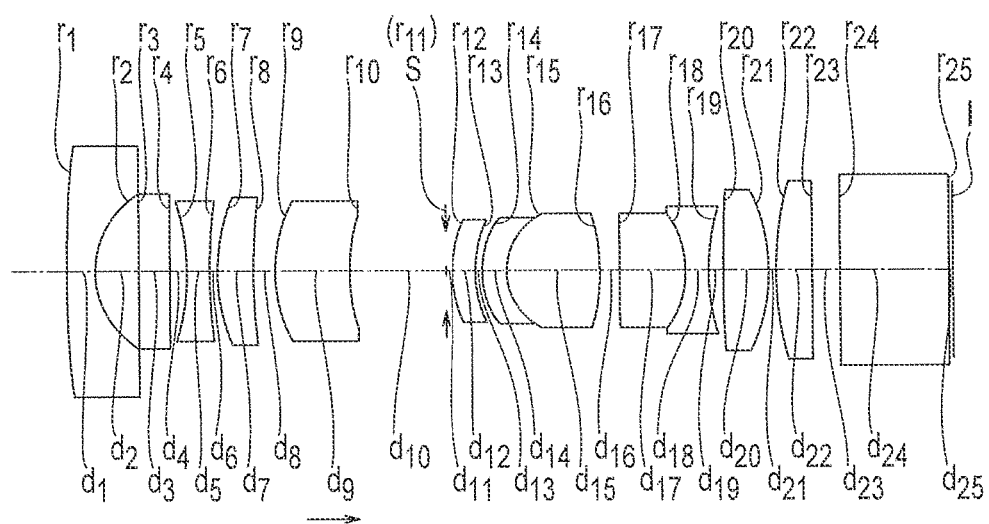
FIG. 5A and FIG. 5B are lens cross-sectional views of a wide-angle optical system of an example 5.
Figure 5B:
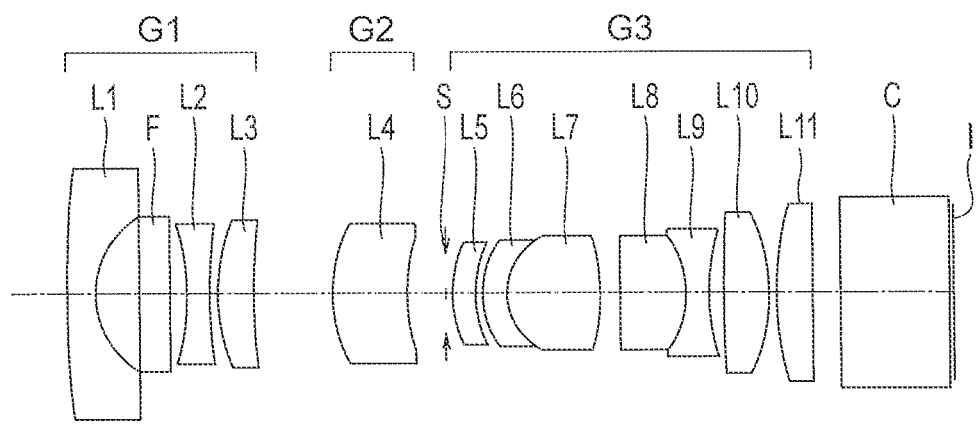
Figure 6A:
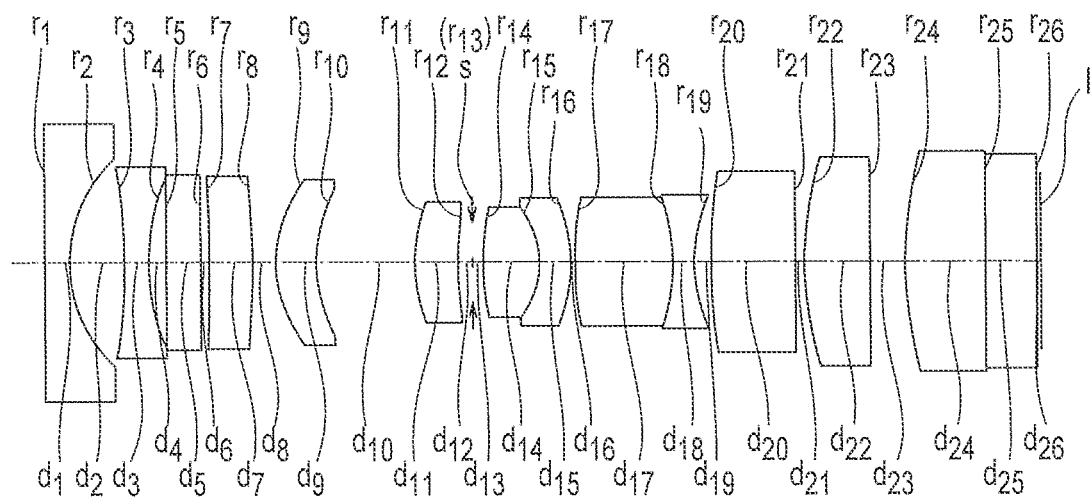
FIG. 6A and FIG. 6B are lens cross-sectional views of a wide-angle optical system of an example 6.
Figure 6B:
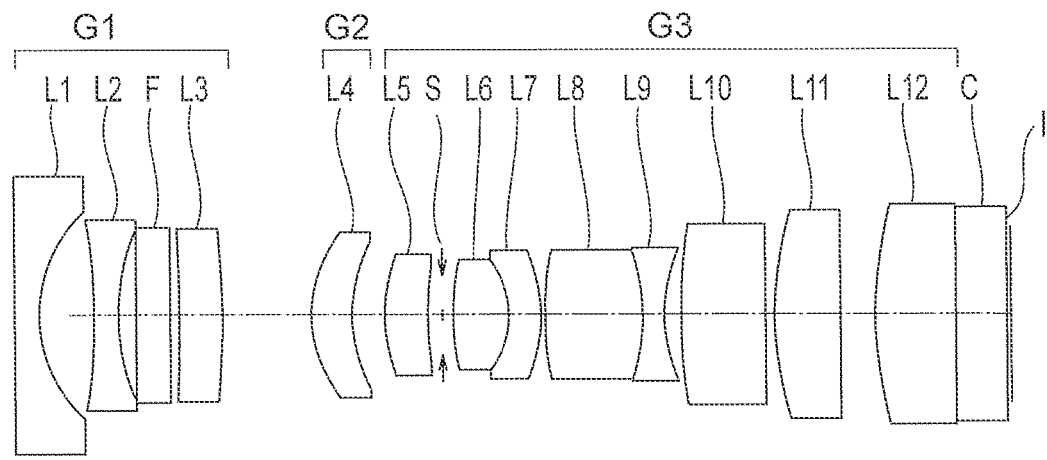
Figure 7A:
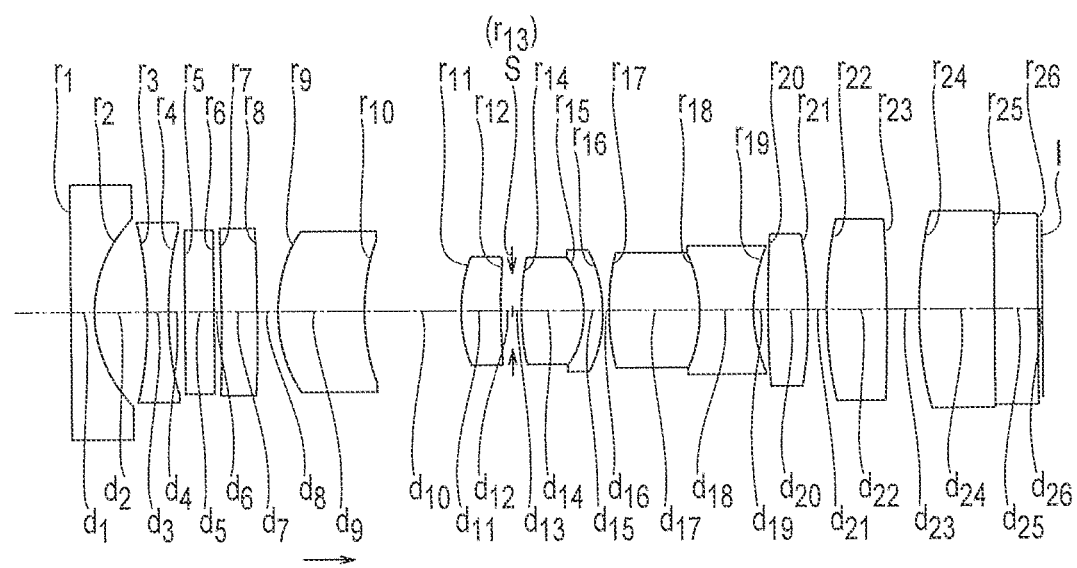
FIG. 7A and FIG. 7B are lens cross-sectional views of a wide-angle optical system of an example 7.
Figure 7B:
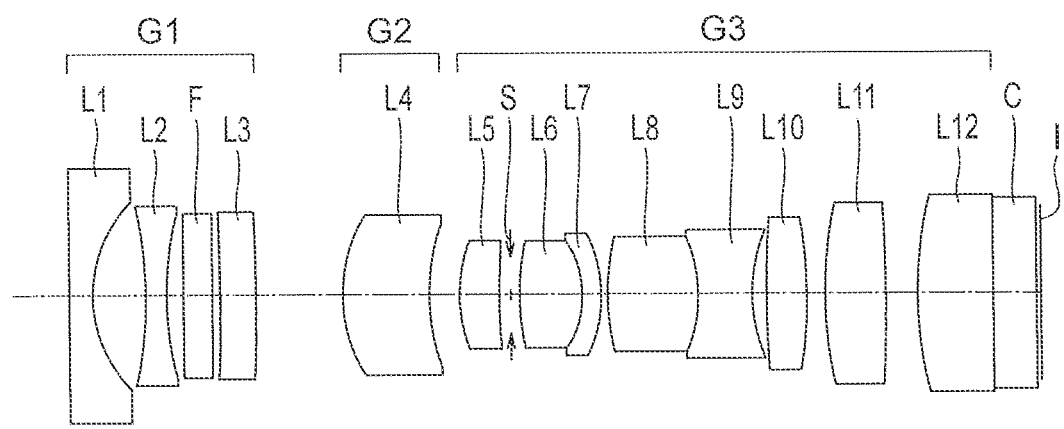
Figure 8A:
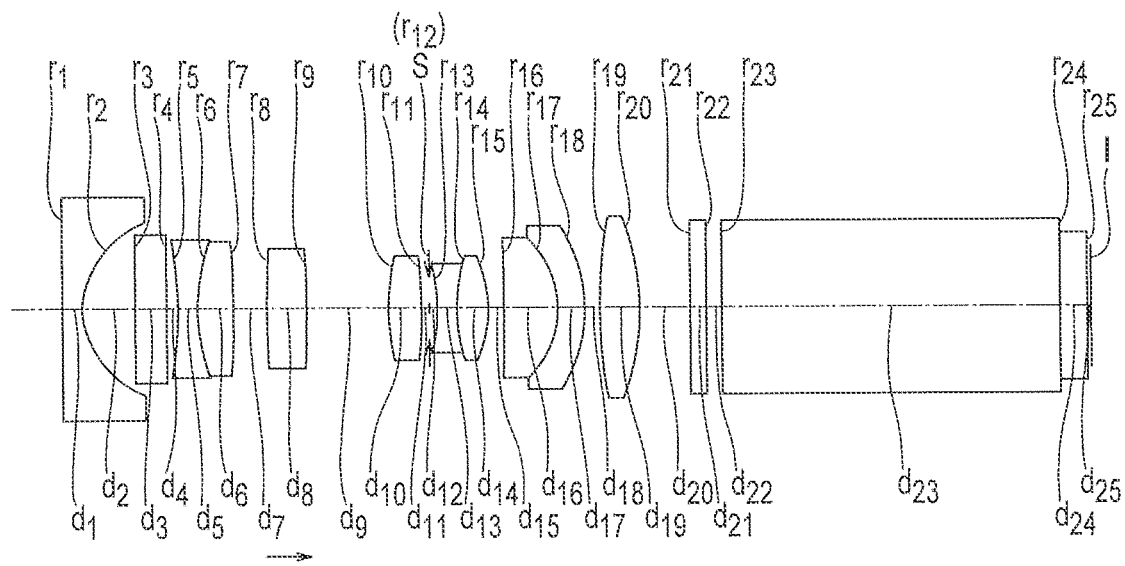
FIG. 8A and FIG. 8B are lens cross-sectional views of a wide-angle optical system of an example 8.
Figure 8B:
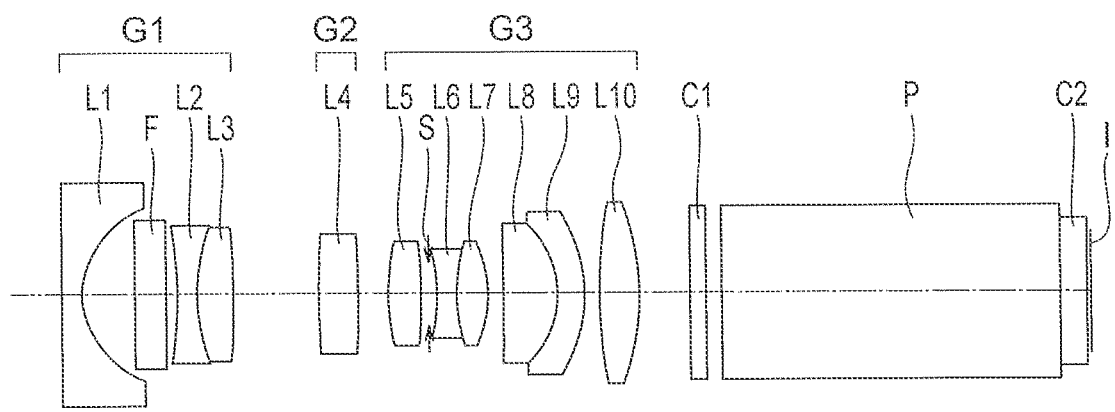
Figure 9A:
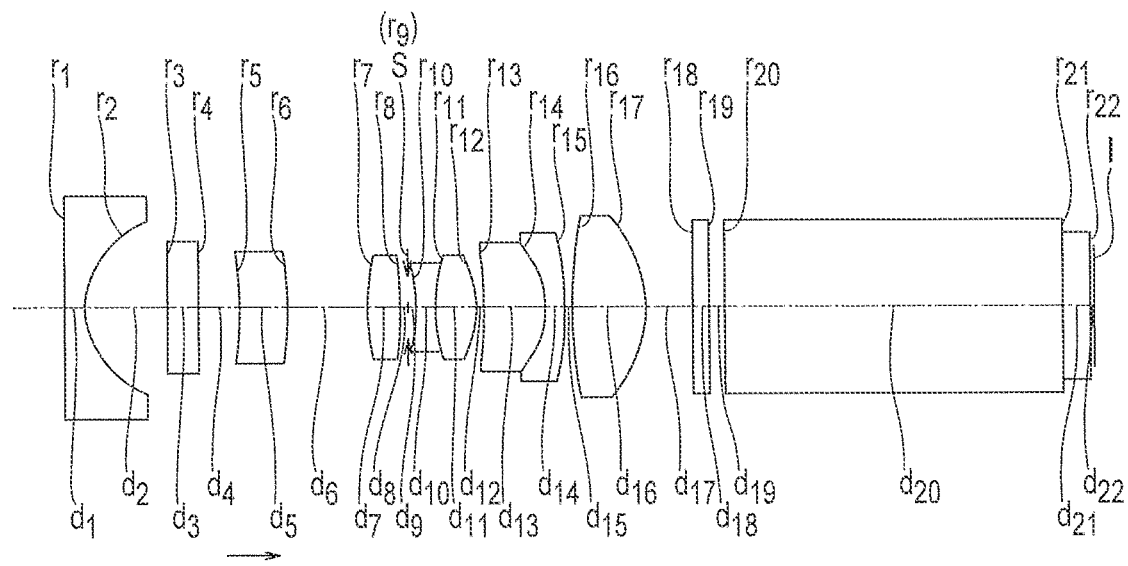
FIG. 9A and FIG. 9B are lens cross-sectional views of a wide-angle optical system of an example 9.
Figure 9B:
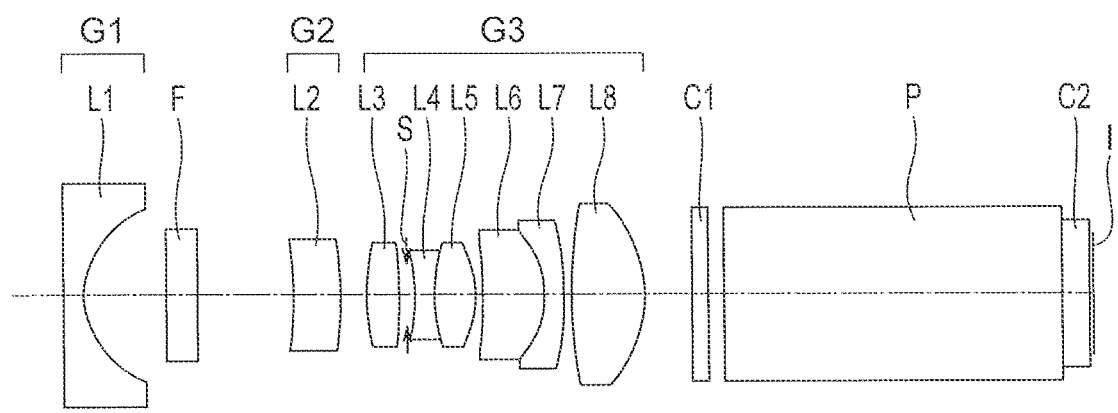
Figure 10A:
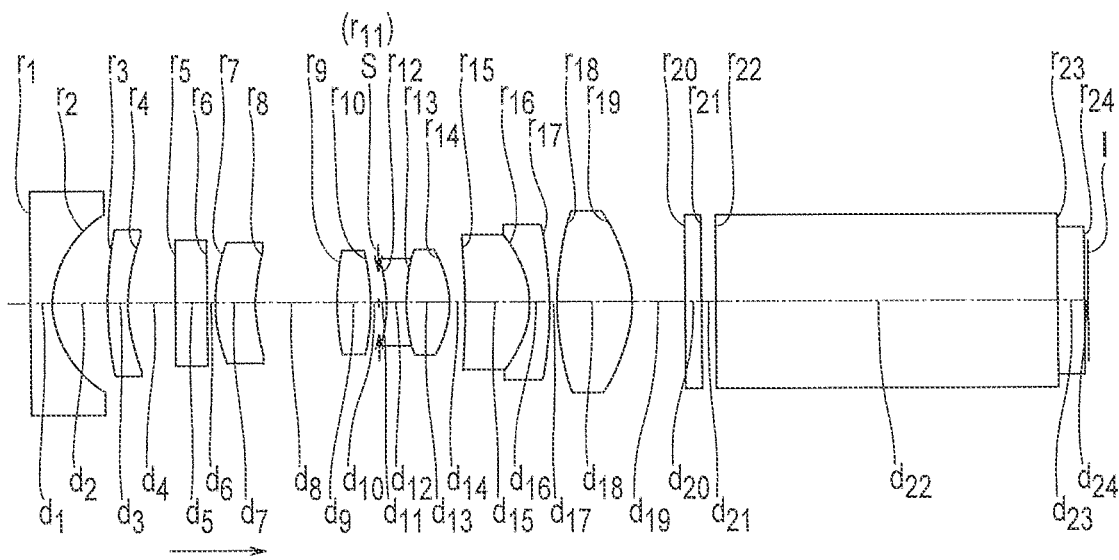
FIG. 10A and FIG. 10B are lens cross-sectional views of a wide-angle optical system of an example 10.
Figure 10B:
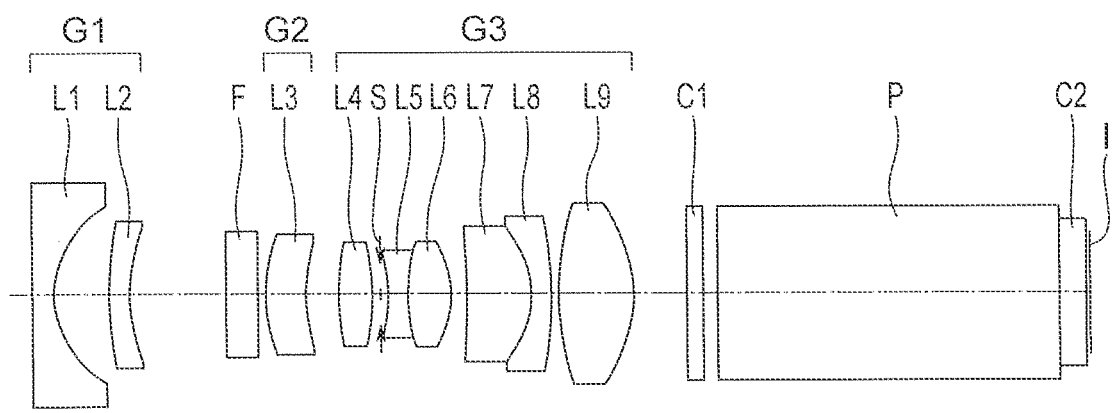
Figure 11A:
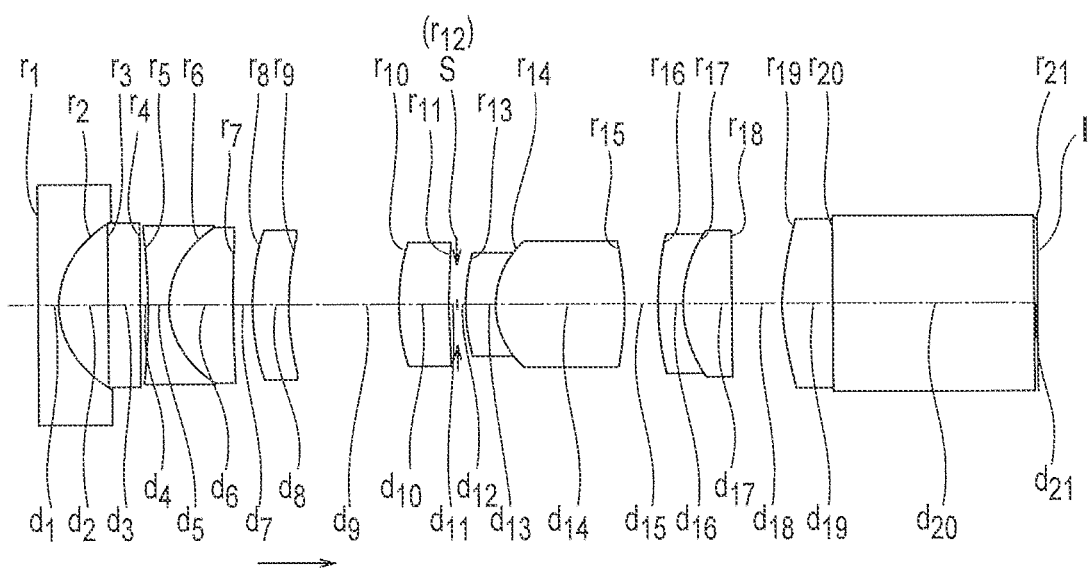
FIG. 11A and FIG. 11B are lens cross-sectional views of a wide-angle optical system of an example 11.
Figure 11B:
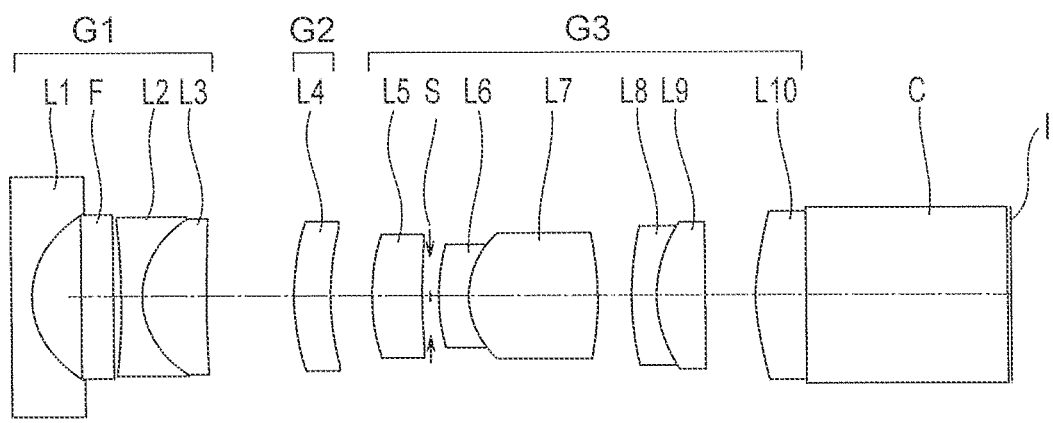
Figure 12A:
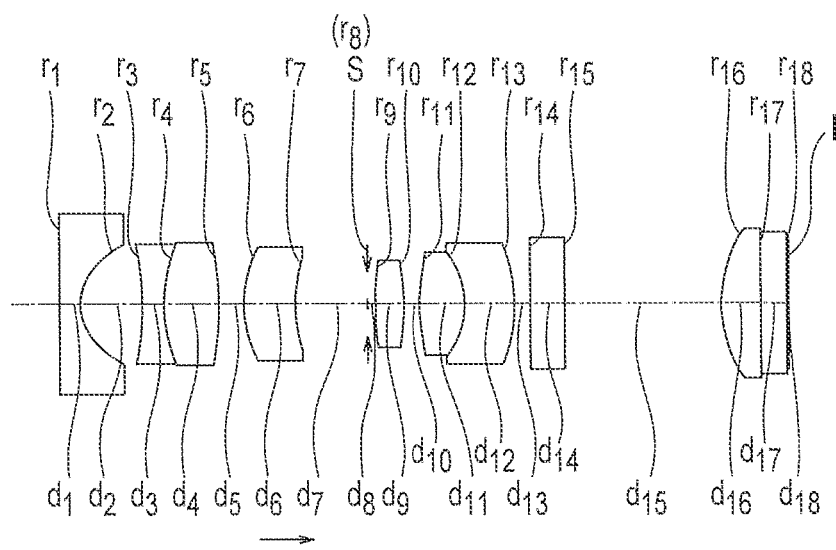
FIG. 12A and FIG. 12B are lens cross-sectional views of a wide-angle optical system of an example 12.
Figure 12B:
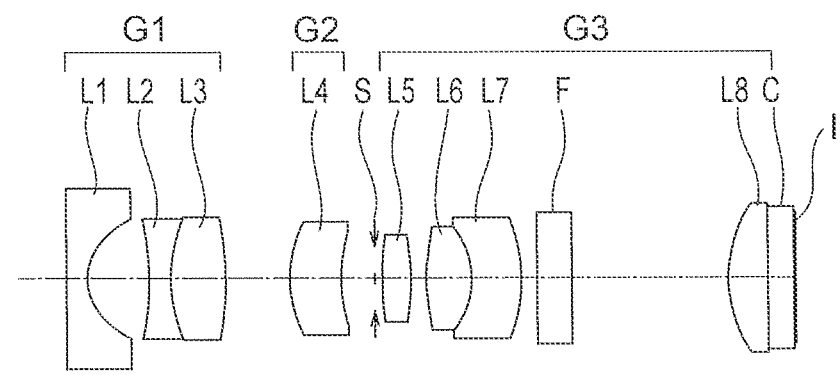
Figure 13A:
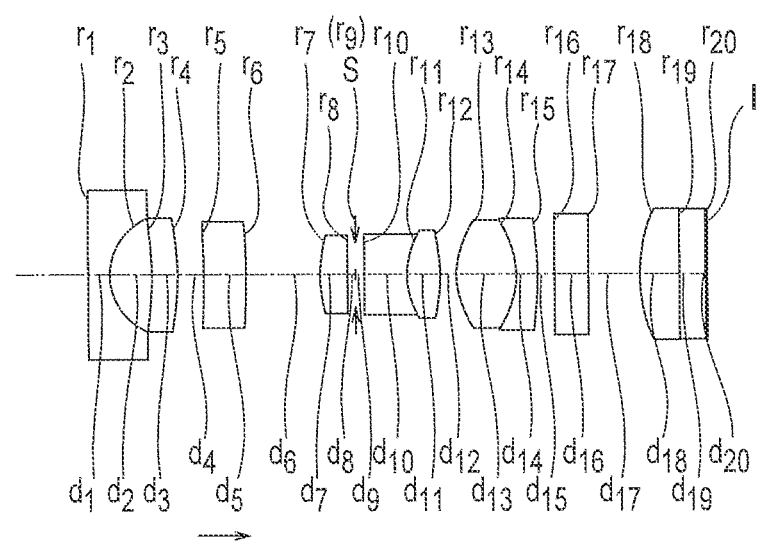
FIG. 13A and FIG. 13B are lens cross-sectional views of a wide-angle optical system of an example 13.
Figure 13B:
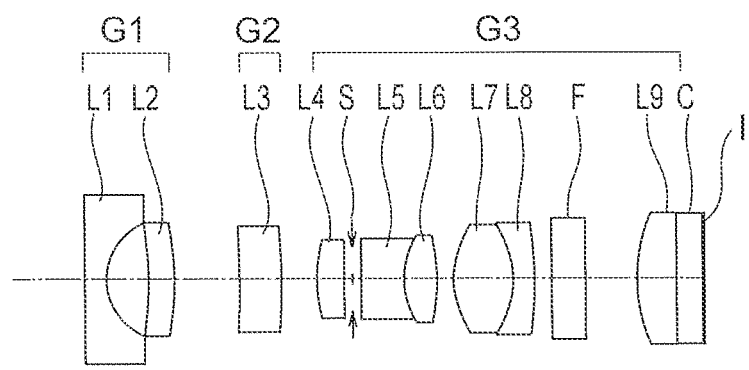
Figure 14A:
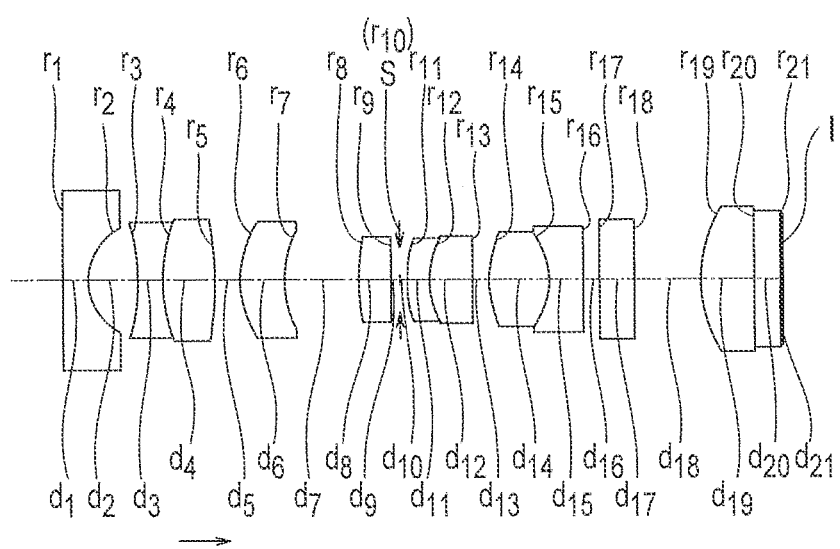
FIG. 14A and FIG. 14B are lens cross-sectional views of a wide-angle optical system of an example 14.
Figure 14B:
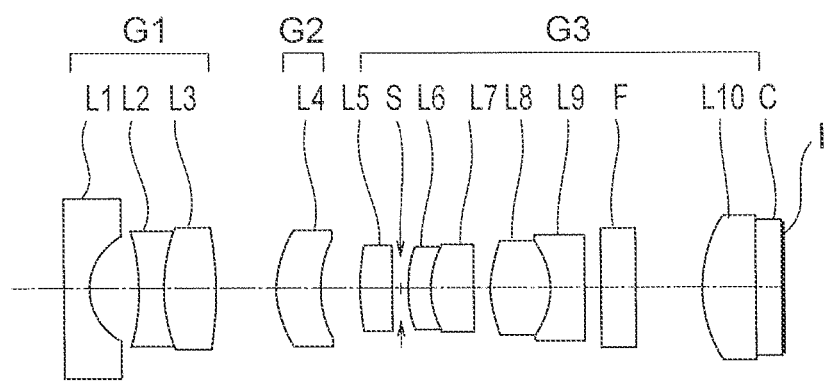

Prior to the explanation of examples, action and effect of embodiments according to certain aspects of the present disclosure will be described below. In the explanation of the action and effect of the embodiments concretely, the explanation will be made by citing concrete examples. However, similar to a case of the examples to be described later, aspects exemplified thereof are only some of the aspects included in the present disclosure, and there exists a large number of variations in these aspects. Consequently, the present disclosure is not restricted to the aspects that will be exemplified.

A wide-angle optical system of the present embodiment is a wide-angle optical system having a lens component. The lens component has a plurality of optical surfaces, and in the lens component, two optical surfaces are in contact with air, and at least one optical surface is a curved surface. The wide-angle optical system includes in order from an object side, a first lens unit having a negative refractive power, a second lens unit having a positive refractive power, and a third lens unit having a positive refractive power. At the time of carrying out a focal-position adjustment from a far point to a near point, the second lens unit is moved from a first position toward a second position. The first position is a position at which a distance between the first lens unit and the second lens unit becomes the minimum, and the second position is a position at which a distance between the second lens unit and the third lens unit becomes the minimum. The third lens unit includes not less than three lens components, and not less than three lens components include a first lens component and a second lens component. The first lens component is a lens component located nearest to an object in the third lens unit, and the second lens component is a lens component located second from the object side in the third lens unit. The first lens component is a single lens and the second lens component is a cemented lens, and following conditional expression (1) is satisfied:

$$-0.60 < (n2C' - n2C)/r2C < -0.05 \quad (1)$$

where, n2C denotes a refractive index for a d-line of a medium located on the object side of a cemented surface of the second lens component, n2C' denotes a refractive index for the d-line of a medium located on an image side of the cemented surface of the second lens component, and r2C denotes a radius of curvature of the cemented surface.

The wide-angle optical system of the present embodiment, for instance, is about a wide-angle optical system with an angle of view of more than 100 degrees. In recent years, with the debut of a high-resolution monitor and the like, regarding an image quality at the time of observation, a high image quality is being sought. The wide-angle optical system of the present embodiment is a wide-angle optical system which is capable of dealing with such requirement.

Moreover, the wide-angle optical system of the present embodiment is an optical system in which an inner focusing is used. Therefore, an actuator is disposed around an inner-focusing lens. In the wide-angle optical system of the present embodiment, even with the actuator disposed around the optical system, an outer diameter of the overall optical system is small. The wide-angle optical system of the present embodiment, while being an optical system having a wide angle of view, is an optical system in which a light-ray height is suppressed to be low over a long range of a central portion of the optical system.

The wide-angle optical system of the present embodiment is a wide-angle optical system having the lens component. The lens component has the plurality of optical surfaces. In the lens component, the two optical surfaces are in contact with air, and at least one optical surface is a curved surface. The lens component includes a single lens and a cemented lens for example.

Moreover, in the lens component, a lens and a plane parallel plate may have been cemented. In this case, one optical surface in contact with air is a lens surface, and the other optical surface in contact with air is a flat surface. A lens component in which a single lens and a plane parallel plate are cemented, is to be deemed as a single lens. A lens component in which a cemented lens and a plane parallel plate are cemented, is to be deemed as a cemented lens.

Moreover, a planoconvex lens and a planoconcave lens may have been cemented. In this case, a cemented surface is a curved surface and an optical surface in contact with air is a flat surface.

The surface on the object side of the lens component, out of the two optical surfaces in contact with air, is an optical surface located on the object side. A surface on an image side of the lens component, out of the two optical surfaces in contact with air, is an optical surface located on the image side. In a case in which the lens component is a cemented lens, a cemented surface is located between the surface on the object side and the surface on the image side.

The wide-angle optical system of the present embodiment includes in order from the object side, the first lens unit having a negative refractive power, the second lens unit having a positive refractive power, and the third lens unit having a positive refractive power. At the time of carrying out the focal-position adjustment from the far point to the near point, the second lens unit is moved from the first position toward the second position. The movement from the first position toward the second position is a movement in a direction in which the distance between the first lens unit and the second lens unit widens, and is a movement in a direction in which the distance between the second lens unit and the third lens unit shortens.

The first position is a position at which the distance between the first lens unit and the second lens unit becomes the minimum. At the first position, the second lens unit is located nearest to the object in a range of movement. At the first position, it is possible to focus to an object located at a far point.

The second position is a position at which the distance between the second lens unit and the third lens unit becomes the minimum. At the second position, the second lens unit is located nearest to an image in a range of movement. At the second position, it is possible to focus to an object located at a near point.

The third lens unit includes not less than three lens components. Not less than three lens components include the first lens component and the second lens component. The first lens component is a lens component located nearest to the object in the third lens unit. The second lens component is a lens component located second from the object side in the third lens unit.

The first lens component is a single lens and the second lens component is a cemented lens. Accordingly, it is possible to realize a wide-angle optical system in which an angle of view is large, and an aberration within a range of adjustment of the focal position is corrected favorably, and which has a high resolution. Moreover, by the optical system having the high resolution, even when an image sensor with a large number of pixels is used, it is possible to acquire a sharp image corresponding to the large number of pixels.

The second lens unit is moved for the focal-position adjustment. An actuator is used for moving the second lens unit. The actuator is disposed near the second lens unit or near the third lens unit. Therefore, it is necessary to provide a space for disposing the actuator near the second lens unit or near the third lens unit.

By disposing the cemented lens in the third lens unit, it is possible to lower a light-ray height over a wide range from the object side of the second lens unit up to a vicinity of a center of the third lens unit (hereinafter, referred to as 'predetermined range').

By satisfying conditional expression (1), it is possible to lower the light-ray height in the predetermined range. Consequently, it is possible to make small an outer diameter of the second lens unit and an outer diameter of a part of the third lens unit. As a result, it is possible to suppress an increase in an outer diameter of an optical unit even when the actuator is disposed.

It is possible to correct a curvature of field at a cemented surface of the second lens component. When an attempt is made to correct the curvature of field favorably, there is an increase in a tendency of a divergence becoming strong at the cemented surface of the second lens component.

In a case in which a value exceeds an upper limit value of conditional expression (1), correction of the curvature of field becomes difficult. In this case, when an angle of view is made wide, an imaging performance is degraded. Consequently, it becomes difficult to achieve an imaging performance which is necessary as a wide-angle optical system.

In a case in which the value falls below a lower limit value of conditional expression (1), it becomes difficult to lower the light-ray height in the predetermined range. Consequently, an outer diameter of the second lens unit and an outer diameter of a part of the third lens unit become large. As a result, an outer diameter of the optical unit increases.

It is preferable that following conditional expression (1') be satisfied instead of conditional expression (1).

$$-0.50 < (n2C'-n2C)/r2C < -0.08 \quad (1')$$

Moreover, it is more preferable that following conditional expression (1") be satisfied instead of conditional expression (1).

$$-0.45 < (n2C'-n2C)/r2C < -0.10 \quad (1'')$$

As mentioned above, n2C and n2C' denote a refractive index. More elaborately, n2C denotes the refractive index for the d-line of the medium located on the object side of the cemented surface of the second lens component, and adjacent to the cemented surface, and n2C' denotes the refractive index for the d-line of the medium located on the image side of the cemented surface of the second lens component, and adjacent to the cemented surface.

In the wide-angle optical system of the present embodiment, it is preferable that the first lens component have a positive refractive power.

By making such arrangement, it is possible to maintain favorably the imaging performance for a wide angle of view while maintaining the light-ray height in the third lens unit low.

In the wide-angle optical system of the present embodiment, it is preferable that a value of |n2C'−n2C| be not less than 0.25.

By making such arrangement, it is possible to maintain favorably the imaging performance for a wide angle of view while maintaining the light-ray height in the third lens unit low.

In the wide-angle optical system of the present embodiment, it is preferable that the third lens unit include not less than four lens components, and have not less than two cemented surfaces for which a value of a difference in refractive index is not less than 0.25.

Here, the difference in refractive index is a difference between an object-side refractive index and an image-side refractive index, and the object-side refractive index is a refractive index for the d-line of a medium which is located on the object side of a cemented surface of the lens component, and which is adjacent to the cemented surface, and the image-side refractive index is a refractive index for the d-line of a medium which is located on the image side of the cemented surface of the lens component, and which is adjacent to the cemented surface.

By making such arrangement, it is possible to maintain favorably the imaging performance for a wide angle of view while maintaining the light-ray height in the third lens unit low.

In the wide-angle optical system of the present embodiment, it is preferable that the third lens unit include three, four, or five lens components having a positive refractive power.

By making such arrangement, it is possible to maintain favorably the imaging performance for a wide angle of view while maintaining the light-ray height in the third lens unit low.

In the wide-angle optical system of the present embodiment, it is preferable that a cemented lens located nearest to an image in the third lens unit include in order from the object side, a positive lens and a negative lens.

By making such arrangement, it is possible to maintain favorably the imaging performance for a wide angle of view while maintaining the light-ray height in the third lens unit low.

In the wide-angle optical system of the present embodiment, it is preferable that a single lens unit be disposed nearest to the image in the third lens unit, the single lens unit include two single lenses or three single lenses, a cemented lens be disposed adjacent to the single lens unit, on the object side of the single lens unit, and the cemented lens include in order from the object side, a positive lens and a negative lens.

By making such arrangement, it is possible to maintain favorably the imaging performance for a wide angle of view while maintaining the light-ray height in the third lens unit low.

In the wide-angle optical system of the present embodiment, it is preferable that one single lens be disposed nearest to the image in the third lens unit, a cemented lens be disposed adjacent to the single lens, on the object side of the single lens, and the cemented lens include in order from the object side, a positive lens and a negative lens.

By making such arrangement, it is possible to maintain favorably the imaging performance for a wide angle of view while maintaining the light-ray height in the third lens unit low.

In the wide-angle optical system of the present embodiment, it is preferable that following conditional expression (2) be satisfied:

$$0.05 < fL/R31F < 1.2 \tag{2}$$

where,

R31F denotes a radius of curvature of a surface on the object side of the first lens component, and fL denotes a focal length of the wide angle-optical system at the first position.

Conditional expression (2) is a conditional expression in which a convergence of a surface nearest to the object in the third lens unit is regulated. The first lens component is located nearest to the object in the third lens unit. Accordingly, conditional expression (2) is a conditional expression in which the convergence of a surface on the object side of the first lens component is regulated.

The larger the curvature of a lens surface, the stronger is the convergence of light rays at the lens surface. The surface on the object side of the first lens component is located nearest to the object in the third lens unit. By making a curvature of the surface on the object side of the first lens component of an appropriate size, it is possible to suppress the light-ray height at the third lens unit to be low.

In a case in which a value exceeds an upper limit value of conditional expression (2), the spherical aberration and the coma are susceptible to occur, or a manufacturing error sensitivity is susceptible to become high. Even when an image sensor with a large number of pixels is used, acquiring a sharp image corresponding to the large number of pixels becomes difficult. Moreover, securing the desired back focus also becomes difficult. In a case in which the value falls below a lower limit value of conditional expression (2), the light-ray height becomes high. Consequently, in a case in which the wide-angle optical system of the present embodiment is used for an optical system of an endoscope, a diameter of an insertion portion becomes large.

It is preferable that following conditional expression (2') be satisfied instead of conditional expression (2).

$$0.10 < fL/R31F < 0.90 \tag{2'}$$

It is more preferable that following conditional expression (2'') be satisfied instead of conditional expression (2).

$$0.15 < fL/R31F < 0.70 \tag{2''}$$

An optical system which satisfies conditional expression (2) has a value smaller than an upper limit value. As the value for the optical system becomes smaller, it becomes easier to correct an aberration or it becomes easier to secure a desired back focus in that optical system.

For conditional expression (2), it is possible to set a favorable upper limit value. It is preferable to set the upper limit value to any of 0.59729, 0.55, and 0.50. By making such arrangement, it is possible to carry out a favorable aberration correction.

In a case in which favorable aberration correction is to be prioritized, or in a case in which securing the desired back focus is to be prioritized, from 0.20 up to 0.45 can be said to the most appropriate range for conditional expression (2). In a case in which securing a low light-ray height in the predetermined range is to be prioritized, from 0.40 up to 0.65 can be said to be the most appropriate range for conditional expression (2).

In the wide-angle optical system of the present embodiment, it is preferable that the third lens unit include N number of cemented surfaces $S_{Ni}$ (i=1, 2, . . . N), and following conditional expression (3) be satisfied:

$$-1.0 < fL \times \Sigma P_{SNi} < -0.05 \tag{3}$$

where, $P_{SNi}$ denotes a refractive power of the cemented surface $S_{Ni}$, and is expressed by following conditional expression (4)

$$P_{SNi} = (n_{SNi}' - n_{SNi})/r_{SNi} \tag{4}$$

where, $n_{SNi}$ denotes a refractive index for the d-line of a medium located on the object side of the cemented surface $S_{Ni}$, $n_{SNi}'$ denotes a refractive index for the d-line of a medium located on the image side of the cemented surface $S_{Ni}$, $r_{SNi}$ denotes a radius of curvature near an optical axis of the cemented surface $S_{Ni}$, and fL denotes the focal length of the wide-angle optical system at the first position.

Conditional expression (3) is a conditional expression in which the refractive power of the cemented surface in the third lens unit is regulated. In the predetermined range, it is necessary to maintain a state in which a light-beam diameter is thinned. On the other hand, securing a paraxial amount, such as, securing the focal length or securing the back focus, is significant.

For lowering the light-ray height in the predetermined range, in the third lens unit, the lens component located on the object side is made to have a strong convergence. For securing the paraxial amount, it is preferable to dispose a lens component having a strong divergence on an image side of the lens component located on the object side.

In the wide-angle optical system of the present embodiment, the third lens unit includes N number of cemented surfaces $S_{Ni}$. The N number of cemented surfaces SNi are used for the correction of the curvature of field as a main purpose. For the cemented surface $S_{Ni}$, a cemented surface formed by cementing a positive lens having a low refractive index and a negative lens having a high refractive index is used. Therefore, the cemented surface $S_{Ni}$ has a strong divergence.

By disposing the cemented surface $S_{Ni}$ in the third lens unit, it is easily possible to maintain the low light-ray height in the predetermined range and to secure the appropriate paraxial amount. It is preferable to dispose the cemented surface $S_{Ni}$ on the image side of the predetermined range, such as, at a central portion of the third lens unit.

In a case in which a value exceeds an upper limit value of conditional expression (3), the divergence of a light ray on the image side of the predetermined range becomes weak. Consequently, securing the desired paraxial amount becomes difficult or securing the low light-ray height in the predetermined range becomes difficult.

On the other hand, in a case in which the value falls below a lower limit value of conditional expression (3), a spherical aberration and a coma are susceptible to occur or a manufacturing error sensitivity is susceptible to become high. Even when an image sensor with a large number of pixels is used, it becomes difficult to acquire a sharp image corresponding to the large number of pixels.

It is preferable that following conditional expression (3') be satisfied instead of conditional expression (3).

$$-0.9 < fL \times \Sigma P_{SNi} < -0.1 \quad (3')$$

Moreover, it is more preferable that following conditional expression (3") be satisfied instead of conditional expression (3).

$$-0.8 < fL \times \Sigma P_{SNi} < -0.15 \quad (3'')$$

For conditional expression (3), it is possible to set a favorable lower limit value. It is preferable to set the lower limit value to any of −0.71747, −0.65, −0.60, and −0.55. By making such arrangement, it is possible to carry out a favorable aberration correction.

In a case in which favorable aberration correction is to be prioritized, from −0.50 up to −0.20 can be said to be the most appropriate range for conditional expression (3). In a case in which securing the low light-ray height in the predetermined range is to be prioritized, from −0.75 up to −0.45 can be said to be the most appropriate range for conditional expression (3).

By satisfying conditional expression (2) or by satisfying conditional expression (3), it is possible to secure the low light-ray height in the predetermined range or to secure easily the desired paraxial amount. It is even more preferable that both of conditional expression (2) and conditional expression (3) be satisfied.

However, when both of conditional expression (2) and conditional expression (3) are satisfied, correction of an astigmatism is susceptible to be difficult. Therefore, in the third lens unit, it is necessary to correct favorably the astigmatism as well.

As mentioned above, $n_{SNi}$ and $n_{SNi}'$ denote the refractive index. More elaborately, $n_{SNi}$ denotes the refractive index for the d-line of the medium which is located on the object side of the cemented surface $S_{Ni}$ and which is adjacent to the cemented surface $S_{Ni}$, and $n_{SNi}'$ denotes the refractive index for the d-line of the medium which is located on the image side of the cemented surface $S_{Ni}$ and which is adjacent to the cemented surface $S_{Ni}$.

In the wide-angle optical system of the present embodiment, it is preferable that the third lens unit include a cemented lens which is located nearest to the image among the cemented lenses, and a lens component which is located nearest to the image, the cemented lens which is located nearest to the image have a positive refractive power, and the lens component which is located nearest to the image be a positive single lens, and following conditional expression (5) is satisfied:

$$-2 < (R_{3R1} + R_{3R2})/(R_{3R1} - R_{3R2}) < 2 \quad (5)$$

where, $R_{3R1}$ denotes a radius of curvature of a surface on the object side of the positive single lens, and $R_{3R2}$ denotes a radius of curvature of a surface on the image side of the positive single lens.

The third lens unit has the cemented lens which is located nearest to image (hereinafter, referred to as 'cemented lens A'). In a case in which there is one cemented lens disposed in the third lens unit, the cemented lens corresponds to the cemented lens A.

When an optical system is divided into two, an object side and an image side, with a center of the optical system as a boundary between the two, the cemented lens A is located on the image side. In a case in which significance is to be placed on securing an appropriate back focus, the refractive power of the cemented lens A may be made a positive refractive power.

In this case, not only in the object side of the optical system but also in the image side of the optical system, a large positive refractive power is required. For this, it is preferable to make the lens component located nearest to the image a positive single lens, as well as to satisfy conditional expression (5). By making such arrangement, it is possible to suppress the occurrence of astigmatism.

In a case in which a value exceeds an upper limit value of conditional expression (5), or in a case in which the value falls below a lower limit value of conditional expression (5), it becomes difficult to correct the astigmatism favorably.

It is preferable that following conditional expression (5') be satisfied instead of conditional expression (5).

$$-1.6 < (R_{3R1} + R_{3R2})/(R_{3R1} - R_{3R2}) < 1.3 \quad (5')$$

It is more preferable that following conditional expression (5″) be satisfied instead of conditional expression (5).

$$-1.3 < (R_{3R1} + R_{3R2})/(R_{3R1} - R_{3R2}) < 0.8 \quad (5'')$$

In the wide-angle optical system of the present embodiment, it is preferable that the third lens unit include a cemented lens which is located nearest to the image among the cemented lenses, and a lens component which is located nearest to the image, the cemented lens which is located nearest to the image have a negative refractive power, the lens component which is located nearest to the image be a positive single lens, and following conditional expression (6) be satisfied:

$$-5 < ('R_{3R1} + 'R_{3R2})/('R_{3R1} - 'R_{3R2}) < 1 \quad (6)$$

where,
$'R_{3R1}$ denotes a radius of curvature of a surface on the object side of the positive single lens, and
$'R_{3R2}$ denotes a radius of curvature of a surface on the image side of the positive single lens.

There is case in which significance is to be placed on shortening an overall length of the optical system, rather than on securing the appropriate back focus. In this case, since a large positive refractive power becomes necessary on the object side of the optical system, a large negative refractive power becomes necessary on the image side of the optical system.

The cemented lens A, among the cemented lenses, is located nearest to the image. Therefore, by making the refractive power of the cemented lens A a negative refractive power, it is possible to achieve a large negative refractive power on the image side. However, when such an arrangement is made, the astigmatism is susceptible to occur or an angle of emergence of an off-axis light ray is susceptible to become large.

In this case, it is preferable to make the lens component located nearest to the image a positive single lens, and to satisfy conditional expression (6). By making such arrangement, the positive single lens is disposed on a rear side of the cemented lens having a negative refractive power. Consequently, it is possible to cancel an increase in the astigmatism or to cancel an increase in the angle of emergence of the off-axis light ray.

In a case in which a value exceeds an upper limit value of conditional expression (6), the abovementioned cancellation effect is susceptible to become weak. In a case in which the value falls below a lower limit value of conditional expression (6), there is an increase in the occurrence of astigmatism or it is not possible to secure adequately an effective diameter of the positive single lens. When an attempt is made to secure adequately the effective diameter of the positive single lens, the back focus becomes excessively long. Consequently, the overall length of the optical system becomes long.

At the lens component located nearest to the image in the third lens unit, a light-ray height of the off-axis light ray is high. Consequently, when a cemented lens is used for this lens component, a thickness as a lens component is susceptible to increase. As a result, securing an adequate back focus or shortening the overall length of the optical system becomes difficult.

It is preferable that following conditional expression (6′) be satisfied instead of conditional expression (6).

$$-4.7 < ('R_{3R1} + 'R_{3R2})/('R_{3R1} - 'R_{3R2}) < 0.8 \quad (6')$$

Moreover, it is more preferable that following conditional expression (6″) be satisfied instead of conditional expression (6).

$$-4.5 < ('R_{3R1} + 'R_{3R2})/('R_{3R1} - 'R_{3R2}) < 0.6 \quad (6'')$$

In the wide-angle optical system of the present embodiment, it is preferable that a cemented surface located nearest to the image in the third lens unit satisfy following conditional expression (7):

$$-1.0 < fL/r_{SNr} < 0.6 \quad (7)$$

where, $r_{SNr}$ denotes a radius of curvature near the optical axis of the cemented surface located nearest to the image, and
fL denotes the focal length of the wide-angle optical system at the first position.

An off-axis high-order aberration is susceptible to occur at a cemented surface with a large refractive-index difference or at a cemented surface having a large curvature. Astigmatism and chromatic aberration of magnification are examples of the off-axis high-order aberration. For suppressing the occurrence of the off-axis high-order aberration, it is desirable that a position of a center of curvature of a cemented surface be as near as possible to a pupil position of an optical system.

In a case in which a value exceeds an upper limit value of conditional expression (7), or in a case in which the value falls below a lower limit value of conditional expression (7), the off-axis high-order aberration is susceptible to occur.

It is preferable that following conditional expression (7′) be satisfied instead of conditional expression (7).

$$-0.9 < fL/r_{SNr} < 0.0 \quad (7')$$

Moreover, it is more preferable that following conditional expression (7″) be satisfied instead of conditional expression (7).

$$-0.8 < fL/r_{SNr} < -0.3 \quad (7'')$$

At the cemented surface located nearest to the mage in the third lens unit, it is preferable that a positive lens be located on the object side of the cemented surface, and a negative lens be located on the image side of the cemented surface.

As a means for simultaneously realizing suppression of the light-ray height in the predetermined range, aberration correction at the time of designing, and prevention of aberration deterioration at the time of manufacturing, improvement of the degree of freedom of a chromatic-aberration correction is given. For improving the degree of freedom of the chromatic-aberration correction, an appropriate medium is to be used for the medium of a lens.

By setting appropriately a curvature and a thickness of a lens, it is possible to correct the spherical aberration, the coma, and the astigmatism favorably, and by selecting an appropriate glass for the medium of a lens, it is possible to correct the chromatic aberration favorably.

For instance, in an endoscope optical system, a thickness of each lens is large with respect to a focal length of the optical system. In such optical system, it is difficult to achieve both of the correction of longitudinal chromatic aberration and the correction of chromatic aberration of magnification, together.

However, in the wide-angle optical system of the present embodiment, the plurality of lens components is disposed in the third lens unit. Accordingly, it is possible to set appropriately the medium of the lens component located on the object side and the medium of the lens component located on the image side. As a result, it is possible to achieve both of the correction of the longitudinal chromatic aberration and the correction of the chromatic aberration of magnification, together.

In the wide-angle optical system of the present embodiment, it is preferable that the third lens unit include a plurality of positive lenses, the plurality of positive lenses include a first positive lens and a second positive lens, the first positive lens, among the plurality of positive lenses, be a positive lens located nearest to the object, the second positive lens, among the plurality of positive lenses, be a positive lens located second from the object, and following conditional expression (8) be satisfied:

$$-70<\nu_{31P}-\nu_{32P}<20 \tag{8}$$

where, $\nu_{31P}$ denotes an Abbe number for the first positive lens, and $\nu_{32P}$ denotes an Abbe number for the second positive lens.

Conditional expression (8) is a conditional expression in which a relationship of Abbe number for the first positive lens and Abbe number for the second positive lens is regulated. In a case of satisfying conditional expression (8), in a state of both the correction of the longitudinal chromatic aberration and the correction of the chromatic aberration of magnification achieved together, it becomes easy to satisfy various design conditions of an optical systems.

In a case in which a value becomes large on a plus side, for instance, in a case in which the value exceeds an upper limit value of conditional expression (8), the longitudinal chromatic aberration varies in a direction of being corrected excessively, and the chromatic aberration of magnification varies in a direction of being corrected inadequately.

It is preferable that following conditional expression (8') be satisfied instead of conditional expression (8).

$$-65<\nu_{31P}-\nu_{32P}<10 \tag{8'}$$

Moreover, it is more preferable that following conditional expression (8") be satisfied instead of conditional expression (8).

$$-60<\nu_{31P}-\nu_{32P}<5 \tag{8"}$$

In the wide-angle optical system of the present embodiment, it is preferable that the third lens unit include a plurality of positive lenses, the plurality of positive lenses include a first positive lens, a second positive lens, and a third positive lens, the first positive lens, among the plurality of positive lenses, be a positive lens located nearest to the object, the second positive lens, among the plurality of positive lenses, be a positive lens located second from the object, the third positive lens, among the plurality of positive lenses, be a positive lens located third from the object, and following conditional expression (9) be satisfied:

$$-40<\nu_{33P}-(\nu_{31P}+\nu_{32P})/2<60 \tag{9}$$

where, $\nu_{31P}$ denotes the Abbe number for the first positive lens, $\nu_{32P}$ denotes the Abbe number for the second positive lens, and $\nu_{33P}$ denotes an Abbe number for the third positive lens.

Conditional expression (9) is a conditional expression in which a relationship between an average value of Abbe number for the first positive lens and Abbe number for the second positive lens, and Abbe number for the third positive lens is regulated. In a case of satisfying conditional expression (9), in a state of both the correction of the longitudinal chromatic aberration and the correction of the chromatic aberration of magnification achieved together, it becomes easy to satisfy various design conditions of an optical systems.

In a case in which a value becomes large on a minus side, for instance, in a case in which the value falls below a lower limit value of conditional expression (9), the longitudinal chromatic aberration varies in a direction of being corrected excessively, and the chromatic aberration of magnification varies in a direction of being corrected inadequately.

It is preferable that following conditional expression (9') be satisfied instead of conditional expression (9).

$$-30<\nu_{33P}-(\nu_{31P}+\nu_{32P})/2<45 \tag{9'}$$

Moreover, it is more preferable that following conditional expression (9") be satisfied instead of conditional expression (9).

$$-25<\nu_{33P}-(\nu_{31P}+\nu_{32P})/2<40 \tag{9"}$$

In the wide-angle optical system of the present embodiment, it is preferable that the third lens unit include a plurality of negative lenses, the plurality of negative lenses include a first negative lens and a second negative lens, the first negative lens, among the plurality of negative lenses, be a negative lens located nearest to the object, the second negative lens, among the plurality of negative lenses, be a negative lens located second from the object, and following conditional expression (10) be satisfied:

$$-30<\nu_{31N}-\nu_{32N}<40 \tag{10}$$

where, $\nu_{31N}$ denotes an Abbe number for the first negative lens, and $\nu_{32N}$ denotes an Abbe number for the second negative lens.

Conditional expression (10) is a conditional expression in which a relationship of Abbe number for the first negative lens and Abbe number for the second negative lens is regulated. In case of satisfying conditional expression (10), in a state of both the correction of the longitudinal chromatic aberration and the correction of the chromatic aberration of magnification achieved together, it becomes easy to satisfy various design conditions of an optical systems.

In a case in which a value becomes large on a minus side, for instance, in a case in which the value falls below a lower limit value of conditional expression (10), the longitudinal chromatic aberration varies in a direction of being corrected excessively, and the chromatic aberration of magnification varies in a direction of being corrected inadequately.

It is preferable that following conditional expression (10') be satisfied instead of conditional expression (10).

$$-20<\nu_{31N}-\nu_{32N}<30 \tag{10'}$$

Moreover, it is more preferable that following conditional expression (10") be satisfied instead of conditional expression (10).

$$-17<\nu_{31N}-\nu_{32N}<25 \tag{10"}$$

In the wide-angle optical system of the present embodiment, it is preferable that the third lens unit be fixed at the time of carrying out the focal-position adjustment.

In the third lens unit, with respect to an aberration variation, a tendency of a manufacturing error sensitivity becoming high is strong. Even for a small manufacturing error, the aberration varies largely. Therefore, it is preferable to keep the third lens unit fixed at the time of carrying out the focal-position adjustment.

In the wide-angle optical system of the present embodiment, it is preferable that following conditional expression (11) be satisfied:

$$-50<(R21F+R21R)/(R21F-R21R)<10 \tag{11}$$

where, $R_{21F}$ denotes a radius of curvature of a surface on the object side of a predetermined lens component,
$R_{21R}$ denotes a radius of curvature of a surface on the image side of the predetermined lens component, and
the predetermined lens component is a lens component located nearest to the object in the second lens unit.

In a case in which a value exceeds an upper limit value of conditional expression (11), a variation in the spherical aberration at the time of focal-position adjustment or a variation in the astigmatism is susceptible to become large. In a case in which the value falls below a lower limit value of conditional expression (11), a deterioration of the astigmatism and a deterioration of the coma due to decentering are susceptible to occur. As mentioned above, the decentering occurs due to a movement of the second lens unit.

It is preferable that following conditional expression (11') be satisfied instead of conditional expression (11).

$$-40<(R21F+R21R)/(R21F-R21R)<8 \quad (11')$$

Moreover, it is more preferable that following conditional expression (11") be satisfied instead of conditional expression (11).

$$-30<(R21F+R21R)/(R21F-R21R)<6 \quad (11")$$

An optical system which satisfies conditional expression (11) has a value smaller than the upper limit value. As the value in the optical system becomes smaller, it becomes easier to correct the spherical aberration or the astigmatism at the time of focal-position adjustment more favorably in that optical system.

For conditional expression (11), it is possible to set a favorable upper limit value. It is preferable to set the upper limit value to any of 5.33106, 1.0, 0.0, and −1.0. Moreover, from −30.0 up to −2.0 can be said to be the most suitable range from conditional expression (11).

In the wide-angle optical system of the present embodiment, it is preferable that following conditional expression (12) be satisfied:

$$0.2<D21/fL<3.0 \quad (12)$$

where,
D21 denotes a distance on an optical axis between a surface nearest to the object and a surface nearest to the image of the second lens unit, and
fL denotes the focal length of the wide-angle optical system at the first position.

In a case in which a value exceeds an upper limit value of conditional expression (12), a weight of the second lens unit increases or the light-ray height becomes high. As just described, it is susceptible to become disadvantageous from a viewpoint of suppressing the increase in the weight of the second lens unit or suppressing the increase in the light-ray height.

In a case in which the value falls below a lower limit value of conditional expression (12), it becomes difficult to achieve two controls. One control is suppressing the variation in the spherical aberration at the time of focal-position adjustment or suppressing the variation in the astigmatism. The other control is suppressing the deterioration of the coma due to decentering or suppressing the deterioration of the astigmatism. The decentering occurs due to a movement of a moving unit at the time of focal-position adjustment.

It is preferable that following conditional expression (12') be satisfied instead of conditional expression (12).

$$0.2<D21/fL<2.5 \quad (12')$$

Moreover, it is more preferable that following conditional expression (12") be satisfied instead of conditional expression (12).

$$0.4<D21/fL<2.0 \quad (12")$$

An optical system which satisfies conditional expression (12) has a value larger than the lower limit value. As the value in the optical system becomes larger, it becomes easier to achieve both of the abovementioned controls in that optical system.

For conditional expression (12), it is possible to set a favorable lower limit value. It is preferable to set the lower limit value to any of 0.41626, 0.42, 0.43, and 0.44. Moreover, from 0.45 up to 2.0 can be said to be the most appropriate range for conditional expression (12).

In the wide-angle optical system of the present embodiment, it is preferable that following conditional expression (13) be satisfied:

$$1.01<\beta 2F<1.50 \quad (13)$$

where,
$\beta 2F$ denotes a magnification of the second lens unit at the first position.

In a case in which a value exceeds an upper limit value of conditional expression (13), an amount of focus movement with respect to the amount of movement of the second lens unit (hereinafter, referred to as 'focusing sensitivity') becomes excessively high. In this case, an accuracy at the time of stopping the second lens unit (hereinafter, referred to as 'stopping accuracy') becomes excessively high. Consequently, a moving mechanism becomes complicated.

In a case in which a value falls below a lower limit value of conditional expression (13), the focusing sensitivity is susceptible to become low. In this case, since the amount of movement of the second lens unit increases, a space for the movement has to be made wide. Consequently, an optical unit becomes large.

It is preferable that following conditional expression (13') be satisfied instead of conditional expression (13).

$$1.00<\beta 2F<1.40 \quad (13')$$

Moreover, it is more preferable that following conditional expression (13") be satisfied instead of conditional expression (13").

$$1.00<\beta 2F<1.30 \quad (13")$$

In the wide-angle optical system of the present embodiment, it is preferable that following conditional expression (14) be satisfied:

$$1.01<\beta 2N/\beta 2F<1.30 \quad (14)$$

where,
$\beta 2F$ denotes the magnification of the second lens unit at the first position, and
$\beta 2N$ denotes a magnification of the second lens unit at the second position.

In a case in which conditional expression (14) is satisfied, since a focal length at a far point becomes short, it is possible to secure a wide angle of view at a far point. Moreover, since a focal length at a near point becomes long, it is possible to achieve a high magnification at a near point.

An optical system having a wide angle of view at a far point and a high magnification at a near point is appropriate for an optical system of an endoscope. Therefore, it is possible to use the wide-angle optical system of the present embodiment as an optical system for an endoscope.

In an endoscope, for instance, by observing a wide range, it is checked if there is a lesion part. Moreover, when it is confirmed that there is a lesion part, the lesion part is magnified and observed in detail. Therefore, it is preferable that an optical system of an endoscope have a wide angle of view for a far-point observation, and have a high magnification for a near-point observation.

Moreover, in the near-point observation, it is necessary to observe a lesion part in detail. Therefore, in an optical system for an endoscope, it is preferable to have an ability to focus with a high accuracy.

In a case in which a value exceeds an upper limit value of conditional expression (14), the focusing sensitivity at a near-point side becomes high. In this case, the stopping accuracy at the near-point side becomes high. Consequently, it becomes difficult to focus with high accuracy. In a case in which the value falls below a lower limit value of conditional expression (14), securing a wide-angle of view in the far-point observation and securing a high magnification in the near-point observation become difficult. Consequently, it becomes inappropriate for an optical system of an endoscope.

It is preferable that following conditional expression (14') be satisfied instead of conditional expression (14).

$$1.00<\beta 2N/\beta 2F<1.20 \tag{14'}$$

Moreover, it is more preferable that following conditional expression (14") be satisfied instead of conditional expression (14).

$$1.00<\beta 2N/\beta 2F<1.10 \tag{14"}$$

In the wide-angle optical system of the present embodiment, it is preferable that following conditional expression (15) be satisfied:

$$0.10<(1-\beta 2F^2)\times\beta 3F^2<0.55 \tag{15}$$

where, $\beta 2F$ denotes the magnification of the second lens unit at the first position, and $\beta 3F$ denotes a magnification of the third lens unit at the first position.

In a case in which a value exceeds an upper limit value of conditional expression (15), the focusing sensitivity at the far-point side becomes excessively high. In this case, the stopping accuracy at the far-point side becomes high. In a case in which the value falls below a lower limit value of conditional expression (15), the focusing sensitivity at the far-point side is susceptible to become low. In this case, since the amount of movement of the second lens unit increases, the space for the movement has to be made wide. Consequently, the optical unit becomes large.

It is preferable that following conditional expression (15') be satisfied instead of conditional expression (15).

$$0.10<(1-\beta 2F^2)\times\beta 3F^2<0.45 \tag{15'}$$

Moreover, it is more preferable that following conditional expression (15") be satisfied instead of conditional expression (15).

$$0.10<(1-\beta 2F^2)\times\beta 3F^2<0.35 \tag{15"}$$

In the wide-angle optical system of the present embodiment, it is preferable that following conditional expression (16) be satisfied:

$$0.20<(1-\beta 2N^2)\times\beta 3N^2<0.65 \tag{16}$$

where, $\beta 2N$ denotes the magnification of the second lens unit at the second position, and $\beta 3N$ denotes a magnification of the third lens unit at the second position.

In a case in which a value exceeds an upper limit value of conditional expression (16), the focusing sensitivity at the near-point side becomes excessively high. In this case, the stopping accuracy at the near-point side becomes high. In a case in which the value falls below a lower limit value of conditional expression (16), the focusing sensitivity at the near-point side is susceptible to become low. In this case, since the amount of movement of the second lens unit increases, the space for the movement has to be made wide.

It is preferable that following conditional expression (16') be satisfied instead of conditional expression (16).

$$0.20<(1-\beta 2N^2)\times\beta 3N^2<0.50 \tag{16'}$$

Moreover, it is more preferable that following conditional expression (16") be satisfied instead of conditional expression (16).

$$0.22<(1-\beta 2N^2)\times\beta 3N^2<0.42 \tag{16"}$$

In the wide-angle optical system of the present embodiment, it is preferable that the second lens unit include only a positive lens.

By making such arrangement, it is possible to reduce the variation in the astigmatism at the time of focal-position adjustment.

In the wide-angle optical system of the present embodiment, it is preferable that the first lens unit include only a plurality of negative single lenses, and each of the plurality of negative single lenses have Abbe number larger than Abbe number for a positive lens nearest to the object in the third lens unit.

It is not necessary to dispose an actuator in the first lens unit. However, for securing a wide angle of view, an outer diameter of the first lens unit is susceptible to become large. For making the outer diameter of the first lens unit small, a negative refractive power of the first lens unit is to be made large. When the negative refractive power of the first lens unit is made large, an off-axis aberration, particularly the astigmatism, is susceptible to occur.

By disposing the plurality of negative lenses in the first lens unit, it is possible to distribute the negative refractive power of the first lens unit to the plurality of negative lenses. As a result, even when the negative refractive power of the first lens unit is made large, it is possible to correct the off-axis aberration, particularly the astigmatism, favorably.

For making the light-ray height low in an optical system having an extremely wide angle of view, shortening a distance from a surface of incidence up to an entrance-pupil position as much as possible is effective. For this, not disposing a lens which corrects a chromatic aberration in the first lens unit may be one of the options. In a case in which a lens which corrects the chromatic aberration is not disposed in the first lens unit, the first lens unit includes only the single lens.

In this case, the chromatic aberration of magnification is susceptible to occur in the first lens unit. However, it is possible to correct the chromatic aberration of magnification which occurred in the first lens unit, in the third lens unit. At this time, Abbe number for the negative single lens in the first lens unit is to be made larger than Abbe number for the positive lens nearest to the object in the third lens unit.

The positive lens nearest to the object in the third lens unit is located at a distance closest from the negative single lens in the first lens unit. Consequently, correction of the chromatic aberration of magnification becomes possible without the longitudinal chromatic aberration being deteriorated. In a case in which Abbe number for the negative single lens in the first lens unit is smaller than Abbe number for the positive lens nearest to the object in the third lens unit, it becomes difficult to carry out correction of the longitudinal chromatic aberration and correction of the chromatic aberration of magnification simultaneously.

In the wide-angle optical system of the present embodiment, it is preferable that following conditional expression (17) be satisfied:

$$0.20 < SD1/fL < 6.0 \quad (17)$$

where,

SD1 denotes a distance from a vertex nearest to the object in the first lens unit up to a vertex nearest to the image in the first lens unit, and fL denotes the focal length of the wide-angle optical system at the first position.

By satisfying conditional expression (17), it is possible to secure the back focus without making large an outer diameter of the first lens unit, and particularly, an outer diameter of the lens nearest to the object, and it is possible to correct favorably an off-axis aberration such as the astigmatism, even when the angle of view is wide.

In a case in which a value exceeds an upper limit value of conditional expression (17), the outer diameter of the lens nearest to the object is susceptible to become large. In a case in which the value falls below a lower limit value of conditional expression (17), it becomes difficult to secure an appropriate back focus or it becomes difficult correct an off-axis aberration.

It is preferable that following conditional expression (17') be satisfied instead of conditional expression (17).

$$0.25 < SD1/fL < 5.0 \quad (17')$$

Moreover, it is more preferable that following conditional expression (17") be satisfied instead of conditional expression (17).

$$0.30 < SD1/fL < 4.0 \quad (17'')$$

In the wide-angle optical system of the present embodiment, it is preferable that the first lens unit include a fourth lens component and a fifth lens component, the fourth lens component be a lens component located nearest to the object in the first lens unit, the fifth lens component be a lens component located second from the object side in the first lens unit, the fourth lens component include a negative lens component, the fifth lens component include a cemented lens, and following conditional expression (18) be satisfied:

$$-1.0 < fL/R12F_a < 0.5 \quad (18)$$

where, $R12F_a$ denotes a radius of curvature of a surface on the object side of the fifth lens component, and fL denotes the focal length of the wide-angle optical system at the first position.

Since the wide-angle optical system of the present embodiment has a wide angle of view, it is possible to use it for an optical system of an endoscope. In an optical system of an endoscope, from the viewpoint of securing the angle of view, constraints of the aberration correction, and constraints of cleaning, a surface nearest to the object becomes a flat surface or a surface convex toward the object side. Therefore, in the negative lens which is located second from the object side, it is preferable to make an object-side surface a strong diverging surface.

In a case in which a value exceeds an upper limit value of conditional expression (18), the light-ray height in the first lens unit is susceptible to become high. In a case in which the value falls below a lower limit value of conditional expression (18), the astigmatism is susceptible to occur.

The fifth lens component, for instance, is a negative single lens located second from the object side or a negative cemented lens located second from the object side. In a case in which the fifth lens component is a cemented lens, the cemented lens may be formed by a positive lens and a negative lens. The positive lens may be located on the object side or the negative lens may be located on the object side.

It is preferable that following conditional expression (18') be satisfied instead of conditional expression (18).

$$-0.7 < fL/R12F_a < 0.3 \quad (18')$$

Moreover, it is more preferable that following conditional expression (18") be satisfied instead of conditional expression (18).

$$-0.4 < fL/R12F_a < 0.2 \quad (18'')$$

In the wide-angle optical system of the present embodiment, it is preferable that the first lens unit include a fourth lens component, a fifth lens component, and a sixth lens component, the fourth lens component be a lens component located nearest to the object in the first lens unit, the fifth lens component be a lens component located second from the object side in the first lens unit, the sixth lens component be a lens component located third from the object side in the first lens unit, the fourth lens component include a negative lens component, the fifth lens component include a lens component for which an absolute value of refractive power is smaller than an absolute value of a refractive power of the fourth lens component, the sixth lens component include a cemented lens, and following conditional expression (19) be satisfied:

$$-1.0 < fL/R12F_b < 0.5 \quad (19)$$

where, $R12F_b$ denotes a radius of curvature of a surface on the object side of the sixth lens component, and fL denotes the focal length of the wide-angle optical system at the first position.

As mentioned above, in an optical system of an endoscope, the surface located nearest to the object becomes a flat surface or a surface convex toward the object side. Therefore, in the negative lens which located third from the object side, it is preferable to make an object-side surface a strong diverging surface.

In a case in which a value exceeds an upper limit value of conditional expression (19), the light-ray height in the first lens unit is susceptible to become high. In a case in which the value falls below a lower limit value of conditional expression (19), the astigmatism is susceptible to occur.

It is preferable that following conditional expression (19') be satisfied instead of conditional expression (19).

$$-0.7 < fL/R12F_b < 0.3 \quad (19')$$

Moreover, it is more preferable that following conditional expression (19") be satisfied instead of conditional expression (19).

$$-0.4 < fL/R12F_b < 0.2 \quad (19'')$$

In the wide-angle optical system of the present embodiment, it is preferable that the first lens unit include a fourth lens component, a fifth lens component, and a sixth lens component, the fourth lens component be a lens component located nearest to the object in the first lens unit, the fifth lens component be a lens component located second from the object side in the first lens unit, the sixth lens component be a lens component located third from the object side in the first lens unit, the fourth lens component include a negative lens component, the fifth lens component include a negative lens component, and the sixth lens component include a positive lens component, and following conditional expression (20) be satisfied:

$$-1.0<fL/R12F_c<0.5 \quad (20)$$

where,

R12F$_c$ denotes a radius of curvature of a surface on the object side of the fifth lens component, and fL denotes the focal length of the wide-angle optical system at the first position.

As mentioned above, in an optical system for an endoscope, the surface located nearest to the object becomes a flat surface or a surface convex toward the object side. Therefore, in the negative lens which is located second from the object side, it is preferable to make an object-side surface a strong diverging surface.

In a case in which a value exceeds an upper limit value of conditional expression (20), the light-ray height in the first lens unit is susceptible to become high. In a case in which the value falls below a lower limit value of conditional expression (20), the astigmatism is susceptible to occur.

It is preferable that following conditional expression (20') be satisfied instead of conditional expression (20).

$$-0.7<fL/R12F_c<0.3 \quad (20')$$

Moreover, it is more preferable that following conditional expression (20") be satisfied instead of conditional expression (20).

$$-0.4<fL/R12F_c<0.2 \quad (20")$$

In the wide-angle optical system of the present embodiment, it is preferable that the first lens unit include a negative lens component and a positive lens component, and following conditional expression (21) be satisfied:

$$-0.4<fL/R12R<0.02 \quad (21)$$

where,

R$_{12R}$ denotes a radius of curvature of a surface on the image side of the positive lens component, and fL denotes the focal length of the wide-angle optical system at the first position.

Using the negative lens component and the positive lens component in the first lens unit, it is somewhat disadvantageous from a viewpoint of making an outer diameter small. However, by using the negative lens component and the positive lens component in the first lens unit, it becomes easy to carry out correction of the astigmatism and correction of the chromatic aberration of magnification.

In a case in which a value exceeds an upper limit value of conditional expression (21), an effect of correcting the astigmatism becomes small. In a case in which the value falls below a lower limit value of conditional expression (21), a distortion becomes large.

It is preferable that following conditional expression (21') be satisfied instead of conditional expression (21).

$$-0.3<fL/R12R<0.0 \quad (21')$$

Moreover, it is more preferable that following conditional expression (21") be satisfied instead of conditional expression (21).

$$-0.2<fL/R12R<-0.02 \quad (21")$$

In the wide-angle optical system of the present embodiment, it is preferable that the first lens unit include a fourth lens component and a fifth lens component, the fourth lens component be a lens component located nearest to the object in the first lens unit, the fifth lens component be a lens component located second from the object side in the first lens unit, and following conditional expression (22) be satisfied:

$$-1.0<fL/fL12<0.4 \quad (22)$$

where, fL12 denotes a focal length of the fifth lens component, and fL denotes the focal length of the wide-angle optical system at the first position.

In a case in which a value exceeds an upper limit value of conditional expression (22), it is not possible to achieve much effect of size reduction of the fourth component. In a case in which the value falls below a lower limit value of conditional expression (22), it is not possible to achieve much effect of correction of the off-axis aberration.

It is preferable that following conditional expression (22') be satisfied instead of conditional expression (22).

$$-0.7<fL/fL12<0.2 \quad (22')$$

Moreover, it is more preferable that following conditional expression (22") be satisfied instead of conditional expression (22).

$$-0.5<fL/fL12<0.05 \quad (22")$$

In the wide-angle optical system of the present embodiment, it is preferable that following conditional expression (23) be satisfied:

$$100\times|f_{fin}|<|R_{fin}| \quad (23)$$

where, f$_{fin}$ denotes a focal length of an image-side lens component, and R$_{fin}$ denotes a radius of curvature of a surface on the image side of the image-side lens component, and the image-side lens component, among the plurality of lens components, is a lens component located nearest to the image.

In an optical system, an optical element having a zero refractive power is disposed between an image-side lens component and an image plane in many cases. An optical element having zero refractive power is an optical filter or a prism, for example. In a case in which conditional expression (23) is satisfied, it becomes easier both of securing a space for disposing the optical element having a zero refractive power and favorable correction of ng achieve both of the astigmatism.

In conditional expression (5) and conditional expression (6), for the lens component located nearest to the image, the radius of curvature of the surface is regulated. In conditional expression (23), for the image-side lens component, the radius of curvature of the surface is regulated. The image-side lens component is a lens component located nearest to the image. Accordingly, conditional expression (23), practically, can be said to be a conditional expression regulating conditional expression (5) and conditional expression (6).

It is preferable that the wide-angle optical system of the present embodiment include the image-side lens component and an optical element having zero refractive power, wherein the image-side lens component, among the plurality of lens components, be located nearest to the image, the optical element be located on the image side of the image-side lens component, and the image-side lens component and the optical element be cemented.

In an optical system, an optical element having a zero refractive power is disposed between an image-side lens component and an image plane in many cases. An optical element having zero refractive power is an optical filter or a prism, for example. By cementing the image-side lens component and the optical element, it is possible to prevent degradation of an imaging performance due to decentering.

In the wide-angle optical system of the present embodiment, it is preferable that following conditional expression (24) be satisfied:

$$2 \times y_{max} < fL \times \tan \omega_{max} \quad (24)$$

where, $y_{max}$ denotes a maximum image height, $\omega_{max}$ denotes an angle of view corresponding to the maximum image height, and fL denotes the focal length of the wide-angle optical system at the first position.

The wide-angle optical system of the present embodiment is an optical system which has a high resolution and a small outer diameter, and an actuator necessary for the focal-position adjustment disposed therein. Accordingly, it is possible to use the wide-angle optical system of the present embodiment for an optical system of an endoscope.

For using the wide-angle optical system of the present embodiment for an optical system of an endoscope, it is preferable that an angle of view of not less than 100 degrees be secured, for instance. In an optical system having an angle of view of not less than 100 degrees, an occurrence of a distortion is acceptable. Accordingly, such optical system does not satisfy following expression (A). Expression (A) is a condition with no distortion.

$$Y_{max} = fL \times \tan \omega_{max} \quad (A)$$

Instead, the wide-angle optical system of the present embodiment satisfies conditional expression (24). By satisfying conditional expression (24), it is possible to make an outer diameter of an optical unit small while securing a wide angle of view. Accordingly, it is possible to use the wide-angle optical system of the present embodiment for an optical system of an endoscope.

In the wide-angle optical system of the present embodiment, it is preferable that following conditional expression (25) be satisfied:

$$ER2 < 4 \times fL / F_{EX} \quad (25)$$

where,

ER2 denotes an effective radius of a surface nearest to the image of the second lens component, $F_{EX}$ denotes an effective F-value at the first position, and fL denotes the focal length of the wide-angle optical system at the first position.

Conditional expression (25) is a conditional expression related to the light-ray height. By satisfying conditional expression (25), it is possible to use the wide-angle optical system of the present embodiment for an optical system of an endoscope. The effective radius is determined by the height of an outermost light ray in a plane.

An image pickup apparatus of the present embodiment includes an optical system, and an image sensor which is disposed on an image plane, wherein the image sensor has an image pickup surface, and converts an image formed on the image pickup surface by the optical system to an electric signal, and the optical system is the abovementioned wide-angle optical system.

According to the image pickup apparatus of the present embodiment, even when an image sensor with a large number of pixels is used, it is possible to acquire a sharp image corresponding to the large number of pixels.

Embodiments and examples of a wide-angle optical system will be described below in detail by referring to the accompanying diagrams. However, the present disclosure is not restricted to the embodiments and the examples described below.

Lens cross-sectional views of each example will be described below.

FIG. 1A, FIG. 2A, FIG. 3A, FIG. 4A, FIG. 5A, FIG. 6A, FIG. 7A, FIG. 8A, FIG. 9A, FIG. 10A, FIG. 11A, FIG. 12A, FIG. 13A, and FIG. 14A are cross-sectional views at a far point.

FIG. 1B, FIG. 2B, FIG. 3B, FIG. 4B, FIG. 5B, FIG. 6B, FIG. 7B, FIG. 8B, FIG. 9B, FIG. 10B, FIG. 11B, FIG. 12B, FIG. 13B, and FIG. 14B are cross-sectional views at a near point.

A first lens unit is denoted by G1, a second lens unit is denoted by G2, a third lens unit is denoted by G3, an aperture stop is denoted by S, a filter is denoted by F, a cover glass is denoted by C, a prism is denoted by P. and an image plane (image pickup surface) is denoted by I.

Aberration diagrams of each example will be described below. Aberration diagrams are shown in order of aberration diagrams at a far point and aberration diagrams at a near point.

Aberration diagrams at a far point are as follow.

FIG. 15A, FIG. 16A, FIG. 17A, FIG. 18A, FIG. 19A, FIG. 20A, FIG. 21A, FIG. 22A, FIG. 23A, FIG. 24A, FIG. 25A, FIG. 26A, FIG. 27A, and FIG. 28A show a spherical aberration (SA) FIG. 15B, FIG. 16B, FIG. 17B, FIG. 18B, FIG. 19B, FIG. 20B, FIG. 21B, FIG. 22B, FIG. 23B, FIG. 24B, FIG. 25B, FIG. 26B, FIG. 27B, and FIG. 28B show an astigmatism (AS).

FIG. 15C, FIG. 16C, FIG. 17C, FIG. 18C, FIG. 19C, FIG. 20C, FIG. 21C, FIG. 22C, FIG. 23C, FIG. 24C, FIG. 25C, FIG. 26C, FIG. 27C, and FIG. 28C show a chromatic aberration of magnification (CC).

FIG. 15D, FIG. 16D, FIG. 17D, FIG. 18D, FIG. 19D, FIG. 20D, FIG. 21D, FIG. 22D, FIG. 23D, FIG. 24D, FIG. 25D, FIG. 26D, FIG. 27D, and FIG. 28D show a distortion (DT).

Aberration diagrams at a near point are as follow.

FIG. 15E, FIG. 16E, FIG. 17E, FIG. 18E, FIG. 19E, FIG. 20E, FIG. 21E, FIG. 22E, FIG. 23E, FIG. 24E, FIG. 25E, FIG. 26E, FIG. 27E, and FIG. 28E show a spherical aberration (SA).

FIG. 15F, FIG. 16F, FIG. 17F, FIG. 18F, FIG. 19F, FIG. 20F, FIG. 21F, FIG. 22F, FIG. 23F, FIG. 24F, FIG. 25F, FIG. 26F, FIG. 27F, and FIG. 28F show an astigmatism (AS).

FIG. 15G, FIG. 16G, FIG. 17G, FIG. 18G, FIG. 19G, FIG. 20G, FIG. 21G, FIG. 22G, FIG. 23G, FIG. 24G, FIG. 25G, FIG. 26G, FIG. 27G, and FIG. 28G show a chromatic aberration of magnification (CC).

FIG. 15H, FIG. 16H, FIG. 17H, FIG. 18H, FIG. 19H, FIG. 20H, FIG. 21H, FIG. 22H, FIG. 23H, FIG. 24H, FIG. 25H, FIG. 26H, FIG. 27H, and FIG. 28H show a distortion (DT).

A wide-angle optical system of an example 1 includes in order from an object side, a first lens unit G1 having a negative refractive power, a second lens unit G2 having a positive refractive power, and a third lens unit G3 having a positive refractive power.

The first lens unit G1 includes a planoconcave negative lens L1, a biconcave negative lens L2, and a positive meniscus lens L3 having a convex surface directed toward the object side.

The second lens unit G2 includes a positive meniscus lens L4 having a convex surface directed toward the object side.

The third lens unit G3 includes a positive meniscus lens L5 having a convex surface directed toward the object side, a negative meniscus lens L6 having a convex surface directed toward the object side, a biconvex positive lens L7, a positive meniscus lens L8 having a convex surface directed toward an image side, a biconcave negative lens L9, a positive meniscus lens L10 having a convex surface directed toward the image side, and a biconvex positive lens L11.

The negative meniscus lens L6 and the biconvex positive lens L7 are cemented. The positive meniscus lens L8 and the biconcave negative lens L9 are cemented.

A filter F is disposed in the first lens unit G1. An aperture stop S is disposed between the second lens unit G2 and the third lens unit G3. A cover glass C is disposed on an image side of the third lens unit G3.

In an adjustment of a focal position, the second lens unit G2 is moved. At the time of adjustment from a far point to a near point, the second lens unit G2 is moved toward the image side.

A wide-angle optical system of an example 2 includes in order from an object side, a first lens unit G1 having a negative refractive power, a second lens unit G2 having a positive refractive power, and a third lens unit G3 having a positive refractive power.

The first lens unit G1 includes a negative meniscus lens L1 having a convex surface directed toward the object side, a biconcave negative lens L2, and a positive meniscus lens L3 having a convex surface directed toward the object side.

The second lens unit G2 includes a positive meniscus lens L4 having a convex surface directed toward the object side.

The third lens unit G3 includes a positive meniscus lens L5 having a convex surface directed toward the object side, a negative meniscus lens L6 having a convex surface directed toward the object side, a biconvex positive lens L7, a positive meniscus lens L8 having a convex surface directed toward an image side, a biconcave negative lens L9, a biconvex positive lens L10, and a biconvex positive lens L11.

The negative meniscus lens L6 and the biconvex positive lens L7 are cemented. The positive meniscus lens L8 and the biconcave negative lens L9 are cemented.

A filter F is disposed in the first lens unit G1. An aperture stop S is disposed between the second lens unit G2 and the third lens unit G3. A cover glass C is disposed on an image side of the third lens unit G3.

In an adjustment of a focal position, the second lens unit G2 is moved. At the time of adjustment from a far point to a near point, the second lens unit G2 is moved toward the image side.

A wide-angle optical system of an example 3 includes in order from an object side, a first lens unit G1 having a negative refractive power, a second lens unit G2 having a positive refractive power, and a third lens unit G3 having a positive refractive power.

The first lens unit G1 includes a negative meniscus lens L1 having a convex surface directed toward the object side, a biconcave negative lens L2, and a positive meniscus lens L3 having a convex surface directed toward the object side.

The second lens unit G2 includes a positive meniscus lens L4 having a convex surface directed toward the object side.

The third lens unit G3 includes a positive meniscus lens L5 having a convex surface directed toward the object side, a positive meniscus lens L6 having a convex surface directed toward the object side, a biconvex positive lens L7, a positive meniscus lens L8 having a convex surface directed toward an image side, biconcave negative lens L9, a positive meniscus lens L10 having a convex surface directed toward the image side, and a biconvex positive lens L11.

The positive meniscus lens L6 and the biconvex positive lens L7 are cemented. The positive meniscus lens L8 and the biconcave negative lens L9 are cemented.

A filter F is disposed in the first lens unit G1. An aperture stop S is disposed between the second lens unit G2 and the third lens unit G3. A cover glass C is disposed on an image side of the third lens unit G3.

In an adjustment of a focal position, the second lens unit G2 is moved. At the time of adjustment from a far point to a near point, the second lens unit G2 is moved toward the image side.

A wide-angle optical system of an example 4 includes in order from an object side, a first lens unit G1 having a negative refractive power, a second lens unit G2 having a positive refractive power, and a third lens unit G3 having a positive refractive power.

The first lens unit G1 includes a negative meniscus lens L1 having a convex surface directed toward the object side, a biconcave negative lens L2, and a positive meniscus lens L3 having a convex surface directed toward the object side.

The second lens unit G2 includes a positive meniscus lens L4 having a convex surface directed toward the object side.

The third lens unit G3 includes a positive meniscus lens L5 having a convex surface directed toward the object side, a biconcave negative lens L6, a biconvex positive lens L7, a positive meniscus lens L8 having a convex surface directed toward an image side, a biconcave negative lens L9, a biconvex positive lens L10, and a positive meniscus lens L11 having a convex surface directed toward the object side.

The biconcave negative lens L6 and the biconvex positive lens L7 are cemented. The positive meniscus lens L8 and the biconcave negative lens L9 are cemented.

A filter F is disposed in the first lens unit G1. An aperture stop S is disposed between the second lens unit G2 and the third lens unit G3. A cover glass C is disposed on an image side of the third lens unit G3.

In an adjustment of a focal position, the second lens unit G2 is moved. At the time of adjustment from a far point to a near point, the second lens unit G2 is moved toward the image side.

A wide-angle optical system of an example 5 includes in order from an object side, a first lens unit G1 having a negative refractive power, a second lens unit G2 having a positive refractive power, and a third lens unit G3 having a positive refractive power.

The first lens unit G1 includes a negative meniscus lens L1 having a convex surface directed toward the object side, a biconcave negative lens L2, and a positive meniscus lens L3 having a convex surface directed toward the object side.

The second lens unit G2 includes a positive meniscus lens L4 having a convex surface directed toward the object side.

The third lens unit G3 includes a positive meniscus lens L5 having a convex surface directed toward the object side, a negative meniscus lens L6 having a convex surface directed toward the object side, a biconvex positive lens L7, a biconvex positive lens L8, a biconcave negative lens L9, a biconvex positive lens L10, and a positive meniscus lens L11 having a convex surface directed toward the object side.

The negative meniscus lens L6 and the biconvex positive lens L7 are cemented. The biconvex positive lens L8 and the biconcave negative lens L9 are cemented.

A filter F is disposed in the first lens unit G1. An aperture stop S is disposed between the second lens unit G2 and the third lens unit G3. A cover glass C is disposed on an image side of the third lens unit G3.

In an adjustment of a focal position, the second lens unit G2 is moved. At the time of adjustment from a far point to a near point, the second lens unit G2 is moved toward the image side.

A wide-angle optical system of an example 6 includes in order from an object side, a first lens unit G1 having a negative refractive power, a second lens unit G2 having a positive refractive power, and a third lens unit G3 having a positive refractive power.

The first lens unit G1 includes a planoconcave negative lens L1, a biconcave negative lens L2, and a positive meniscus lens L3 having a convex surface directed toward an image side.

The second lens unit G2 includes a positive meniscus lens L4 having a convex surface directed toward the object side.

The third lens unit G3 includes a positive meniscus lens L5 having a convex surface directed toward the object side, a biconvex positive lens L6, a negative meniscus lens L7 having a convex surface directed toward the image side, a biconvex positive lens L8, a biconcave negative lens L9, a biconvex positive lens L10, a biconvex positive lens L11, and a planoconvex positive lens L12.

The biconvex positive lens L6 and the negative meniscus lens L7 are cemented. The biconvex positive lens L8 and the biconcave negative lens L9 are cemented.

A filter F is disposed in the first lens unit G1. An aperture stop S is disposed in the third lens unit G3. A cover glass C is disposed on an image side of the third lens unit G3. The planoconvex positive lens L12 and the cover glass C are cemented.

In an adjustment of a focal position, the second lens unit G2 is moved. At the time of adjustment from a far point to a near point, the second lens unit G2 is moved toward the image side.

A wide-angle optical system of an example 7 includes in order from an object side, a first lens unit G1 having a negative refractive power, a second lens unit G2 having a positive refractive power, and a third lens unit G3 having a positive refractive power.

The first lens unit G1 includes a planoconcave negative lens L1, a biconcave negative lens L2, and a negative meniscus lens L3 having a convex surface directed toward an image side.

The second lens unit G2 includes a positive meniscus lens L4 having a convex surface directed toward the object side.

The third lens unit G3 includes a positive meniscus lens L5 having a convex surface directed toward the object side, a biconvex positive lens 16, a negative meniscus lens L7 having a convex surface directed toward the image side, a biconvex positive lens L8, a biconcave negative lens L9, a biconvex positive lens L10, a biconvex positive lens L11, and a planoconvex positive lens L12.

The biconvex positive lens L6 and the negative meniscus lens L7 are cemented. The biconvex positive lens L8 and the biconcave negative lens L9 are cemented.

A filter F is disposed in the first lens unit G1. An aperture stop S is disposed in the third lens unit G3. A cover glass C is disposed on an image side of the third lens unit G3. The planoconvex positive lens L12 and the cover glass C are cemented.

In an adjustment of a focal position, the second lens unit G2 is moved. At the time of adjustment from a far point to a near point, the second lens unit G2 is moved toward the image side.

A wide-angle optical system of an example 8 includes in order from an object side, a first lens unit G1 having a negative refractive power, a second lens unit G2 having a positive refractive power, and a third lens unit G3 having a positive refractive power.

The first lens unit G1 includes a planoconcave negative lens L1, a biconcave negative lens L2, and a biconvex positive lens L3. The biconcave negative lens L2 and the biconvex positive lens L3 are cemented.

The second lens unit G2 includes a positive meniscus lens L4 having a convex surface directed toward the object side.

The third lens unit G3 includes a biconvex positive lens L5, a biconcave negative lens L6, a biconvex positive lens L7, a positive meniscus lens L8 having a convex surface directed toward an image side, a negative meniscus lens L9 having a convex surface directed toward the image side, and a biconvex positive lens L10.

The biconcave negative lens L6 and the biconvex positive lens L7 are cemented. The positive meniscus lens L8 and the negative meniscus lens L9 are cemented.

A filter F is disposed in the first lens unit G1. An aperture stop S is disposed in the third lens unit G3. A cover glass C1, a prism P, and a cover glass C2 are disposed on an image side of the third lens unit G3.

In an adjustment of a focal position, the second lens unit G2 is moved. At the time of adjustment from a far point to a near point, the second lens unit G2 is moved toward the image side.

A wide-angle optical system of an example 9 includes in order from an object side, a first lens unit G1 having a negative refractive power, a second lens unit G2 having a positive refractive power, and a third lens unit G3 having a positive refractive power.

The first lens unit G1 includes a planoconcave negative lens L1.

The second lens unit G2 includes a positive meniscus lens L2 having a convex surface directed toward an image side.

The third lens unit G3 includes a biconvex positive lens L3, a biconcave negative lens L4, a biconvex positive lens L5, a positive meniscus lens L6 having a convex surface directed toward the image side, a negative meniscus lens L7 having a convex surface directed toward the image side, and a biconvex positive lens L8.

The biconcave negative lens L4 and the biconvex positive lens L5 are cemented. The positive meniscus lens L6 and the negative meniscus lens L7 are cemented.

A filter F is disposed between the first lens unit G1 and the second lens unit G2. An aperture stop S is disposed in the third lens unit G3. A cover glass C1, a prism P, and a cover glass C2 are disposed on an image side of the third lens unit G3.

In an adjustment of a focal position, the second lens unit G2 is moved. At the time of adjustment from a far point to a near point, the second lens unit G2 is moved toward the image side.

A wide-angle optical system of an example 10 includes in order from an object side, a first lens unit G1 having a negative refractive power, a second lens unit G2 having a positive refractive power, and a third lens unit G3 having a positive refractive power.

The first lens unit G1 includes a planoconcave negative lens L1 and a negative meniscus lens L2 having a convex surface directed toward the object side.

The second lens unit G2 includes a positive meniscus lens L3 having a convex surface directed toward the object side.

The third lens unit G3 includes a biconvex positive lens L4, a biconcave negative lens L5, a biconvex positive lens L6, a positive meniscus lens L7 having a convex surface directed toward an image side, a negative meniscus lens L8 having a convex surface directed toward the image side, and a biconvex positive lens L9.

The biconcave negative lens L5 and the biconvex positive lens L6 are cemented. The positive meniscus lens L7 and the negative meniscus lens L8 are cemented.

A filter F is disposed between the first lens unit G1 and the second lens unit G2. An aperture stop S is disposed in the third lens unit G3. A cover glass C1, a prism P, and a cover glass C2 are disposed on an image side of the third lens unit G3.

In an adjustment of a focal position, the second lens unit G2 is moved. At the time of adjustment from a far point to a near point, the second lens unit G2 is moved toward the image side. The filter F is moved together with the second lens unit G2.

A wide-angle optical system of an example 11 includes in order from an object side, a first lens unit G1 having a negative refractive power, a second lens unit G2 having a positive refractive power, and a third lens unit G3 having a positive refractive power.

The first lens unit G1 includes a planoconcave negative lens L1, a biconcave negative lens L2, and a positive meniscus lens L3 having a convex surface directed toward the object side. The biconcave negative lens L2 and the positive meniscus lens L3 are cemented.

The second lens unit G2 includes a positive meniscus lens L4 having a convex surface directed toward the object side.

The third lens unit G3 includes a positive meniscus lens L5 having a convex surface directed toward the object side, a negative meniscus lens L6 having a convex surface directed toward the object side, a biconvex positive lens L7, a negative meniscus lens L8 having a convex surface directed toward the object side, a biconvex positive lens L9, and a planoconvex positive lens L10.

The negative meniscus lens L6 and the biconvex positive lens L7 are cemented. The negative meniscus lens L8 and the biconvex positive lens L9 are cemented.

A filter F is disposed in the first lens unit G1. An aperture stop S is disposed in the third lens unit G3. A cover glass C is disposed on an image side of the third lens unit G3. The planoconvex positive lens L10 and the cover glass C are cemented.

In an adjustment of a focal position, the second lens unit G2 is moved. At the time of adjustment from a far point to a near point, the second lens unit G2 is moved toward an image side.

A wide-angle optical system of an example 12 includes in order from an object side, a first lens unit G1 having a negative refractive power, a second lens unit G2 having a positive refractive power, and a third lens unit G3 having a positive refractive power.

The first lens unit G1 includes a planoconcave negative lens L1, a biconcave negative lens L2, and a biconvex positive lens L3. The biconcave negative lens L2 and the biconvex positive lens L3 are cemented.

The second lens unit G2 includes a positive meniscus lens L4 having a convex surface directed toward the object side.

The third lens unit G3 includes a biconvex positive lens L5, a biconvex positive lens 6, a negative meniscus lens L7 having a convex surface directed toward an image side, and a planoconvex positive lens L8. The biconvex positive lens L6 and the negative meniscus lens L7 are cemented.

An aperture stop S is disposed between the second lens unit G2 and the third lens unit G3. A filter F is disposed in the third lens unit G3. A cover glass C is disposed on an image side of the third lens unit G3. The planoconvex positive lens L8 and the cover glass C are cemented.

In an adjustment of a focal position, the second lens unit G2 is moved. At the time of adjustment from a far point to a near point, the second lens unit G2 is moved toward the image side.

A wide-angle optical system of an example 13 includes in order from an object side, a first lens unit G1 having a negative refractive power, a second lens unit G2 having a positive refractive power, and a third lens unit G3 having a positive refractive power.

The first lens unit G1 includes a planoconcave negative lens L1 and a positive meniscus lens L2 having a convex surface directed toward an image side.

The second lens unit G2 includes a biconvex positive lens L3.

The third lens unit G3 includes a positive meniscus lens L4 having a convex surface directed toward the object side, a negative meniscus lens L5 having a convex surface directed toward the object side, a biconvex positive lens L6, a biconvex positive lens L7, a negative meniscus lens L8 having a convex surface directed toward the image side, and a planoconvex positive lens L9.

The negative meniscus lens L5 and the biconvex positive lens L6 are cemented. The biconvex positive lens L7 and the negative meniscus lens L8 are cemented.

An aperture stop S and a filter F are disposed in the third lens unit G3. A cover glass C is disposed on an image side of the third lens unit G3. The planoconvex positive lens L9 and the cover glass C are cemented.

In an adjustment from a far point to a near point, the second lens unit G2 is moved. At the time of adjustment from a far point to a near point, the second lens unit G2 is moved toward the image side.

A wide-angle optical system of an example 14 includes in order from an object side, a first lens unit G1 having a negative refractive power, a second lens unit G2 having a positive refractive power, and a third lens unit G3 having a positive refractive power.

The first lens unit G1 includes a planoconcave negative lens L1, a biconcave negative lens L2, and a biconvex positive lens L3. The biconcave negative lens L2 and the biconvex positive lens L3 are cemented.

The second lens unit G2 includes a positive meniscus lens L4 having a convex surface directed toward the object side.

The third lens unit G3 includes a planoconvex positive lens L5, a negative meniscus lens L6 having a convex surface directed toward the objet side, a planoconvex positive lens L7, a biconvex positive lens L8, a negative meniscus lens L9 having a convex surface directed toward an image side, and a planoconvex positive lens L10.

The negative meniscus lens L6 and the planoconvex positive lens L7 are cemented. The biconvex positive lens L8 and the negative meniscus lens L9 are cemented.

An aperture stop S and a filter F are disposed in the third lens unit G3. A cover glass C is disposed on an image side of the third lens unit G3. The planoconvex positive lens L10 and the cover glass C are cemented.

In an adjustment of a focal position, the second lens unit G2 is moved. At the time of adjustment from a far point to a near point, the second lens unit G2 is moved toward the image side.

Numerical data of each example described above is shown below. In Surface data, r denotes radius of curvature of each lens surface, d denotes a distance between respective lens surfaces, nd denotes a refractive index of each lens for a d-line, vd denotes an Abbe number for each lens and * denotes an aspherical surface. A stop is an aperture stop.

Moreover, in Various data, OBJ denotes an object distance, FL denotes a focal length of the entire system, MG denotes a magnification of the entire system, FNO. denotes an F number, FIY and FIM denote an image height, LTL denotes a lens total length of the optical system, and FB denotes a back focus. The back focus is a unit which is expressed upon air conversion of a distance from a rearmost lens surface to a paraxial image surface. The lens total length is a distance from a frontmost lens surface to the rearmost lens surface plus back focus. Moreover, β1 denotes a magnification of the first lens unit, β2 denotes a magnification of the second lens unit, β3 denotes a magnification of the third lens unit.

Further, in Unit focal length, each of f1, f2 . . . is a focal length of each lens unit.

A shape of an aspherical surface is defined by the following expression where the direction of the optical axis is represented by z, the direction orthogonal to the optical axis is represented by y, a conical coefficient is represented by K, aspherical surface coefficients are represented by A4, A6, A8, A10, A12 . . .

$$Z=(y^2/r)/[1+\{1-(1+k)(y/r)^2\}^{1/2}]+A4y^4+A6y^6+A8y^8+A10y^{10}+A12y^{12}+ \ldots$$

Further, in the aspherical surface coefficients, 'E-n' (where, n is an integral number) indicates '10$^{-n}$'. Moreover, these symbols are commonly used in the following numerical data for each example.

Example 1

Unit mm
Surface data

| Surface no. | r | d | nd | vd | ER |
|---|---|---|---|---|---|
| Object plane | ∞ | 21.0000 | 1. | | |
| 1 | ∞ | 0.3700 | 1.88300 | 40.76 | 1.881 |
| 2 | 1.8089 | 0.6000 | 1. | | 1.306 |
| 3 | ∞ | 0.4000 | 1.51633 | 64.14 | 1.293 |
| 4 | ∞ | 0.1633 | 1. | | 1.209 |
| 5 | −7.7140 | 0.2984 | 1.88300 | 40.76 | 1.185 |
| 6 | 3.9041 | 0.0965 | 1. | | 1.135 |
| 7 | 2.4546 | 0.8446 | 1.92286 | 18.90 | 1.157 |
| 8 | 3.1566 | d8 | 1. | | 1.013 |
| 9 | 2.2403 | 1.5268 | 1.49700 | 81.54 | 0.981 |
| 10 | 3.3915 | d10 | 1. | | 0.697 |
| 11 (Stop) | ∞ | 0.0783 | 1. | | 0.460 |
| 12* | 4.0614 | 0.3192 | 1.88300 | 40.76 | 0.485 |
| 13* | 11.1597 | 0.0830 | 1. | | 0.526 |
| 14 | 2.0140 | 0.3000 | 1.88300 | 40.76 | 0.578 |
| 15 | 1.5060 | 0.8356 | 1.51742 | 52.43 | 0.586 |
| 16 | −1.5170 | 0.0934 | 1. | | 0.663 |
| 17 | −10.3264 | 1.2276 | 1.51633 | 64.14 | 0.654 |
| 18 | −1.3625 | 0.2968 | 1.84666 | 23.78 | 0.649 |
| 19 | 1.8989 | 0.2849 | 1. | | 0.704 |
| 20 | −48.9192 | 0.5397 | 1.72916 | 54.68 | 0.805 |
| 21 | −2.6727 | 0.0956 | 1. | | 0.941 |
| 22 | 3.6698 | 0.5463 | 1.88300 | 40.76 | 1.093 |
| 23 | −86.8018 | 0.3500 | 1. | | 1.101 |
| 24 | ∞ | 1.4000 | 1.51633 | 64.14 | 1.111 |
| 25 | ∞ | 0.0757 | 1. | | 1.137 |
| Image plane | ∞ | 0. | | | |

Aspherical Surface Data
12th Surface
K=0.
A2=0.0000E+00,A4=2.2626E−02,A6=−1.5521E−01,
A8=7.9970E−01,
A10=−1.6090E+00,A12=−1.8424E−01,A14=1.3225E+00,
A16=0.0000E+00,A18=0.0000E+00,A20=0.0000E+00
13th Surface
K=0.
A2=0.0000E+00,A4=5.9775E−02,A6=−3.6261E−02,
A8=2.2828E−01,
A10=−3.7908E−01,A12=7.3652E−02,A14=−4.9792E−01,
A16=0.0000E+00,A18=0.0000E+00,A20=0.0000E+00

Various data

| | Far Point | Near point |
|---|---|---|
| OBJ | 21.0000 | 2.9000 |
| FL | 0.95940 | 0.97543 |
| MG | −0.042789 | −0.227651 |
| FNO | 3.9659 | 3.8809 |
| FIY | 1.140 | 1.140 |
| LTL | 12.4974 | 12.4974 |
| FB | 0.03465 | −0.14635 |
| d8 | 0.37036 | 1.16143 |
| d10 | 1.30128 | 0.51021 |
| β1 | 0.04739 | 0.23415 |
| β2 | 1.11562 | 1.20142 |
| β3 | −0.80926 | −0.80926 |

Unit Focal Length
f1=−1.07556, f2=9.21973, f3=2.80485

Example 2

Unit mm
Surface data

| Surface no. | r | d | nd | vd | ER |
|---|---|---|---|---|---|
| Object plane | ∞ | 17.0000 | 1. | | |
| 1 | 20.0000 | 0.3700 | 1.88300 | 40.76 | 1.562 |
| 2 | 1.2067 | 0.6000 | 1. | | 0.977 |
| 3 | ∞ | 0.4000 | 1.51633 | 64.14 | 0.943 |
| 4 | ∞ | 0.1010 | 1. | | 0.858 |
| 5 | −5.0015 | 0.2886 | 1.88300 | 40.76 | 0.848 |
| 6 | 2.9519 | 0.0923 | 1. | | 0.809 |
| 7 | 1.8550 | 0.3815 | 1.92286 | 18.90 | 0.826 |
| 8 | 2.6141 | d8 | 1. | | 0.770 |
| 9 | 1.6760 | 0.5923 | 1.49700 | 81.54 | 0.741 |
| 10 | 2.0720 | d10 | 1. | | 0.633 |
| 11 (Stop) | ∞ | 0.0830 | 1. | | 0.467 |
| 12* | 2.2198 | 0.3481 | 1.88300 | 40.76 | 0.540 |
| 13* | 5.1027 | 0.0877 | 1. | | 0.557 |
| 14 | 1.2752 | 0.3000 | 1.88300 | 40.76 | 0.619 |
| 15 | 0.8381 | 1.2698 | 1.51633 | 64.14 | 0.576 |
| 16 | −2.6992 | 0.0857 | 1. | | 0.654 |
| 17 | −12.8077 | 0.7528 | 1.51633 | 64.14 | 0.653 |
| 18 | −1.3481 | 0.2875 | 1.84666 | 23.78 | 0.661 |
| 19 | 1.9079 | 0.2786 | 1. | | 0.727 |
| 20 | 1813.5266 | 0.5922 | 1.72916 | 54.68 | 0.840 |
| 21 | −2.5422 | 0.0839 | 1. | | 0.995 |
| 22 | 3.2963 | 0.6109 | 1.88300 | 40.76 | 1.188 |
| 23 | −74.5199 | 0.3000 | 1. | | 1.186 |
| 24 | ∞ | 1.4000 | 1.51633 | 64.14 | 1.178 |
| 25 | ∞ | 0.0758 | 1. | | 1.155 |
| Image plane | ∞ | 0. | | | |

Aspherical Surface Data
12th Surface
K=0.
A2=0.0000E+00,A4=9.4238E−02,A6=−1.3465E−01,
A8=6.9001E−00,
A10=−1.1061E+00
13th Surface
K=0.

A2=0.0000E+00,A4=1.2940E−01,A6=−2.9245E−02,
A8=3.1386E−01,
A10=−5.4631E−01

Various data

|  | Far Point | Near point |
|---|---|---|
| OBJ | 17.0000 | 3.0000 |
| FL | 0.90631 | 0.91421 |
| MG | −0.050070 | −0.223755 |
| FNO | 3.9341 | 3.8945 |
| FIY | 1.140 | 1.140 |
| LTL | 10.8752 | 10.8752 |
| FB | 0.03039 | −0.12879 |
| d8 | 0.34193 | 0.98043 |
| d10 | 1.15150 | 0.51300 |
| β1 | 0.04307 | 0.18324 |
| β2 | 1.07292 | 1.12708 |
| β3 | −1.08345 | −1.08345 |

Unit Focal Length
f1=−0.78833, f2=11.79037, f3=2.97621

Example 3

Unit mm
Surface data

| Surface no. | r | d | nd | vd | ER |
|---|---|---|---|---|---|
| Object plane | ∞ | 17.0000 | 1. | | |
| 1 | 20.0000 | 0.3700 | 1.88300 | 40.76 | 1.565 |
| 2 | 1.1942 | 0.6000 | 1. | | 0.975 |
| 3 | ∞ | 0.3600 | 1.51633 | 64.14 | 0.945 |
| 4 | ∞ | 0.0180 | 1. | | 0.872 |
| 5 | −39.2627 | 0.2712 | 1.88300 | 40.76 | 0.869 |
| 6 | 2.1856 | 0.0689 | 1. | | 0.804 |
| 7 | 1.5180 | 0.3499 | 1.92286 | 18.90 | 0.813 |
| 8 | 1.8920 | d8 | 1. | | 0.744 |
| 9 | 1.3113 | 0.3642 | 1.49700 | 81.54 | 0.700 |
| 10 | 1.5503 | d10 | 1. | | 0.619 |
| 11 (Stop) | ∞ | 0.0540 | 1. | | 0.428 |
| 12* | 2.4371 | 0.2640 | 1.88300 | 40.76 | 0.451 |
| 13* | 2.7511 | 0.0751 | 1. | | 0.472 |
| 14 | 1.6332 | 0.3000 | 1.88300 | 40.76 | 0.530 |
| 15 | 1.8390 | 0.8427 | 1.51633 | 64.14 | 0.553 |
| 16 | −1.2298 | 0.0861 | 1. | | 0.653 |
| 17 | −4.6698 | 1.3113 | 1.51633 | 64.14 | 0.643 |
| 18 | −1.3468 | 0.2905 | 1.84666 | 23.78 | 0.663 |
| 19 | 1.9205 | 0.2998 | 1. | | 0.732 |
| 20 | −19.8757 | 0.6269 | 1.72916 | 54.68 | 0.848 |
| 21 | −2.1528 | 0.0818 | 1. | | 1.016 |
| 22 | 3.4557 | 0.6199 | 1.88300 | 40.76 | 1.217 |
| 23 | −28.5947 | 0.2000 | 1. | | 1.213 |
| 24 | ∞ | 1.5000 | 1.51633 | 64.14 | 1.201 |
| 25 | ∞ | 0.0640 | 1. | | 1.148 |
| Image plane | ∞ | 0. | | | |

Aspherical Surface Data
12th Surface
K=0.
A2=0.0000E+00,A4=2.3881E−01,A6=7.1261E−02,A8=−4.0179E−01,
A10=0.0000E+00
13th Surface
K=0.
A2=0.0000E+00,A4=3.5728E−01,A6=1.7739E−01,A8=−2.8920E−01,
A10=0.0000E+00

Various data

|  | Far Point | Near point |
|---|---|---|
| OBJ | 17.0000 | 3.0000 |
| FL | 0.87488 | 0.88419 |
| MG | −0.048244 | −0.214621 |
| FNO | 3.9284 | 3.8945 |
| FIY | 1.140 | 1.140 |
| LTL | 10.5175 | 10.5175 |
| FB | 0.02181 | −0.12575 |
| d8 | 0.32999 | 0.94108 |
| d10 | 1.16920 | 0.55811 |
| β1 | 0.04475 | 0.18971 |
| β2 | 1.08766 | 1.14143 |
| β3 | −0.99113 | −0.99113 |

Unit Focal Length
f1=−0.81998, f2=11.36494, f3=3.10154

Example 4

Unit mm
Surface data

| Surface no. | r | d | nd | vd | ER |
|---|---|---|---|---|---|
| Object plane | ∞ | 17.0000 | 1. | | |
| 1 | 20.0000 | 0.3700 | 1.88300 | 40.76 | 2.170 |
| 2 | 1.8355 | 0.6000 | 1. | | 1.438 |
| 3 | ∞ | 0.4000 | 1.51633 | 64.14 | 1.482 |
| 4 | ∞ | 0.3651 | 1.88300 | 40.76 | 1.260 |
| 5 | −6.0073 | 0.7484 | 1.88300 | 40.76 | 1.260 |
| 6 | 3.8110 | 0.5388 | 1. | | 1.141 |
| 7 | 2.9102 | 0.4410 | 1.92286 | 18.90 | 1.179 |
| 8 | 4.0476 | d8 | 1. | | 1.118 |
| 9 | 2.4287 | 1.7001 | 1.49700 | 81.54 | 1.088 |
| 10 | 3.4681 | d10 | 1. | | 0.763 |
| 11 (Stop) | ∞ | 0.0944 | 1. | | 0.501 |
| 12* | 1.7041 | 0.3825 | 1.88300 | 40.76 | 0.600 |
| 13* | 5.1778 | 0.2781 | 1. | | 0.590 |
| 14 | −29.8880 | 0.3000 | 1.88300 | 40.76 | 0.629 |
| 15 | 2.9929 | 0.6826 | 1.51633 | 64.14 | 0.668 |
| 16 | −1.6314 | 0.1268 | 1. | | 0.749 |
| 17 | −8.7698 | 1.5571 | 1.51633 | 64.14 | 0.757 |
| 18 | −1.4188 | 0.3403 | 1.84666 | 23.78 | 0.820 |
| 19 | 4.3711 | 0.6288 | 1. | | 0.933 |
| 20 | 264.1515 | 0.7659 | 1.72916 | 54.68 | 1.240 |
| 21 | −2.7702 | 0.1844 | 1. | | 1.362 |
| 22 | 2.3631 | 0.6206 | 1.88300 | 40.76 | 1.495 |
| 23 | 3.9331 | 0.4000 | 1. | | 1.392 |
| 24 | ∞ | 1.4000 | 1.51633 | 64.14 | 1.358 |
| 25 | ∞ | 0.0411 | 1. | | 1.147 |
| Image plane | ∞ | 0. | | | |

Aspherical Surface Data
12th Surface
K=0.
A2=0.0000E+00,A4=5.2580E−02,A6=5.3691E−02,A8=−3.8939E−03,
A10=0.0000E+00
13th Surface
K=0.
A2=0.0000E+00,A4=1.2458E−01,A6=7.6091E−02,A8=4.8603E−02,
A10=0.0000E+00

Various data

|  | Far Point | Near point |
|---|---|---|
| OBJ | 17.0000 | 3.0000 |
| FL | 0.96374 | 0.99290 |

-continued

| Various data | | |
|---|---|---|
| | Far Point | Near point |
| MG | −0.051712 | −0.215244 |
| FNO | 3.8797 | 3.8945 |
| FIY | 1.140 | 1.140 |
| LTL | 14.5440 | 14.5440 |
| FB | −0.00878 | −0.17266 |
| d8 | 0.28712 | 1.03089 |
| d10 | 1.29110 | 0.54733 |
| β1 | 0.06071 | 0.23796 |
| β2 | 1.13728 | 1.20767 |
| β3 | −0.74900 | −0.74900 |

Unit Focal Length
f1=−1.14099, f2=10.56718, f3=4.20765

Example 5

| Unit mm Surface data | | | | | |
|---|---|---|---|---|---|
| Surface no. | r | d | nd | vd | ER |
| Object plane | ∞ | 17.0000 | 1. | | |
| 1 | 18.6062 | 0.3700 | 1.88300 | 40.76 | 1.550 |
| 2 | 1.1634 | 0.6000 | 1. | | 0.954 |
| 3 | ∞ | 0.4000 | 1.51633 | 64.14 | 0.921 |
| 4 | ∞ | 0.2106 | 1. | | 0.839 |
| 5 | −2.9012 | 0.2987 | 1.88300 | 40.76 | 0.816 |
| 6 | 6.6566 | 0.0969 | 1. | | 0.825 |
| 7 | 2.2651 | 0.4862 | 1.67270 | 32.10 | 0.857 |
| 8 | 7.9728 | d8 | 1. | | 0.830 |
| 9 | 2.1192 | 0.9855 | 1.49700 | 81.54 | 0.806 |
| 10 | 2.7662 | d10 | 1. | | 0.651 |
| 11 (Stop) | ∞ | 0.0820 | 1. | | 0.510 |
| 12* | 1.5966 | 0.3119 | 1.88300 | 40.76 | 0.557 |
| 13* | 1.8942 | 0.0923 | 1. | | 0.547 |
| 14 | 1.2718 | 0.3000 | 1.88300 | 40.76 | 0.588 |
| 15 | 0.8534 | 1.2563 | 1.51742 | 52.43 | 0.549 |
| 16 | −2.5219 | 0.2499 | 1. | | 0.650 |
| 17 | 263.2306 | 0.8622 | 1.49700 | 81.54 | 0.650 |
| 18 | −1.3145 | 0.3172 | 1.92286 | 18.90 | 0.650 |
| 19 | 2.8013 | 0.1794 | 1. | | 0.733 |
| 20 | 17.9648 | 0.6025 | 1.78472 | 25.68 | 0.806 |
| 21 | −2.5539 | 0.0985 | 1. | | 0.937 |
| 22 | 4.4647 | 0.4767 | 1.78472 | 25.68 | 1.044 |
| 23 | 837.6148 | 0.3500 | 1. | | 1.056 |
| 24 | ∞ | 1.5000 | 1.51633 | 64.14 | 1.078 |
| 25 | ∞ | 0.0239 | 1. | | 1.140 |
| Image plane | ∞ | 0. | | | |

Aspherical Surface Data
12th Surface
K=0.
A2=0.0000E+00, A4=5.4679E−02, A6=−7.3153E−02,
A8=1.8821E−01,
A10=−2.6187E−01
13th Surface
K=0.
A2=0.0000E+00, A4=1.1151E−01, A6=−2.3505E−02,
A8=4.5913E−02,
A10=−1.4874E−01

| Various data | | |
|---|---|---|
| | Far Point | Near point |
| OBJ | 17.0000 | 3.0000 |
| FL | 0.95516 | 0.95802 |
| MG | −0.052812 | −0.235620 |

-continued

| Various data | | |
|---|---|---|
| | Far Point | Near point |
| FNO | 3.9309 | 3.8269 |
| FIY | 1.140 | 1.140 |
| LTL | 11.7045 | 11.7045 |
| FB | −0.02656 | −0.20184 |
| d8 | 0.28665 | 1.04021 |
| d10 | 1.26710 | 0.51353 |
| β1 | 0.05086 | 0.21466 |
| β2 | 1.08934 | 1.15157 |
| β3 | −0.95317 | −0.95317 |

Unit Focal Length
f1=−0.93319, f2=12.10818, f3=2.86916

Example 6

| Unit mm Surface data | | | | | |
|---|---|---|---|---|---|
| Surface no. | r | d | nd | vd | ER |
| Object plane | ∞ | 23.0000 | 1. | | |
| 1 | ∞ | 0.3000 | 1.88300 | 40.76 | 1.571 |
| 2 | 1.7470 | 0.6621 | 1. | | 1.132 |
| 3* | −4.2685 | 0.3000 | 1.72916 | 54.68 | 1.063 |
| 4* | 3.7770 | 0.2160 | 1. | | 0.956 |
| 5 | ∞ | 0.4000 | 1.51633 | 64.14 | 0.954 |
| 6 | ∞ | 0.1108 | 1. | | 0.944 |
| 7 | −17.4502 | 0.5181 | 1.92286 | 18.90 | 0.941 |
| 8 | −10.3965 | d8 | 1. | | 0.944 |
| 9 | 1.5833 | 0.4878 | 1.49700 | 81.54 | 0.901 |
| 10 | 1.8138 | d10 | 1. | | 0.797 |
| 11* | 2.0822 | 0.5220 | 1.78472 | 25.68 | 0.617 |
| 12* | 5.1997 | 0.1860 | 1. | | 0.510 |
| 13 (Stop) | ∞ | 0.1072 | 1. | | 0.461 |
| 14 | 2.9753 | 0.6919 | 1.49700 | 81.54 | 0.503 |
| 15 | −1.0647 | 0.3872 | 1.88300 | 40.76 | 0.565 |
| 16 | −1.7532 | 0.0524 | 1. | | 0.659 |
| 17 | 5.0986 | 1.1895 | 1.49700 | 81.54 | 0.675 |
| 18 | −2.2744 | 0.2551 | 1.84666 | 23.78 | 0.678 |
| 19 | 1.9563 | 0.1986 | 1. | | 0.708 |
| 20 | 7.0637 | 1.0263 | 1.75500 | 52.32 | 0.768 |
| 21 | −56.6101 | 0.0943 | 1. | | 0.995 |
| 22 | 4.0097 | 0.7954 | 1.80610 | 40.92 | 1.102 |
| 23 | −134.7099 | 0.4191 | 1. | | 1.149 |
| 24 | 5.0000 | 1.0000 | 1.88300 | 40.76 | 1.222 |
| 25 | ∞ | 0.6000 | 1.51633 | 64.14 | 1.177 |
| 26 | ∞ | 0.0438 | 1. | | 1.141 |
| Image plane | ∞ | 0. | | | |

Aspherical Surface Data
3rd Surface
K=0.
A2=0.0000E+00, A4=3.5276E−02, A6=0.0000E+00,
A8=0.0000E+00,
A10=0.0000E+00
4th Surface
K=−1.0818
A2=0.0000E+00, A4=4.7890E−02, A6=0.0000E+00,
A8=0.0000E+00,
A10=0.0000E+00
11th Surface
K=−1.0160
A2=0.0000E+00, A4=4.6118E−02, A6=0.0000E+00,
A8=0.0000E+00,
A10=0.0000E+00
12th Surface
K=0.

A2=0.0000E+00,A4=6.2475E-02,A6=0.0000E+00,
A8=0.0000E+00,
A10=0.0000E+00

| Various data | | |
|---|---|---|
| | Far Point | Near point |
| OBJ | 23.0000 | 3.5000 |
| FL | 1.03441 | 1.03782 |
| MG | −0.042738 | −0.221516 |
| FNO | 3.9188 | 3.8833 |
| FIY | 1.140 | 1.140 |
| LTL | 12.0401 | 12.0401 |
| FB | −4.39842E−04 | −0.18612 |
| d8 | 0.27203 | 1.10206 |
| d10 | 1.20450 | 0.37447 |
| β1 | 0.04470 | 0.22050 |
| β2 | 1.11291 | 1.16928 |
| β3 | −0.85917 | −0.85917 |

Unit Focal Length
f1=−1.09319, f2=14.72325, f3=3.65996

Example 7

| Unit mm Surface data | | | | | |
|---|---|---|---|---|---|
| Surface no. | r | d | nd | vd | ER |
| Object plane | ∞ | 23.0000 | 1. | | |
| 1 | ∞ | 0.3000 | 1.88300 | 40.76 | 1.583 |
| 2 | 1.7269 | 0.6987 | 1. | | 1.072 |
| 3 | −4.9307 | 0.3000 | 1.72916 | 54.68 | 1.072 |
| 4 | 4.3840 | 0.2021 | 1. | | 1.007 |
| 5 | ∞ | 0.4000 | 1.51633 | 64.14 | 1.003 |
| 6 | ∞ | 0.0980 | 1. | | 0.992 |
| 7 | −26.4786 | 0.4796 | 1.92286 | 18.90 | 0.989 |
| 8 | −45.6102 | d8 | 1. | | 0.987 |
| 9* | 2.0140 | 1.1515 | 1.49700 | 81.54 | 0.973 |
| 10 | 2.4988 | d10 | 1. | | 0.781 |
| 11* | 2.6171 | 0.5364 | 1.78472 | 25.68 | 0.636 |
| 12* | 14.2466 | 0.1441 | 1. | | 0.549 |
| 13(Stop) | ∞ | 0.1102 | 1. | | 0.514 |
| 14 | 2.9538 | 0.8289 | 1.49700 | 81.54 | 0.553 |
| 15 | −1.3287 | 0.2711 | 1.88300 | 40.76 | 0.612 |
| 16 | −2.0378 | 0.0825 | 1. | | 0.667 |
| 17 | 9.5107 | 1.2111 | 1.49700 | 81.54 | 0.674 |
| 18 | −1.7947 | 0.7085 | 1.84666 | 23.78 | 0.673 |
| 19 | 2.1692 | 0.1784 | 1. | | 0.746 |
| 20 | 10.4491 | 0.5389 | 1.75500 | 52.32 | 0.790 |
| 21 | −5.2124 | 0.2562 | 1. | | 0.899 |
| 22 | 7.9773 | 0.7946 | 1.80610 | 40.92 | 1.025 |
| 23 | −26.2995 | 0.4284 | 1. | | 1.100 |
| 24 | 5.0000 | 1.0000 | 1.88300 | 40.76 | 1.195 |
| 25 | ∞ | 0.6000 | 1.51633 | 64.14 | 1.167 |
| 26 | ∞ | 0.0440 | 1. | | 1.142 |
| Image plane | ∞ | 0. | | | |

Aspherical Surface Data
9th Surface
K=0.
A2=0.0000E+00,A4=−7.9705E−03,A6=0.0000E+00,
A8=0.0000E+00,
A10=0.0000E+00
11th Surface
K=−0.8102
A2=0.0000E+00,A4=2.7721E−02,A6=0.0000E+00,
A8=0.0000E+00,
A10=0.0000E+00
12th Surface
K=0.

A2=0.0000E+00,A4=4.0853E−02,A6=0.0000E+00,
A8=0.0000E+00,
A10=0.0000E+00

| Various data | | |
|---|---|---|
| | Far Point | Near point |
| OBJ | 23.0000 | 3.5000 |
| FL | 1.02204 | 1.05587 |
| MG | −0.042130 | −0.223151 |
| FNO | 3.9177 | 3.8814 |
| FIY | 1.140 | 1.140 |
| LTL | 12.9220 | 12.9220 |
| FB | 9.38560E−04 | −0.19162 |
| d8 | 0.27054 | 1.17354 |
| d10 | 1.28822 | 0.38522 |
| β1 | 0.04162 | 0.20559 |
| β2 | 1.06956 | 1.14689 |
| β3 | −0.94641 | −0.94641 |

Unit Focal Length
f1=−1.01762, f2=11.67815, f3=3.90807

Example 8

| Unit mm Surface data | | | | | |
|---|---|---|---|---|---|
| Surface no. | r | d | nd | vd | ER |
| Object plane | ∞ | 16.0000 | 1. | | |
| 1 | ∞ | 0.2500 | 1.88300 | 40.76 | 1.282 |
| 2* | 0.9612 | 0.6709 | 1. | | 0.877 |
| 3 | ∞ | 0.4000 | 1.49400 | 75.01 | 0.833 |
| 4 | ∞ | 0.1500 | 1. | | 0.782 |
| 5 | −5.5346 | 0.2500 | 1.77250 | 49.60 | 0.764 |
| 6 | 2.4020 | 0.4500 | 1.95906 | 17.47 | 0.745 |
| 7 | −15.4746 | d7 | 1. | | 0.724 |
| 8* | 8.6565 | 0.5000 | 1.74320 | 49.34 | 0.659 |
| 9* | 51.2636 | d9 | 1. | | 0.628 |
| 10 | 2.9556 | 0.4161 | 1.65160 | 58.55 | 0.560 |
| 11 | −8.3048 | 0.1000 | 1. | | 0.399 |
| 12 (Stop) | ∞ | 0.1000 | 1. | | 0.366 |
| 13 | −1.5648 | 0.2500 | 1.88300 | 40.76 | 0.377 |
| 14 | 2.2526 | 0.4000 | 1.49700 | 81.54 | 0.462 |
| 15 | −1.5310 | 0.2000 | 1. | | 0.560 |
| 16 | −37.1740 | 0.7000 | 1.49700 | 81.54 | 0.680 |
| 17 | −1.2180 | 0.3360 | 1.77250 | 49.60 | 0.789 |
| 18 | −1.9323 | 0.2000 | 1. | | 0.923 |
| 19 | 6.2625 | 0.5000 | 1.49700 | 81.54 | 1.027 |
| 20 | −3.2562 | 0.6500 | 1. | | 1.045 |
| 21 | ∞ | 0.2000 | 1.51633 | 64.14 | 0.999 |
| 22 | ∞ | 0.2030 | 1. | | 0.991 |
| 23 | ∞ | 4.3000 | 1.63854 | 55.38 | 0.980 |
| 24 | ∞ | 0.3500 | 1.51633 | 64.14 | 0.831 |
| 25 | ∞ | 0.0444 | 1. | | 0.818 |
| Image plane | ∞ | 0. | | | |

Aspherical Surface Data
2nd Surface
K=−0.4160
A2=0.0000E+00,A4=−8.4650E−02,A6=1.3557E−01,A8=−1.2736E−01,
A10=3.9760E−02,A12=−1.2666E−09,A14=0.0000E+00,
A16=0.0000E+00,A18=0.0000E+00,A20=0.0000E+00
8th Surface
K=0.
A2=0.0000E+00,A4=−4.4332E−02,A6=0.0000E+00,
A8=0.0000E+00,
A10=0.0000E+00
9th Surface

K=0.
A2=0.0000E+00,A4=−6.7341E−02,A6=0.0000E+00,
A8=0.0000E+00,
A10=0.0000E+00

| Various data | | |
|---|---|---|
| | Far Point | Near point |
| OBJ | 16.0000 | 2.5000 |
| FL | 0.75025 | 0.72600 |
| MG | −0.044343 | −0.212650 |
| FNO | 3.6905 | 3.6648 |
| FIM | 0.812 | 0.812 |
| LTL | 13.0974 | 13.0974 |
| FB | 0.01109 | −0.11003 |
| d7 | 0.42707 | 1.09071 |
| d9 | 1.05000 | 0.38636 |
| β1 | 0.06595 | 0.30490 |
| β2 | 1.27724 | 1.32483 |
| β3 | −0.52644 | −0.52644 |

Unit Focal Length
f1=−1.13600, f2=13.94442, f3=2.57607

Example 9

| Unit mm Surface data | | | | | |
|---|---|---|---|---|---|
| Surface no. | r | d | nd | vd | ER |
| Object plane | ∞ | 16.0000 | 1. | | |
| 1 | ∞ | 0.2500 | 1.88300 | 40.76 | 1.264 |
| 2* | 0.9272 | 1.1000 | 1. | | 0.857 |
| 3 | ∞ | 0.4000 | 1.49400 | 75.01 | 0.751 |
| 4 | ∞ | d4 | 1. | | 0.708 |
| 5* | −9.5539 | 0.6179 | 1.88300 | 40.76 | 0.626 |
| 6× | −6.5358 | d6 | 1. | | 0.620 |
| 7 | 4.3878 | 0.4161 | 1.95906 | 17.47 | 0.560 |
| 8 | −3.3352 | 0.1000 | 1. | | 0.439 |
| 9 (Stop) | ∞ | 0.1000 | 1. | | 0.390 |
| 10 | −1.5583 | 0.2500 | 1.88300 | 40.76 | 0.393 |
| 11 | 2.0000 | 0.5400 | 1.48749 | 70.23 | 0.453 |
| 12 | −1.3000 | 0.1000 | 1. | | 0.560 |
| 13 | −5.7457 | 0.8000 | 1.49700 | 81.54 | 0.610 |
| 14 | −1.2000 | 0.2500 | 1.84666 | 23.78 | 0.730 |
| 15 | −4.2732 | 0.1000 | 1. | | 0.854 |
| 16* | 5.3140 | 0.9434 | 1.49700 | 81.54 | 0.956 |
| 17* | −1.5831 | 0.6500 | 1. | | 1.054 |
| 18 | ∞ | 0.2000 | 1.51633 | 64.14 | 0.997 |
| 19 | ∞ | 0.2000 | 1. | | 0.989 |
| 20 | ∞ | 4.3000 | 1.63854 | 55.38 | 0.978 |
| 21 | ∞ | 0.3500 | 1.51633 | 64.14 | 0.831 |
| 22 | ∞ | 0.0420 | 1. | | 0.818 |
| Image plane | ∞ | 0. | | | |

Aspherical Surface Data
2nd Surface
K=−0.3786.
A2=0.0000E+00,A4=−4.8645E−02,A6=5.8716E−02,A8=−7.4460E−02,
A10=1.7666E−02,A12=−1.2683E−09,A14=0.0000E+00,
A16=0.0000E+00,A18=0.0000E+00,A20=0.0000E+00
5th Surface
K=0.
A2=0.0000E+00,A4=−4.5962E−02,A6=0.0000E+00,
A8=0.0000E+00,
A10=0.0000E+00
6th Surface
K=0.
A2=0.0000E+00,A4=−5.7654E−02,A6=0.0000E+00,
A8=0.0000E+00,
A10=0.0000E+00
16th Surface
K=0.
A2=0.0000E+00,A4=−1.9531E−02,A6=5.2759E−03,A8=−3.6036E−04,
A10=0.0000E+00
17th Surface
K=0.
A2=0.0000E+00,A4=1.9479E−02,A6=1.3298E−03,
A8=4.9924E−03,
A10=0.0000E+00

| Various data | | |
|---|---|---|
| | Far Point | Near point |
| OBJ | 16.0000 | 2.5000 |
| FL | 0.75052 | 0.72372 |
| MG | −0.044403 | −0.212614 |
| FNO | 3.7116 | 3.6936 |
| FIM | 0.812 | 0.812 |
| LTL | 13.2865 | 13.2865 |
| FB | 0.00868 | −0.11186 |
| d4 | 0.53174 | 1.21609 |
| d6 | 1.04533 | 0.36098 |
| β1 | 0.06111 | 0.28511 |
| β2 | 1.21847 | 1.25048 |
| β3 | −0.59635 | −0.59635 |

Unit Focal Length
f1=−1.05000, f2=21.37800, f3=2.80754

Example 10

| Unit mm Surface data | | | | | |
|---|---|---|---|---|---|
| Surface no. | r | d | nd | vd | ER |
| Object plane | ∞ | 15.800 | 1. | | |
| 1 | ∞ | 0.2500 | 1.88300 | 40.76 | 1.298 |
| 2* | 1.1014 | 0.7055 | 1. | | 0.910 |
| 3 | 4.9262 | 0.2500 | 1.88300 | 40.76 | 0.812 |
| 4 | 2.2000 | d4 | 1. | | 0.743 |
| 5 | ∞ | 0.4000 | 1.49400 | 75.01 | 0.690 |
| 6 | ∞ | 0.1000 | 1. | | 0.674 |
| 7* | 1.8277 | 0.5170 | 1.51633 | 64.14 | 0.660 |
| 8* | 2.3331 | d8 | 1. | | 0.590 |
| 9 | 4.0162 | 0.4161 | 1.95906 | 17.47 | 0.560 |
| 10 | −3.2257 | 0.1000 | 1. | | 0.448 |
| 11 (Stop) | ∞ | 0.1000 | 1. | | 0.400 |
| 12 | −1.5381 | 0.2500 | 1.88300 | 40.76 | 0.398 |
| 13 | 2.2458 | 0.5400 | 1.48749 | 70.23 | 0.457 |
| 14 | −1.3000 | 0.2000 | 1. | | 0.560 |
| 15 | −9.0844 | 0.8000 | 1.49700 | 81.54 | 0.638 |
| 16 | −1.2998 | 0.2500 | 1.84666 | 23.78 | 0.751 |
| 17 | −5.5081 | 0.1000 | 1. | | 0.870 |
| 18* | 3.9469 | 0.9447 | 1.49700 | 81.54 | 0.986 |
| 19* | −1.6844 | 0.6500 | 1. | | 1.058 |
| 20 | ∞ | 0.2000 | 1.51633 | 64.14 | 1.001 |
| 21 | ∞ | 0.2000 | 1. | | 0.993 |
| 22 | ∞ | 4.3000 | 1.63854 | 55.38 | 0.981 |
| 23 | ∞ | 0.3500 | 1.51633 | 64.14 | 0.828 |
| 24 | ∞ | 0.0428 | 1. | | 0.814 |
| Image plane | ∞ | 0. | | | |

Aspherical Surface Data
2nd Surface
K=−2.2853.
A2=0.0000E+00,A4=1.3338E−01,A6=2.5305E−02,A8=−4.2323E−02,
A10=2.6226E−02,A12=−1.2684E−09,A14=0.0000E+00, A16=0.0000E+00,A18=0.0000E+00,A20=0.0000E+00
7th Surface
K=0.
A2=0.0000E+00,A4=−6.4410E−02,A6=0.0000E+00,
A8=0.0000E+00,
A10=0.0000E+00
8th Surface
K=0.
A2=0.0000E+00,A4=−9.2071E−02,A6=0.0000E+00,
A8=0.0000E+00,
A10=0.0000E+00
18th Surface
K=0.
A2=0.0000E+00,A4=−1.3990E−02,A6=1.2717E−02,
A8=1.9476E−04,
A10=0.0000E+00
19th Surface
K=0.
A2=0.0000E+00,A4=2.4646E−02,A6=4.1843E−03,
A8=7.7537E−03,
A10=0.0000E+00

| Various data | | |
|---|---|---|
| | Far Point | Near point |
| OBJ | 15.8000 | 2.6200 |
| FL | 0.75036 | 0.74853 |
| MG | −0.044776 | −0.209826 |
| FNO | 3.6332 | 3.6154 |
| FIM | 0.812 | 0.812 |
| LTL | 13.2903 | 13.2903 |
| FB | 0.00925 | −0.11422 |
| d4 | 0.60084 | 1.19477 |
| d8 | 1.02333 | 0.42940 |
| β1 | 0.05010 | 0.22503 |
| β2 | 1.13061 | 1.17962 |
| β3 | −0.79044 | −0.79044 |

Unit Focal Length
f1=−0.84949, f2=12.12002, f3=2.73833

Example 11

| Unit mm Surface data | | | | |
|---|---|---|---|---|
| Surface no. | r | d | nd | vd | ER |
| Object plane | ∞ | 12.5000 | 1. | | |
| 1 | ∞ | 0.2500 | 1.88300 | 40.76 | 1.337 |
| 2* | 0.8692 | 0.5880 | 1. | | 0.900 |
| 3 | ∞ | 0.4000 | 1.49400 | 75.01 | 0.887 |
| 4 | ∞ | 0.0878 | 1. | | 0.848 |
| 5 | −9.0618 | 0.2500 | 1.81600 | 46.62 | 0.841 |
| 6 | 1.0427 | 0.7558 | 1.80518 | 25.42 | 0.815 |
| 7 | 17.0221 | d7 | 1. | | 0.801 |
| 8* | 3.0758 | 0.4338 | 1.80610 | 40.92 | 0.798 |
| 9 | 3.6580 | d9 | 1. | | 0.740 |
| 10* | 2.1247 | 0.6051 | 1.72916 | 54.68 | 0.650 |
| 11* | 9.8770 | 0.1000 | 1. | | 0.523 |
| 12 (Stop) | ∞ | 0.1000 | 1. | | 0.505 |
| 13 | 2.4630 | 0.3572 | 1.74951 | 35.33 | 0.520 |
| 14 | 0.9957 | 1.5342 | 1.49700 | 81.54 | 0.517 |
| 15 | −4.3095 | 0.4000 | 1. | | 0.650 |
| 16 | 3.5884 | 0.3000 | 1.83400 | 37.16 | 0.735 |
| 17 | 1.5227 | 0.5851 | 1.49700 | 81.54 | 0.731 |
| 18* | −405.9130 | 0.6000 | 1. | | 0.777 |
| 19 | 3.5202 | 0.6000 | 1.53172 | 48.84 | 0.901 |
| 20 | ∞ | 2.4000 | 1.51633 | 64.14 | 0.910 |

-continued

| Unit mm Surface data | | | | |
|---|---|---|---|---|
| Surface no. | r | d | nd | vd | ER |
| 21 | ∞ | 0.0260 | 1. | | 0.950 |
| Image plane | ∞ | 0. | | | |

Aspherical Surface Data
2nd Surface
K=−0.9776.
A2=0.0000E+00,A4=−8.8118E−03,A6=6.8995E−02,
A8=0.0000E+00,
A10=0.0000E+00
8th Surface
K=0.
A2=0.0000E+00,A4=−9.1674E−04,A6=3.1219E−02,A8=−8.5050E−03,
A10=0.0000E+00
10th Surface
K=0.
A2=0.0000E+00,A4=−1.0574E−02,A6=−6.0806E−02,
A8=0.0000E+00,
A10=0.0000E+00
11th Surface
K=0.
A2=0.0000E+00,A4=2.6851E−03,A6=−6.5815E−02,
A8=1.9476E−04,
A10=0.0000E+00
18th Surface
K=0.
A2=0.0000E+00,A4=9.0488E−03,A6=−1.1887E−02,
A8=7.7537E−03,
A10=0.0000E+00

| Various data | | |
|---|---|---|
| | Far Point | Near point |
| OBJ | 12.5000 | 2.1000 |
| FL | 0.79078 | 0.78170 |
| MG | −0.059423 | −0.269569 |
| FNO | 3.6685 | 3.5909 |
| FIM | 0.948 | 0.948 |
| LTL | 11.9080 | 11.9080 |
| FB | −0.02102 | −0.18476 |
| d7 | 0.23000 | 1.06652 |
| d9 | 1.30502 | 0.46850 |
| β1 | 0.05531 | 0.24046 |
| β2 | 1.07157 | 1.11807 |
| β3 | −1.00267 | −1.00267 |

Unit Focal Length
f1=−0.74700, f2=17.99209, f3=2.73069

Example 12

| Unit mm Surface data | | | | | |
|---|---|---|---|---|---|
| Surface no. | r | d | nd | vd | ER |
| Object plane | ∞ | 12.0000 | 1. | | |
| 1 | ∞ | 0.2500 | 1.88300 | 40.76 | 0.959 |
| 2 * | 0.5867 | 0.7292 | 1. | | 0.604 |
| 3 | −2.9628 | 0.2500 | 1.77250 | 49.60 | 0.580 |
| 4 | 1.8141 | 0.6400 | 1.84666 | 23.78 | 0.598 |

-continued

Unit mm
Surface data

| Surface no. | r | d | nd | vd | ER |
|---|---|---|---|---|---|
| 5 | −3.6936 | d5 | 1. | | 0.611 |
| 6 | 1.4089 | 0.5984 | 1.65160 | 58.55 | 0.568 |
| 7 | 1.5806 | d7 | 1. | | 0.446 |
| 8 (Stop) | ∞ | 0.1000 | 1. | | 0.320 |
| 9 | 3.0016 | 0.3300 | 1.49700 | 81.54 | 0.363 |
| 10 | −2.8548 | 0.2000 | 1. | | 0.415 |
| 11 | 3.2270 | 0.5193 | 1.49700 | 81.54 | 0.469 |
| 12 | −0.9500 | 0.5877 | 1.84666 | 23.78 | 0.498 |
| 13 | −1.9860 | 0.2000 | 1. | | 0.611 |
| 14 | ∞ | 0.4000 | 1.51633 | 64.14 | 0.629 |
| 15 | ∞ | 1.8314 | 1 | | 0.645 |
| 16 | 1.4990 | 0.4755 | 1.65160 | 58.55 | 0.769 |
| 17 | ∞ | 0.3000 | 1.51633 | 64.14 | 0.719 |
| 18 | ∞ | 0.0256 | 1. | | 0.656 |
| Image plane | ∞ | 0. | | | |

Aspherical Surface Data
2nd Surface
K=−3.9151.
A2=0.0000E+00,A4=1.8116E+00,A6=−3.8819E+00,
A8=7.7408E+00,
A10=−6.1502E+00,A12=−1.6103E−08,A14=0.0000E+00,
A16=0.0000E+00,A18=0.0000E+00,A20=0.0000E+00

Various data

| | Far Point | Near point |
|---|---|---|
| OBJ | 12.0000 | 2.3000 |
| FL | 0.57445 | 0.58774 |
| MG | −0.045069 | −0.193515 |
| FNO | 3.7639 | 3.8219 |
| FIM | 0.644 | 0.644 |
| LTL | 8.5877 | 8.5877 |
| FB | −0.00025 | −0.08809 |
| d5 | 0.31000 | 0.75760 |
| d7 | 0.84053 | 0.39293 |
| β1 | 0.06232 | 0.25629 |
| β2 | 1.21026 | 1.26367 |
| β3 | −0.59752 | −0.59752 |

Unit Focal Length
f1=−0.79876, f2=8.38077, f3=3.42474

Example 13

Unit mm
Surface data

| Surface no. | r | d | nd | vd | ER |
|---|---|---|---|---|---|
| Object plane | ∞ | 12.0000 | 1. | | |
| 1 | ∞ | 0.2500 | 1.88300 | 40.76 | 0.893 |
| 2* | 0.6145 | 0.5000 | 1. | | 0.568 |
| 3 | −4.0000 | 0.3000 | 1.84666 | 23.78 | 0.553 |
| 4 | −3.4224 | d4 | 1. | | 0.560 |
| 5* | 31.9001 | 0.5000 | 1.88300 | 40.76 | 0.515 |
| 67* | −17.3823 | d6 | 1. | | 0.495 |
| 7 | 1.8552 | 0.3300 | 1.84666 | 23.78 | 0.350 |
| 8 | 46.7757 | 0.1000 | 1. | | 0.326 |
| 9 (Stop) | ∞ | 0.1000 | 1. | | 0.320 |
| 10 | 25.5320 | 0.4989 | 1.75520 | 27.51 | |
| 11 | 0.8906 | 0.4000 | 1.49700 | 81.54 | 0.358 |
| 12 | −2.4506 | 0.2000 | 1. | | 0.408 |
| 13 | 1.0440 | 0.7000 | 1.49700 | 81.54 | 0.516 |
| 14 | −1.0416 | 0.2500 | 1.88300 | 40.76 | 0.509 |

-continued

Unit mm
Surface data

| Surface no. | r | d | nd | vd | ER |
|---|---|---|---|---|---|
| 15 | −6.0889 | 0.2000 | 1. | | 0.544 |
| 16 | ∞ | 0.4000 | 1.51633 | 64.14 | 0.568 |
| 17 | ∞ | 0.6150 | 1. | | 0.596 |
| 18 | 2.1494 | 0.4755 | 1.49700 | 81.54 | 0.674 |
| 19 | ∞ | 0.3000 | 1.51633 | 64.14 | 0.659 |
| 20 | ∞ | 0.0248 | 1. | | 0.647 |
| Image plane | ∞ | 0. | | | |

Aspherical Surface Data
2nd Surface
K=−0.8313.
A2=0.0000E+00,A4=1.4924E−01,A6=5.1736E−02,
A8=1.3166E+00,
A10=4.5628E−01,A12=−1.6078E−08,A14=0.0000E+00,
A16=0.0000E+00,A18=0.0000E+00,A20=0.0000E+00
5th Surface
K=0.
A2=0.0000E+00,A4=−1.7950E−01,A6=1.6874E−01,
A8=0.0000E+00,
A10=0.0000E+00
6th Surface
K=0.
A2=0.0000E+00,A4=−1.5197E−01,A6=8.9040E−02,
A8=0.0000E+00,
A10=0.0000E+00

Various data

| | Far Point | Near point |
|---|---|---|
| OBJ | 12.0000 | 2.3000 |
| FL | 0.64034 | 0.62321 |
| MG | −0.050709 | −0.213041 |
| FNO | 3.6212 | 3.5887 |
| FIM | 0.644 | 0.644 |
| LTL | 7.3292 | 7.3292 |
| FB | −0.00767 | −0.10797 |
| d4 | 0.30500 | 0.76596 |
| d6 | 0.88000 | 0.41904 |
| β1 | 0.05971 | 0.24344 |
| β2 | 1.18240 | 1.21841 |
| β3 | −0.71827 | −0.71827 |

Unit Focal Length
f1=−0.76740, f2=12.80321, f3=2.08817

Example 14

Unit mm
Surface data

| | r | d | nd | vd | ER |
|---|---|---|---|---|---|
| Object plane | ∞ | 12.0000 | 1. | | |
| 1 | ∞ | 0.300 | 1.88300 | 40.76 | 0.956 |
| 2 | 0.6059 | 0.5726 | 1. | | 0.590 |
| 3 | −2.2791 | 0.3000 | 1.77250 | 49.60 | 0.568 |
| 4 | 2.2000 | 0.6000 | 1.84666 | 23.78 | 0.588 |
| 5 | −5.1712 | d5 | 1. | | 0.611 |
| 6* | 1.1177 | 0.5146 | 1.51633 | 64.14 | 0.582 |
| 7* | 1.2614 | d7 | 1. | | 0.492 |
| 8 | 2.4878 | 0.3800 | 1.72916 | 54.68 | 0.408 |
| 9 | ∞ | 0.1000 | 1. | | 0.378 |
| 10 (Stop) | ∞ | 0.1000 | 1. | | 0.370 |

-continued

Unit mm
Surface data

| | r | d | nd | vd | ER |
|---|---|---|---|---|---|
| 11 | 1.7000 | 0.2500 | 1.80518 | 25.42 | 0.385 |
| 12 | 1.0712 | 0.5000 | 1.49700 | 81.54 | 0.381 |
| 13 | ∞ | 0.2000 | 1. | | 0.408 |
| 14 | 1.4815 | 0.7000 | 1.49700 | 81.54 | 0.456 |
| 15 | −0.9675 | 0.4036 | 1.88300 | 40.76 | 0.458 |
| 16 | −9.2037 | 0.2000 | 1. | | 0.515 |
| 17 | ∞ | 0.4000 | 1.49400 | 75.01 | 0.550 |
| 18 | ∞ | 0.7801 | 1. | | 0.593 |
| 19 | 1.6195 | 0.6259 | 1.69680 | 55.53 | 0.749 |
| 20 | ∞ | 0.3000 | 1.51633 | 64.14 | 0.695 |
| 21 | ∞ | 0.0264 | 1. | | 0.654 |
| Image plane | ∞ | 0. | | | |

Aspherical Surface Data
2nd Surface
K=−3.9794.
A2=0.0000E+00,A4=1.7134E+00,A6=−3.7300E+00,
A8=7.5080E+00,
A10=−5.6418E+00,A12=−1.6099E−08,A14=0.0000E+00,
A16=0.0000E+00,A18=0.0000E+00,A20=0.0000E+00
6th Surface
K=0.
A2=0.0000E+00,A4=−1.2803E−01,A6=0.0000E+00,
A8=0.0000E+00,
A10=0.0000E+00
7th Surface
K=0.
A2=0.0000E+00,A4=−1.0352E−01,A6=0.0000E+00,
A8=0.0000E+00,
A10=0.0000E+00

| | Various data | |
|---|---|---|
| | Far Point | Near point |
| OBJ | 12.0000 | 2.3000 |
| FL | 0.59329 | 0.60659 |
| MG | −0.046655 | −0.201619 |
| FNO | 3.6591 | 3.6799 |
| FIM | 0.644 | 0.644 |
| LTL | 8.4232 | 8.4232 |
| FB | −0.00123 | −0.09585 |
| d5 | 0.30000 | 0.73415 |
| d7 | 0.87000 | 0.43585 |
| β1 | 0.05072 | 0.20971 |
| β2 | 1.12026 | 1.17095 |
| β3 | −0.82104 | −0.82104 |

Unit Focal Length
f1=−0.64900, f2=8.56357, f3=3.24456

Next, values of conditional expressions in each example are given below. '-' (hyphen) indicates that there is no corresponding arrangement.

| | Example1 | Example2 | Example3 |
|---|---|---|---|
| (1) $(n2C' - n2C)/r2C$ | −0.242749 | −0.4375015 | −0.1993855 |
| (2) $fL/R31F$ | 0.23622396 | 0.4082845 | 0.3589840 |
| (3) $fL \times \Sigma P_{SNi}$ | −0.4654942 | −0.6185885 | −0.3890205 |
| (5) $(R_{3R1} + R_{3R2})/(R_{3R1} - R_{3R2})$ | — | — | — |
| (6) $('R_{3R1} + 'R_{3R2})/('R_{3R1} - 'R_{3R2})$ | −0.918874 | −0.9152799 | −0.7843584 |
| (7) $fL/r_{SNr}$ | −0.7041468 | −0.6722869 | −0.6495990 |
| (8) $\upsilon_{31P} - \upsilon_{32P}$ | −11.67 | −23.38 | −23.38 |
| (9) $\upsilon_{33P} - (\upsilon_{31P} + \upsilon_{32P})/2$ | 17.545 | 11.69 | 11.69 |
| (10) $\upsilon_{31N} - \upsilon_{32N}$ | 16.98 | 16.98 | 16.98 |
| (11) $(R21F + R21R)/(R21F - R21R)$ | −4.8921126 | −9.4646465 | −11.973222 |
| (12) $D21/fL$ | 1.5914113 | 0.6535292 | 0.41628566 |
| (13) $β2F$ | 1.11562 | 1.07292 | 1.08765 |
| (14) $β2N/β2F$ | 1.07690791 | 1.05047907 | 1.04943686 |
| (15) $(1 - β2F^2) \times β3F^2$ | 0.19795146 | 0.16377141 | 0.18136496 |
| (16) $(1 - β2N^2) \times β3N^2$ | 0.35883399 | 0.29286664 | 0.30016251 |
| (17) $SD1/fL$ | 2.89013967 | 2.46427823 | 2.3448130 |
| (18) $fL/R12F_a$ | — | — | — |
| (19) $fL/R12F_b$ | — | — | — |
| (20) $fL/R12F_c$ | −0.1243713 | −0.1812076 | −0.0222827 |
| (21) $fL/R12R$ | — | — | — |
| (22) $fL/FL12$ | −0.3307478 | −0.4384452 | −0.3742802 |
| (23) $|R_{fin}|/|f_{fin}|$ | 21.7069621 | 20.7680453 | 8.11519469 |
| (24) $fL \times \tan\omega_{max}$ | 7.38281509 | 5.28502533 | 5.09395729 |
| $2y_{max}$ | 2.28 | 2.28 | 2.28 |
| (25) $ER2$ | 0.663 | 0.654 | 0.653 |
| $4 \times fL/F_{EX}$ | 0.96373682 | 0.9189455 | 0.8904631 |

| | Example4 | Example5 | Example6 |
|---|---|---|---|
| (1) $(n2C' - n2C)/r2C$ | −0.1225133 | −0.4283806 | −0.3625434 |
| (2) $fL/R31F$ | 0.56554193 | 0.5982463 | 0.49678705 |
| (3) $fL \times \Sigma P_{SNi}$ | −0.3424523 | −0.7186162 | −0.5340459 |
| (5) $(R_{3R1} - R_{3R2})/(R_{3R1} - R_{3R2})$ | — | — | — |
| (6) $('R_{3R1} - 'R_{3R2})/('R_{3R1} - 'R_{3R2})$ | −4.0103185 | −1.0107176 | −1.0000001 |
| (7) $fL/r_{SNr}$ | −0.6792642 | −0.7266337 | −0.4548057 |

-continued

|   |   |   |   |
|---|---|---|---|
| (8) $\upsilon_{31P} - \upsilon_{32P}$ | −23.38 | −11.67 | −55.86 |
| (9) $\upsilon_{33P} - (\upsilon_{31P} + \upsilon_{32P})/2$ | 11.69 | 34.945 | 27.93 |
| (10) $\upsilon_{31N} - \upsilon_{32N}$ | 16.98 | 21.86 | 16.98 |
| (11) (R21F + R21R)/(R21F − R21R) | −5.673273 | −7.5508501 | −14.737961 |
| (12) D21/fL | 1.764065 | 1.03176431 | 0.47157317 |
| (13) β2F | 1.13728 | 1.08934 | 1.11291 |
| (14) β2N/β2F | 1.06189329 | 1.05712633 | 1.050651 |
| (15) $(1 - \beta 2F^2) \times \beta 3F^2$ | 0.21976094 | 0.17792027 | 0.20497104 |
| (16) $(1 - \beta 2N^2) \times \beta 3N2$ | 0.34339165 | 0.31084157 | 0.31550073 |
| (17) SD1/fL | 3.5935522 | 2.57795553 | 2.4236328 |
| (18) fL/R12F$_a$ | — | — | — |
| (19) fL/R12F$_b$ | — | — | — |
| (20) f/R12F$_c$ | −0.1604281 | −0.3292293 | −0.2423357 |
| (21) fL/R12R | — | — | — |
| (22) fL/FL12 | −0.3779965 | −0.4235367 | −0.3823077 |
| (23) $|R_{fin}|/|f_{fin}|$ | 0.69542232 | 146.472004 | 17660044.0 |
| (24) $fL \times \tan\omega_{max}$ | 5.57185721 | 5.54292136 | 5.97085915 |
| $2y_{max}$ | 2.28 | 2.28 | 2.28 |
| (25) ER2 | 0.749 | 0.65 | 0.659 |
| $4 \times fL/F_{EX}$ | 0.99482839 | 0.96676113 | 1.05363891 |

|   | Example7 | Example8 | Example9 |
|---|---|---|---|
| (1) (n2C' − n2C)/r2C | −0.2905095 | −0.1713575 | −0.197755 |
| (2) fL/R31F | 0.39052386 | 0.25384017 | 0.17104699 |
| (3) $fL \times \Sigma P_{SNi}$ | −0.4960356 | −0.2982604 | −0.3671081 |
| (5) (R$_{3R1}$ + R$_{3R2}$)/(R$_{3R1}$ − R$_{3R2}$) | — | 0.31583094 | — |
| (6) ('R$_{3R1}$ + 'R$_{3R2}$)/('R$_{3R1}$ − 'R$_{3R2}$) | −1.0000001 | — | 0.5409375 |
| (7) fL/r$_{SNr}$ | −0.5694768 | −0.6159688 | −0.6254333 |
| (8) $\upsilon_{31P} - \upsilon_{32P}$ | −55.86 | −22.99 | −52.76 |
| (9) $\upsilon_{33P} - (\upsilon_{31P} + \upsilon_{32P})/2$ | 27.93 | 11.495 | 37.69 |
| (10) $\upsilon_{31N} - \upsilon_{32N}$ | 16.98 | −8.84 | 16.98 |
| (11) (R21F + R21R)/(R21F − R21R) | −9.3085809 | −1.4063407 | 5.33106922 |
| (12) D21/fL | 1.12666823 | 0.66644452 | 0.82329585 |
| (13) β2F | 1.06956 | 1.27724 | 1.21847 |
| (14) β2N/β2F | 1.07230076 | 1.03726003 | 1.02627065 |
| (15) $(1 - \beta 2F^2) \times \beta 3F^2$ | 0.13624385 | 0.33236369 | 0.28903244 |
| (16) $(1 - \beta 2N^2) \times \beta 3N2$ | 0.29845671 | 0.39755408 | 0.33616263 |
| (17) SD1/fL | 2.4249638 | 2.89354215 | 0.33310238 |
| (18) fL/R12F$_a$ | — | −0.1355563 | — |
| (19) fL/R12F$_b$ | — | — | — |
| (20) fL/R12F$_c$ | — | — | — |
| (21) fL/R12R | — | −0.0484827 | — |
| (22) fL/FL12 | −0.3254904 | 0.00275924 | 0.03510712 |
| (23) $|R_{fin}|/|f_{fin}|$ | 17660044.0 | 0.74223683 | 0.61577658 |
| (24) $fL \times \tan\omega_{max}$ | 5.89751183 | 2.28223144 | 2.24501224 |
| $2y_{max}$ | 2.28 | 1.624 | 1.624 |
| (25) ER2 | 0.667 | 0.56 | 0.56 |
| $4 \times fL/F_{EX}$ | 1.04183486 | 0.80628694 | 0.80679387 |

|   | Example10 | Example11 | Example12 |
|---|---|---|---|
| (1) (n2C' − n2C)/r2C | −0.176111 | −0.2536005 | −0.3680632 |
| (2) fL/R31F | 0.18683333 | 0.37218431 | 0.19138126 |
| (3) $fL \times \Sigma P_{SNi}$ | −0.3340014 | −0.3755556 | −0.2114339 |
| (5) (R$_{3R1}$ + R$_{3R2}$)/(R$_{3R1}$ − R$_{3R2}$) | — | −1.0000001 | −1 |
| (6) ('R$_{3R1}$ + 'R$_{3R2}$)/('R$_{3R1}$ − 'R$_{3R2}$) | 0.40177224 | — | — |
| (7) fL/r$_{SNr}$ | −0.5772888 | 0.51932751 | −0.6046842 |
| (8) $\upsilon_{31P} - \upsilon_{32P}$ | −52.76 | −26.86 | 0 |
| (9) $\upsilon_{33P} - (\upsilon_{31P} + \upsilon_{32P})/2$ | 37.69 | 13.43 | −22.99 |
| (10) $\upsilon_{31N} - \upsilon_{32N}$ | 16.98 | −1.83 | — |
| (11) (R21F + R21R)/(R21F − R21R) | −8.232687 | −11.566128 | −17.411182 |
| (12) D21/fL | 0.68900261 | 0.5485723 | 1.04169205 |
| (13) β2F | 1.13061 | 1.07157 | 1.21026 |
| (14) β2N/β2F | 1.04334828 | 1.04339427 | 1.04413101 |

-continued

|  | | | |
|---|---|---|---|
| (15) $(1 - \beta 2F^2) \times \beta 3F^2$ | 0.21996283 | 0.14865813 | 0.27768503 |
| (16) $(1 - \beta 2N^2) \times \beta 3N^2$ | 0.3094599 | 0.25074824 | 0.3566369 |
| (17) SD1/fL | 1.60656218 | 2.94848125 | 3.25387762 |
| (18) $fL/R12F_a$ | — | −0.0872652 | −0.1938875 |
| (19) $fL/R12F_b$ | — | — | — |
| (20) $fL/R12F_c$ | — | — | — |
| (21) fL/R12R | — | — | −0.1555258 |
| (22) fL/FL12 | −0.1594984 | −0.118959 | 0.02105524 |
| (23) $\mid R_{fin} \mid / \mid f_{fin} \mid$ | 0.66960843 | 15104827.4 | 43468810.7 |
| (24) $fL \times \tan\omega_{max}$ | 2.28831395 | 2.41626746 | 1.76552611 |
| $2y_{max}$ | 1.624 | 1.896 | 1.288 |
| (25) ER2 | 0.56 | 0.65 | 0.611 |
| $4 \times fL/F_{EX}$ | 0.82411862 | 0.85698185 | 0.61372863 |

|  | Example13 | Example14 |
|---|---|---|
| (1) (n2C' − n2C)/r2C | −0.2899169 | −0.287696 |
| (2) fL/R31F | 0.34515955 | 0.23847978 |
| (3) $fL \times \Sigma P_{SNi}$ | −0.422945 | −0.40739 |
| (5) $(R_{3R1} - R_{3R2})/(R_{3R1} - R_{3R2})$ | −1 | −1 |
| (6) $('R_{3R1} + 'R_{3R2})/('R_{3R1} - 'R_{3R2})$ | — | — |
| (7) $fL/r_{SNr}$ | −0.6147657 | −0.6132196 |
| (8) $\upsilon_{31P} - \upsilon_{32P}$ | −57.76 | −26.86 |
| (9) $\upsilon_{33P} - (\upsilon_{31P} + \upsilon_{32P})/2$ | 28.88 | 13.43 |
| (10) $\upsilon_{31N} - \upsilon_{32N}$ | −13.25 | −15.34 |
| (11) (R21F + R21R)/(R21F − R21R) | 0.29458387 | −16.556019 |
| (12) D21/fL | 0.78083518 | 0.86736672 |
| (13) $\beta 2F$ | 1.1824 | 1.12026 |
| (14) $\beta 2N/\beta 2F$ | 1.03045501 | 1.04524842 |
| (15) $(1 - 2F^2) \times \beta 3F^2$ | 0.28592157 | 0.20935081 |
| (16) $(1 - \beta 2N^2) \times \beta 3N^2$ | 0.34801828 | 0.30470757 |
| (17) SD1/fL | 1.63975388 | 2.98771259 |
| (18) $fL/R12F_a$ | — | −0.2603177 |
| (19) $fL/R12F_b$ | — | — |
| (20) $fL/R12F_c$ | — | — |
| (21) fL/R12R | −0.1871026 | — |
| (22) fL/FL12 | 0.02832398 | −0.0676638 |
| (23) $\mid R_{fin} \mid / \mid f_{fin} \mid$ | 23122991 | 43025556.8 |
| (24) $fL \times \tan\omega_{max}$ | 1.96016051 | 1.84324927 |
| $2y_{max}$ | 1.288 | 1.288 |
| (25) ER2 | 0.408 | 0.408 |
| $4 \times fL/F_{EX}$ | 0.70425076 | 0.64929138 |

Figure 29:
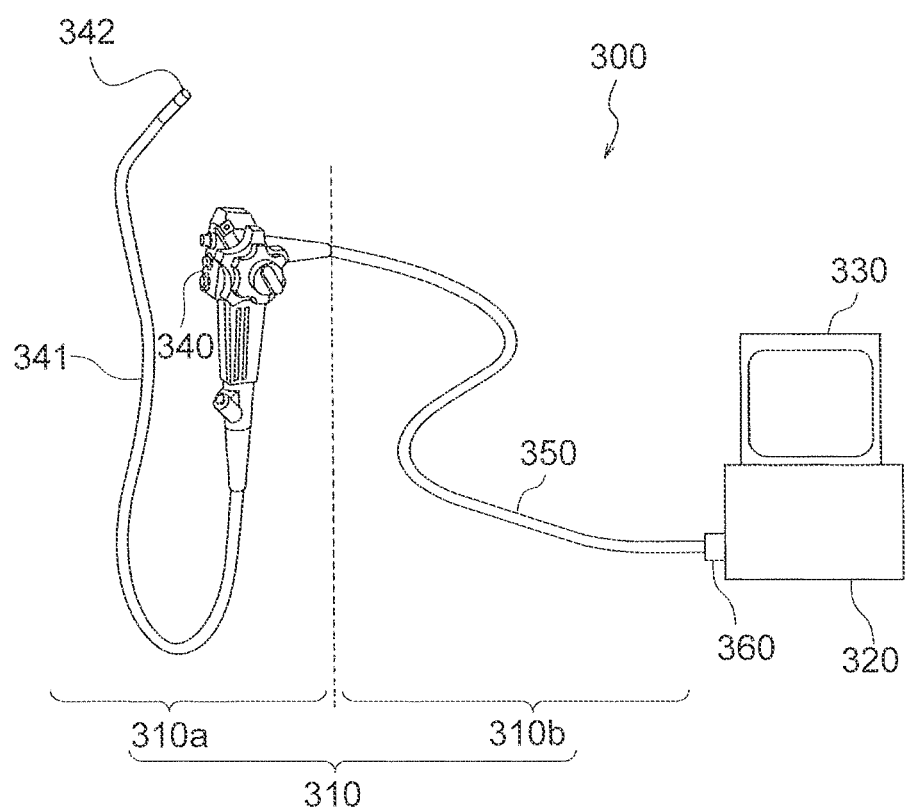
FIG. 29 is a diagram showing a schematic configuration of an endoscope system.

FIG. 29 is an example of an image pickup apparatus. In this example, the image pickup apparatus is an endoscope system. FIG. 29 is a diagram showing a schematic configuration of an endoscope system.

An endoscope system 300 is an observation system in which an electronic endoscope is used. The endoscope system 300 includes an electronic endoscope 310 and an image processing unit 320. The electronic endoscope 310 includes a scope section 310a and a connecting cord section 310b. Moreover, a display unit 330 is connected to the image processing unit 320.

The scope section 310a is mainly divided into an operating portion 340 and an inserting portion 341. The inserting portion 341 is long and slender, and can be inserted into a body cavity of a patient. Moreover, the inserting portion 341 is formed of a flexible member. An observer can carry out various operations by an angle knob that is provided to the operating portion 340.

Moreover, the connecting cord section 310b is extended from the operating portion 340. The connecting cord section 301b includes a universal cord 350. The universal cord 350 is connected to the image processing unit 320 via a connector 360.

The universal cord 350 is used for transceiving of various types of signals. Various types of signals include signals such as a power-supply voltage signal and a CCD (charge coupled device) driving signal. These signals are transmitted from a power supply unit and a video processor to the scope section 310a. Moreover, various types of signals include a video signal. This signal is transmitted from the scope section 310a to the video processor.

Peripheral equipment such as a VTR (video tape recorder) deck and a video printer can be connected to the video processor inside the image processing unit 320. The video processor carries out signal processing on a video signal from the scope section 310a. On the basis of the video signal, an endoscope image is displayed on a display screen of the display unit 330.

Figure 30:
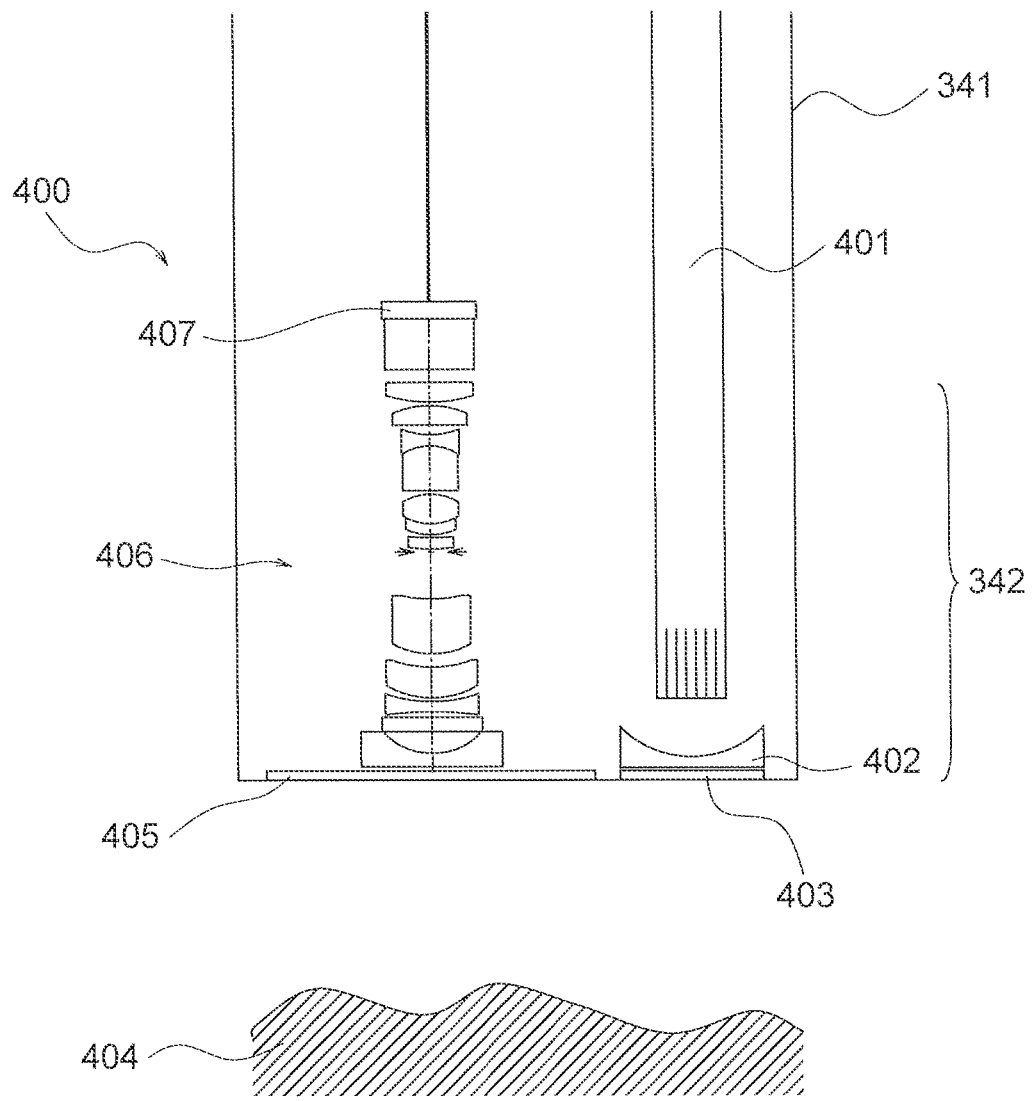
FIG. 30 is a diagram showing an arrangement of an optical system of an endoscope.

An optical system is disposed at a front-end portion 342 of the inserting portion 341. FIG. 30 is a diagram showing an arrangement of the optical system of the endoscope. An optical system 400 includes an illuminating section and an observation section.

The illuminating section includes a light guide 401 and an illuminating lens 402. The light guide 401 transmits illumination light to the front-end portion 342 of the inserting portion 341. The transmitted light is emerged from a front-end surface of the light guide 401.

At the front-end portion 342, the illuminating lens 402 is disposed. The illuminating lens 402 is disposed at a position of facing the front-end surface of the light guide 401. The illumination light passes through the illuminating lens 402 and is emerged from an illumination window 403. As a result, an observation object region 404 of an inside of an object (hereinafter, referred to as 'observation region 404') is illuminated.

At the front-end portion 342, an observation window 405 is disposed next to the illumination window 403. Light from the observation region 404 is incident on the front-end portion 342 through the observation window 405. An observation portion is disposed behind the observation window 405.

The observation portion includes a wide-angle optical system 406 and an image sensor 407. The wide-angle optical system of the example 1 is used for the wide-angle optical system 406, for instance.

Reflected light from the observation region 404 passes through the wide-angle optical system 406 and is incident on the image sensor 407. On an image pickup surface of the image sensor 407, an image (an optical image) of the observation region 404 is formed. The image of the observation region 404 is converted photoelectrically by the image sensor 407, and thereby an image of the observation region 404 is acquired. The image of the observation region 404 is displayed on the display unit 330. By doing so, it is possible to observe the image of the observation region 404

In the wide-angle optical system 406, an image plane is curved shape. The image sensor 407 has a curved-shape light receiving surface (an image pickup surface) same as an shape of the image plane. By using the image sensor 407, it is possible to improve an image quality of the acquired image.

Figure 31:
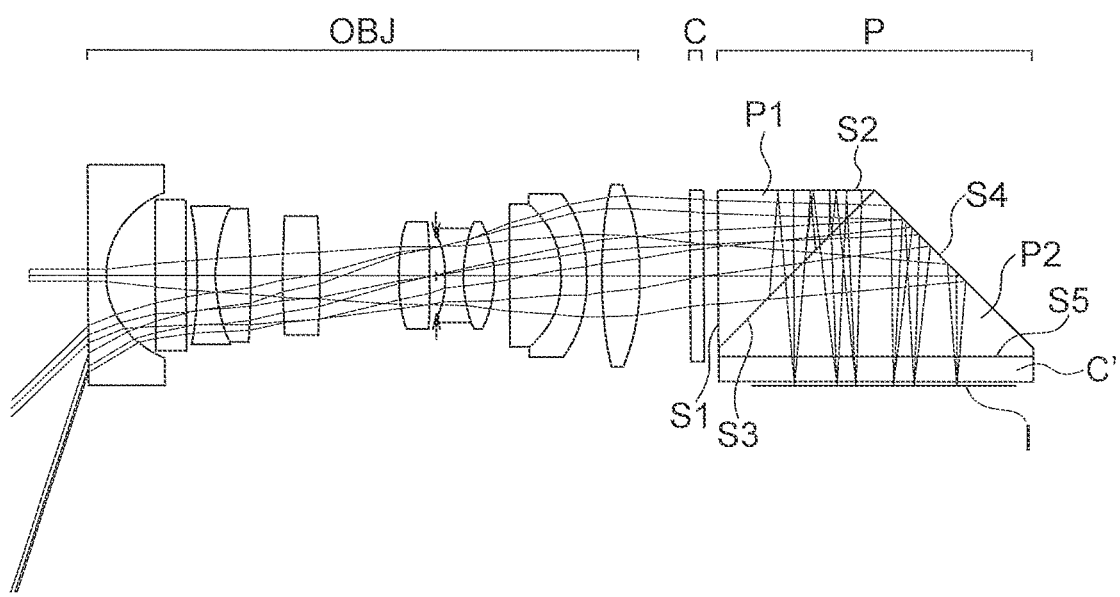
FIG. 31 is a diagram showing an arrangement of an optical system of an image pickup apparatus.

FIG. 31 is a diagram showing an arrangement of an optical system of an image pickup apparatus. The optical system includes an objective optical system OBJ, a cover glass C, and a prism P. The cover glass C is disposed between the objective optical system OBJ and the prism P. An optical filter may be disposed instead of the cover glass C. Or, the cover glass C may not be disposed.

In FIG. 31, the wide-angle optical system of the example 8 is used for the objective optical system OBJ. Moreover, in FIG. 31, the cover glass C' is disposed between the prism P and image plane I.

The prism P includes a prims P1 and a prism P2. Both the prism P1 and the prism P2 are triangular prisms. An optical-path splitting element is formed by the prism P1 and the prism P2.

The prism P1 has an optical surface S1, an optical surface S2, and an optical surface S3. The prism P2 has an optical surface S3, an optical surface S4, and an optical surface S5. The prism P1 is cemented to the prism P2. A cemented surface is formed by the prism P1 and the prism P2. The optical surface S3 is a cemented surface.

Light emerged from the objective optical system OBJ (hereinafter, referred to as 'imaging light') passes through the cover glass C, and is incident on the optical surface S1. The optical surface S1 being a transmitting surface, the imaging light is transmitted through the optical surface S1.

Next, the imaging light is incident on the optical surface S3. The optical surface S3 is disposed so that a normal of the surface is at 45 degrees with respect to an optical axis. The imaging light incident on the optical surface S3 is divided into light transmitted through the optical surface S3 (hereinafter, referred to as 'imaging light 1') and light reflected at the optical surface S3 (hereinafter, referred to as 'imaging light 2').

The imaging light 1 and the imaging light 2 travel in mutually different directions. When an optical path through which the imaging light 1 travels is a first optical path and an optical path through which the imaging light 2 travels is a second optical path, the first optical path and the second optical path are formed by the optical surface S3. As just described, the optical surface S3 functions as an optical-path splitting surface.

The first optical path is formed on an extension line of an optical path of the objective optical system OBJ. The second optical path is formed to intersect the first optical path. In FIG. 31, the second optical path is orthogonal to the first optical path.

The optical surface S3, the optical surface S4, and the optical surface S5 are located in the first optical path. The imaging light 1 transmitted through the optical surface S3 is incident on the optical surface S4. The optical surface S4 is a reflecting surface. The imaging light 1 is reflected at the optical surface S4, and is incident on the optical surface S5. The optical surface S5 is a transmitting surface. The imaging light 1 is transmitted through the optical surface S5, and is converged on an image plane I near the optical surface S5. An optical image by the imaging light 1 is formed on the image plane I.

The optical surface S3, the optical surface S2, the optical surface S3, and the optical surface S5 are located in the second optical path. The imaging light 2 reflected at the optical surface S3 is incident on the optical surface S2. The optical surface S2 is a reflecting surface. The imaging light 2 is reflected at the optical surface S2, and is incident on the optical surface S3. At the optical surface S3, the imaging light 2 is divided into light transmitted through the optical surface S3 and light reflected at the optical surface S3.

The imaging light 2 transmitted through the optical surface S3 is incident on the optical surface S5. The imaging light 2 is transmitted through the optical surface S5, and is converged on the image plane I near the optical surface S5. An optical image by the imaging light 2 is formed on the image plane I.

Since two optical paths are formed in the optical system shown in FIG. 31, two optical images are formed on the same plane. The same plane is the image plane I in the two optical paths.

In a case in which an optical-path length of the first optical path and an optical-path length of the second optical path are same, two focused optical images are formed at different positions on the same plane. The two optical images are optical images when the same object is focused. Accordingly, a position of an object plane for one optical image and a position of an object plane for the other optical image are same.

Whereas, even in a case in which the optical-path length of the first optical path and the optical-path length of the second optical path are different, two focused optical images are formed at different positions on the same plane. However, the two optical images are optical images when different objects are focused. Accordingly, a position of an object plane for one optical image and a position of an object plane for the other optical image are different.

For instance, it is assumed that the optical-path length of the first optical path is shorter than the optical-path length of the second optical path. In this case, the object plane of the optical image formed by the imaging light 1 is positioned far from the object plane of the optical image formed by the imaging light 2. As just described, the focus is adjusted for each of the two object planes in which distance from the objective optical system (hereinafter, referred to as 'object distance') differs from each other. Even when the object distance differs for two object planes, the two optical images are formed at different locations in on the same plane.

The objective optical system OBJ has a section which is focused (hereinafter, referred to as 'focusing section'). The focusing section is a section expressed by the object distance, and corresponds to a depth of field of the objective optical system OBJ. In the focusing section, wherever the object plane is positioned, a focused optical image is formed.

In a case in which the object distance differs for two object planes, there occurs a shift between a position of the focusing section for one object plane and a position of the focusing section for the other object plane. By setting appropriately the distance of the two object planes, it is possible to overlap a part of the focusing section for the one object plane and a part of the focusing section for the other object plane.

Thus, two optical images having the focusing section shifted are captured, and accordingly, two images are acquired. Moreover, only a focused area (an image area of a range corresponding to the depth of field) is extracted from the two images that were acquired, and the areas extracted are combined. By doing so, it is possible to acquire an image with a large depth of field.

For the optical surface S3, it is possible to use a half-mirror surface or a polarizing-beam splitter surface for example.

In a case in which the optical surface S3 is a half-mirror surface, a half of a quantity of imaging light is reflected at the optical surface S3 and the remaining half of the quantity of imaging light is transmitted through the optical surface S3. Accordingly, a quantity of the imaging light 2 becomes half of the quantity of the imaging light. The imaging light 2 is reflected at the optical surface S2. The imaging light 2 reflected at the optical surface S2 is transmitted through the optical surface S3. At the optical surface S3, only half of the quantity of the imaging light 2 can be transmitted.

In a case in which the optical surface S3 is a polarizing-beam splitter surface, a depolarization plate or a wavelength plate may be used instead of the cover glass C. Moreover, the optical surface S2 is not a reflecting surface but is a transmitting surface. A reflecting surface is disposed at a position away from the optical surface S2. Furthermore, a quarter-wave plate is disposed between the optical surface S2 and the reflecting surface.

P-polarized light is polarized light having an amplitude of light in a paper plane, and S-polarized light is polarized light having an amplitude in a plane orthogonal to the paper plane. When it is assumed that the P-polarized light is transmitted through the optical surface S3 and the S-polarized light is reflected at the optical surface S3, the P-polarized light corresponds to the imaging light 1 and the S-polarized light corresponds to the imaging light 2.

For instance, when the depolarization plate is used instead of the cover glass C, the imaging light passes through the depolarization plate. Consequently, in the imaging light emerged from the depolarization plate, a proportion of the P-polarized light and the S-polarized light in the imaging light becomes substantially half. The imaging light incident on the optical surface S3 is divided into the P-polarized light and the S-polarized light at the optical surface S3. Accordingly, the quantity of the imaging light 2 becomes half of the quantity of the imaging light.

The imaging light 2, when directed from the optical surface S3 toward the optical surface S2, is S-polarized light. In a case in which the optical surface S2 is a reflecting surface, the imaging light 2 is reflected toward the optical surface 3 as the S-polarized light as it has been. The imaging light 2 directed from the optical surface S2 toward the optical surface S3 being the 5-polarized light, cannot be transmitted through the optical surface S3.

Whereas, in a case in which the optical surface S2 is a transmitting surface, the imaging light 2 is reflected at the reflecting surface. The $\lambda/4$ plate is disposed between the optical surface S2 and the reflecting surface. By the imaging light 2 travelling to and from between the optical surface S2 and the reflecting surface, a direction of polarization for the imaging light 2 rotates 90 degrees. Accordingly, it is possible to convert the S-polarized light to the P-polarized light. As a result, the imaging light directed from the optical surface S2 toward the optical surface S3 becomes the P-polarized light.

The imaging light 2 converted to the P-polarized light reaches the optical surface S3. Accordingly, the imaging light 2 is not reflected at the optical surface S3. In other words, at the optical surface S3, almost whole of the amount of the imaging light 2 can be transmitted through.

Figure 32A:
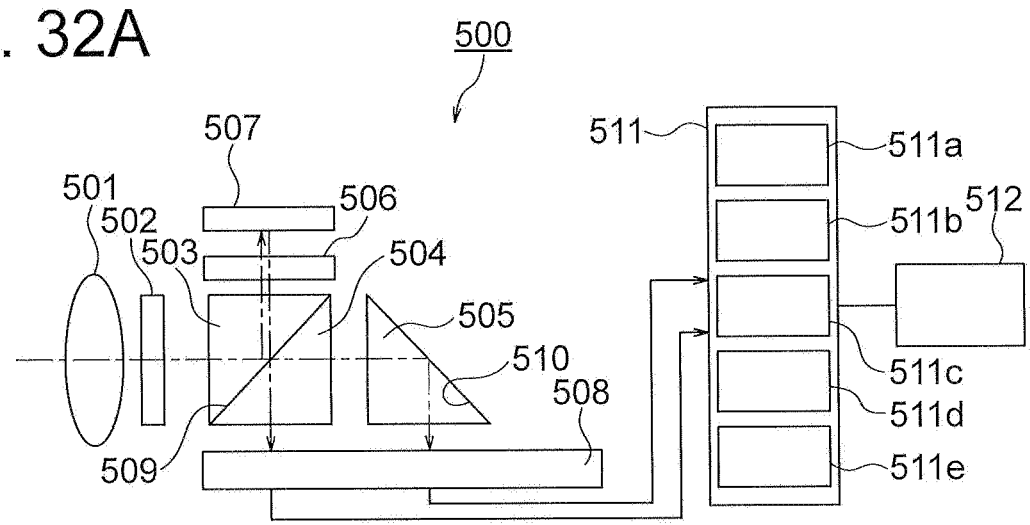
FIG. 32A is a diagram showing a schematic configuration of an image pickup apparatus.
Figure 32B:
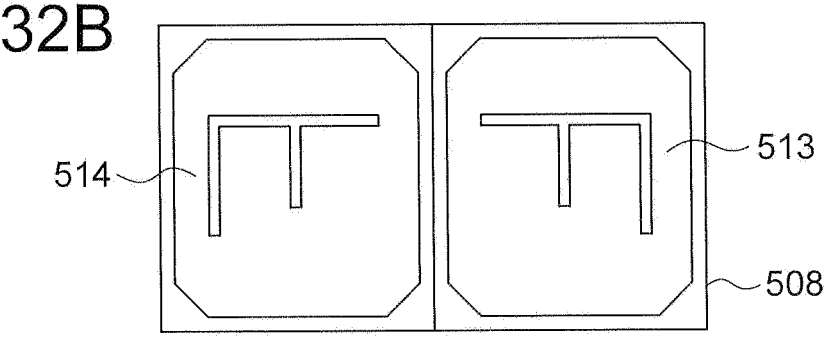
FIG. 32B is a diagram showing orientations of images on an image sensor.

FIG. 32A and FIG. 32B are diagrams showing a schematic configuration of an image pickup apparatus. FIG. 32A is a diagram showing an overall configuration, and FIG. 32B is a diagram showing an orientation of an object.

As shown in FIG. 32A, an image pickup apparatus 500 includes an objective optical system 501, a depolarization plate 502, a first prism 503, a second prism 504, a third prism 505, a wavelength plate 506, a mirror 507, an image sensor 508, an image processor 511, and an image display unit 512.

In the image pickup apparatus 500, an optical-path splitting element is formed by the first prism 503, the second prism 504, and the third prism 505.

The objective optical system 501 forms an image of an object. The depolarization plate 502 is disposed between the objective optical system 501 and the first prism 503.

The first prism 503 and the second prism 504 are cemented. A cemented surface 509 is formed by the first prism 503 and the second prism 504. Light incident on the cemented surface 509 is divided into light reflected at the cemented surface 509 and light transmitted through the cemented surface 509.

It is possible to use a polarizing-beam splitter surface for the cemented surface 509. In this case, P-polarized light is transmitted through the cemented surface 509 and S-polarized light is reflected at the cemented surface 509.

The P-polarized light transmitted through the cemented surface 509 emerges from the second prism 504. The P-polarized light is incident on the third prism 505 and reaches an optical surface 510. The optical surface 510, for instance, is a mirror surface. Accordingly, the P-polarized light is reflected at the optical surface 510.

The P-polarized light reflected at the optical surface 510 emerges from the third prism 505 and is incident on the image sensor 508. As shown in FIG. 32B, the image sensor 508 has a first area 513 and a second area 514. The P-polarized light reflected at the optical surface 510 is incident on the first area 513. Accordingly, an optical image is formed on the first area 513.

On the other hand, the S-polarized light reflected at the cemented surface 509 emerges from the first prism 503. The S-polarized light is incident on the wavelength plate 506. A quarter-wave plate is used for the wavelength plate 506. Consequently, the S-polarized light is converted to circularly-polarized light at the wavelength plate 506. As a result, the circularly-polarized light emerges from the wavelength plate 506.

The circularly-polarized light is reflected at the mirror 507 and is incident once again on the wavelength plate 506. Light emerged from the wavelength plate 506 is incident on the first prism 503 and reaches the cemented surface 509. The circularly-polarized light incident on the wavelength plate 506 is converted to P-polarized light at the wavelength plate 506. The light reached the cemented surface 509 being the P-polarized light, the light reached the cemented surface 509 is transmitted through the cemented surface 509.

The P-polarized light which is transmitted through the cemented surface 509 emerges from the second prism 504 and is incident on the image sensor 508. As mentioned above, the image sensor 508 has the first area 513 and the second area 514. The P-polarized light transmitted through the cemented surface 509 is incident on the second area 514. As a result, an optical image is formed on the second surface 514.

For instance, a rolling shutter system is adopted for the image sensor 508. In the rolling shutter system, image information for a line is read for each line one-by-one. The image sensor 508 is connected to the image processor 511. Image information which is read is input to the image processor 511.

The image processor 511 includes a second image processing section 511*b*. In the second image processing section 511*b*, it is possible to select a focused image as an image for display by using the image information that has been read for each line one-by-one. Images for each line selected by the second image processing section 511*b* are combined and displayed on the image display unit 512.

The image processor 511 will be described below. The image processor 511 is provided to a central processing unit (not shown in the diagram). The image processor 511 includes a first image processing section 511*a*, the second image processing section 511*b*, a third image processing section 511*c*, a fourth image processing section 511*d*, and a fifth image processing section 511*e*.

In the first image processing section 511*a*, an orientation of an image acquired from the first area 513 (hereinafter, referred to as 'first image') and an orientation of an image acquired from the second area 514 (hereinafter, referred to as 'second image') are corrected. In correction of the orientation of the image, the image is rotated for example.

The orientation of the first image and the orientation of the second image are determined by an orientation of the optical image formed in the first area 513 (hereinafter, referred to as 'first optical image') and an orientation of the optical image formed in the second area 514 (hereinafter, referred to as 'second optical image') respectively.

Figure 33:
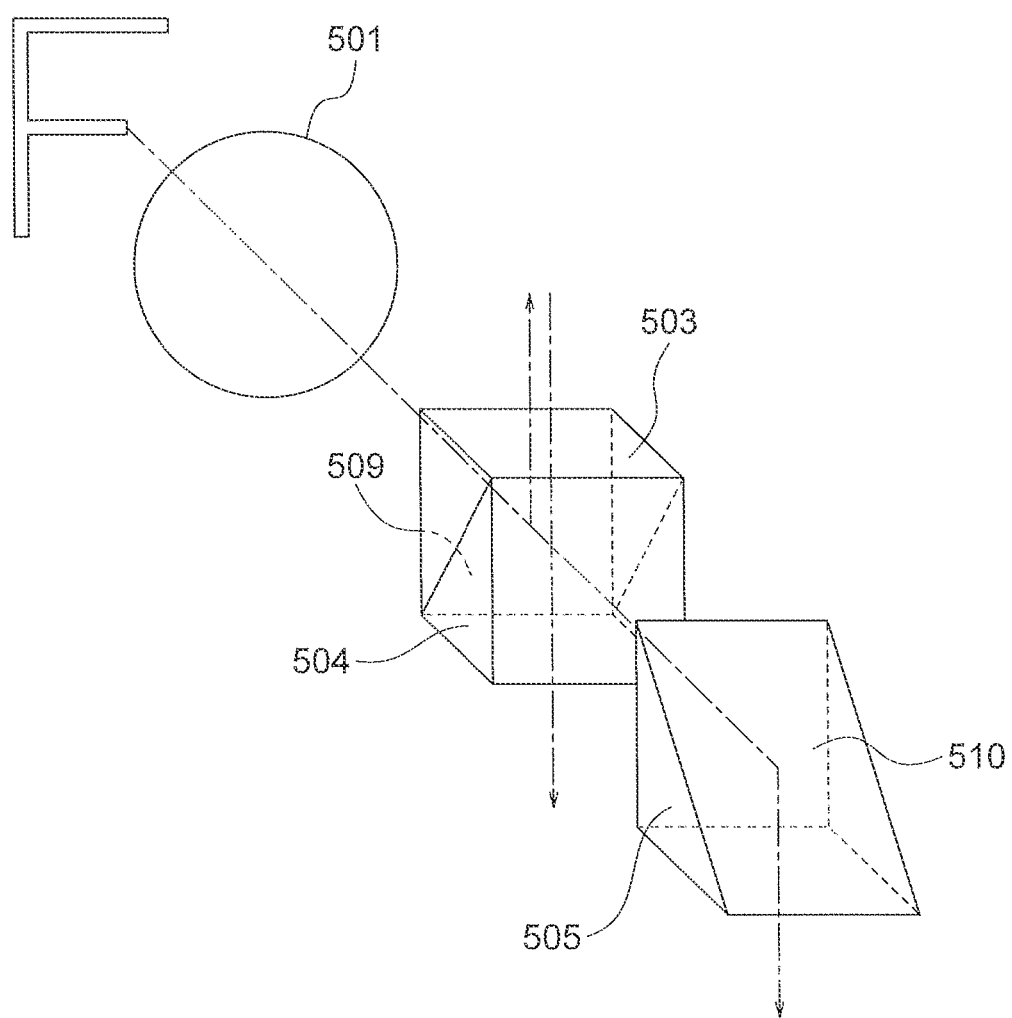
FIG. 33 is a diagram showing a positional relationship of an object, an objective optical system, and an optical-path splitting element.

FIG. 33 is a diagram showing a positional relationship of an object, an objective optical system, and an optical-path splitting element. For instance, a case of observing a character 'F' as shown in FIG. 33 will be described below. Each of the orientation of the first optical image and the orientation of the second optical image is an orientation as shown in FIG. 32B.

As shown in FIG. 32B, the first optical image and the second optical image are mirror images of each other. Furthermore, when a vertical orientation of a paper surface is an upright direction, the first optical image and the second optical image are rotated 90 degrees from the upright direction.

Therefore, in a case of displaying an image of an object on the image display unit 512, in the first image processing section 511*a*, the first image is rotated 90 degrees with a central point of the first area 513 as a center. Even regarding the second image, the second image is rotated 90 degrees with a central point of the area 514 as a center. Moreover, regarding the second image, the second image is inverted, and a mirror image is corrected.

As the processing by the first image processing section 511*a* is terminated, processing by the second image processing unit 511*b* is executed. However, according to the requirement, processing by at least one of the third image processing section 511*c*, the fourth image processing section 511*d*, and the fifth image processing section 511*e* may be executed before executing the processing by the second image processing section 511*b*.

The third image processing section 511*c* is configured so that a white balance of the first image and a white balance of the second image are adjustable. The fourth image processing section 511*d* is configured so that a center position of the first image and a center position of the second image are movable or selectable. The fifth image processing section 511*e* is configured so that a display range of the first image and a display range of the second image are adjustable. Moreover, the fifth image processing section 511*e* may be configured so that a display magnification is adjustable instead of the display range.

The second image processing section 511*b* is configured to compare the first image and the second image, and to select an image of a focused area as an image for display.

The second image processing section 511*b* has a high-pass filter, a comparator, and a switch. The high-pass filter is connected to each of the first area 513 and the second area 514. In the high-pass filter, a high component is extracted from each of the first image and the second image.

Outputs of the two high-pass filters are input to the comparator. The high components extracted in the two high-pass filters are compared in the comparator. A comparison result is input to the switch. Moreover, the first area 513 and the second area 514 are connected to the switch. Accordingly, the comparison result, a signal of the first image, and a signal of the second image are input to the switch.

In the switch, an area with many high component in the first image and an area with many high component in the second image are selected on the basis of the comparison result.

The image display unit 512 has a display area. An image selected by the second processing section 511*b* is displayed in the display area. The image display unit 512 may have display areas displaying the first image and the second image.

According to the present disclosure, it is possible to provide a wide-angle optical system in which various aberrations are corrected favorably, and an outer diameter of a lens which moves and an outer diameter of a lens located near a lens unit that moves are adequately small, and an image pickup apparatus in which the wide-angle optical system is used.

As described heretofore, the present disclosure is suitable for a wide-angle optical system in which various aberrations are corrected favorably, and an outer diameter of a lens which moves and an outer diameter of a lens located near a lens unit that moves are adequately small, and an image pickup apparatus in which the wide-angle optical system is used.

What is claimed is:

1. A wide-angle optical system having a lens component which has a plurality of optical surfaces, and in the lens component, two optical surfaces are in contact with air, and at least one optical surface is a curved surface, comprising in order from an object side:

a first lens unit having a negative refractive power;
a second lens unit having a positive refractive power; and
a third lens unit having a positive refractive power, wherein
at the time of carrying out a focal-position adjustment from a far point to a near point, the second lens unit is moved from a first position toward a second position, the first position is a position at which a distance between the first lens unit and the second lens unit becomes the minimum, and the second position is a position at which a distance between the second lens unit and the third lens unit becomes the minimum,
the third lens unit includes not less than three lens components,
not less than three lens components include a first lens component and a second lens component, and the first lens component is a lens component located nearest to an object, in the third lens unit, and the second lens component is a lens component located second from the object side in the third lens unit,
the first lens component is a single lens and the second lens component is a cemented lens, and
following conditional expression (1) is satisfied $$-0.60 < (n2C'-n2C)/r2C < -0.05 \quad (1)$$

where,
n2C denotes a refractive index for a d-line of a medium located on the object side of a cemented surface of the second lens component,
n2C' denotes a refractive index for the d-line of a medium located on an image side of the cemented surface of the second lens component, and
r2C denotes a radius of curvature of the cemented surface.

2. The wide-angle optical system according to claim 1, wherein the first lens component has a positive refractive power.

3. The wide-angle optical system according to claim 1, wherein a value of |n2C'−n2C| is not less than 0.25.

4. The wide-angle optical system according to claim 1, wherein
the third lens unit includes not less than four lens components, and has not less than two cemented surfaces for which a value of a difference in refractive index is not less than 0.25,
where,
the difference in refractive index is a difference between an object-side refractive index and an image-side refractive index,
the object-side refractive index is a refractive index for the d-line of a medium which is located on the object side of a cemented surface of the lens component, and which is adjacent to the cemented surface, and
the image-side refractive index is a refractive index for the d-line of a medium which is located on the image side of the cemented surface of the lens component, and which is adjacent to the cemented surface.

5. The wide-angle optical system according to claim 1, wherein the third lens unit includes three, four, or five lens components having a positive refractive power.

6. The wide-angle optical system according to claim 1, wherein a cemented lens located nearest to an image in the third lens unit includes in order from the object side, a positive lens and a negative lens.

7. The wide-angle optical system according to claim 1, wherein
a single lens unit is disposed nearest to an image in the third lens unit,
the single lens unit includes two single lenses or three single lenses,
a cemented lens is disposed adjacent to the single lens unit, on the object side of the single lens unit, and
the cemented lens includes in order from the object side, a positive lens and a negative lens.

8. The wide-angle optical system according to claim 1, wherein
one single lens is disposed nearest to an image in the third lens unit,
a cemented lens is disposed adjacent to the single lens, on the object side of the single lens, and
the cemented lens includes in order from the object side, a positive lens and a negative lens.

9. The wide-angle optical system according to claim 1, wherein following conditional expression (2) is satisfied:

$$0.05 < fL/R31F < 1.2 \quad (2)$$

where,
R31F denotes a radius of curvature of a surface on the object side of the first lens component, and
fL denotes a focal length of the wide angle-optical system at the first position.

10. The wide-angle optical system according to claim 1, wherein
the third lens unit includes N number of cemented surfaces $S_{Ni}$ (i=1, 2, . . . N), and
following conditional expression (3) is satisfied:

$$1.0 < fL \times \Sigma P_{SNi} < -0.05 \quad (3)$$

where,
$P_{SNi}$ denotes a refractive power of the cemented surface $S_{Ni}$, and is expressed by following expression (4):

$$P_{SNi} = (n_{SNi}' - n_{SNi})/r_{SNi} \quad (4)$$

where,
$n_{SNi}$ denotes a refractive index for the d-line of a medium located on the object side of the cemented surface $S_{Ni}$,
$n_{SNi}'$ denotes a refractive index for the d-line of a medium located on the image side of the cemented surface $S_{Ni}$,
$r_{SNi}$ denotes a radius of curvature near an optical axis of the cemented surface $S_{Ni}$, and
fL denotes a focal length of the wide-angle optical system at the first position.

11. The wide-angle optical system according to claim 1, wherein
the third lens unit includes a cemented lens which is located nearest to an image among the cemented lenses, and a lens component which is located nearest to the image,
the cemented lens which is located nearest to the image has a positive refractive power,
the lens component which is located nearest to the image is a positive single lens, and
following conditional expression (5) is satisfied:

$$-2 < (R_{3R1}+R_{3R2})/(R_{3R1}-R_{3R2}) < 2 \quad (5)$$

where,
$R_{3R1}$ denotes a radius of curvature of a surface on the object side of the positive single lens, and $R_{3R2}$ denotes a radius of curvature of a surface on the image side of the positive single lens.

12. The wide-angle optical system according to claim 1, wherein
the third lens unit includes a cemented lens which is located nearest to an image among the cemented lenses, and a lens component which is located nearest to the image,
the cemented lens which is located nearest to the image has a negative refractive power,
the lens component which is located nearest to the image is a positive single lens, and
following conditional expression (6) is satisfied:

$$-5 < ('R_{3R1} + 'R_{3R2})/('R_{3R1} - 'R_{3R2}) < 1 \qquad (6)$$

where,
$'R_{3R1}$ denotes a radius of curvature of a surface on the object side of the positive single lens, and
$'R_{3R2}$ denotes a radius of curvature of a surface on the image side of the positive single lens.

13. The wide-angle optical system according to claim 1, wherein a cemented surface located nearest to an image in the third lens unit satisfies following conditional expression (7)

$$-1.0 < fL/r_{SNr} < 0.6 \qquad (7)$$

where,
$r_{SNr}$ denotes a radius of curvature near an optical axis of the cemented surface located nearest to an image, and
fL denotes a focal length of the wide-angle optical system at the first position.

14. The wide-angle optical system according to claim 1, wherein
the third lens unit includes a plurality of positive lenses,
the plurality of positive lenses includes a first positive lens and a second positive lens,
the first positive lens, among the plurality of positive lenses, is a positive lens located nearest to the object,
the second positive lens, among the plurality of positive lenses, is a positive lens located second from the object, and
following conditional expression (8) is satisfied:

$$-70 < \nu_{31P} - \nu_{32P} < 20 \qquad (8)$$

where,
$\nu_{31P}$ denotes an Abbe number for the first positive lens, and
$\nu_{32P}$ denotes an Abbe number for the second positive lens.

15. The wide-angle optical system according to claim 1, wherein
the third lens unit includes a plurality of positive lenses,
the plurality of positive lenses includes a first positive lens, a second positive lens, and a third positive lens,
the first positive lens, among the plurality of positive lenses, is a positive lens located nearest to the object,
the second positive lens, among the plurality of positive lenses, is a positive lens located second from the object,
the third positive lens, among the plurality of positive lenses, is a positive lens located third from the object, and
following conditional expression (9) is satisfied:

$$-40 < \nu_{33P} - (\nu_{31P} + \nu_{32P})/2 < 60 \qquad (9)$$

where,
$\nu_{31P}$ denotes an Abbe number for the first positive lens,
$\nu_{32P}$ denotes an Abbe number for the second positive lens, and
$\nu_{33P}$ denotes an Abbe number for the third positive lens.

16. The wide-angle optical system according to claim 1, wherein
the third lens unit includes a plurality of negative lenses,
the plurality of negative lenses includes a first negative lens and a second negative lens,
the first negative lens, among the plurality of negative lenses, is a negative lens located nearest to the object,
the second negative lens, among the plurality of negative lenses, is a negative lens located second from the object, and
following conditional expression (10) is satisfied:

$$-30 < \nu_{31N} - \nu_{32N} < 40 \qquad (10)$$

where,
$\nu_{31N}$ denotes an Abbe number for the first negative lens, and
$\nu_{32N}$ denotes an Abbe number for the second negative lens.

17. The wide-angle optical system according to claim 1, wherein the third lens unit is fixed at a time of the focal-position adjustment.

18. The wide-angle optical system according to claim 1, wherein following conditional expression (11) is satisfied:

$$50 < (R21F + R21R)/(R21F - R21R) < 10 \qquad (11)$$

where,
R21F denotes a radius of curvature of a surface on the object side of a predetermined lens component,
R21R denotes a radius of curvature of a surface on an image side of the predetermined lens component, and
the predetermined lens component is a lens component located nearest to the object in the second lens unit.

19. The wide-angle optical system according to claim 1, wherein following conditional expression (12) is satisfied:

$$0.2 < D21/fL < 3.0 \qquad (12)$$

where,
D21 denotes a distance on an optical axis between a surface nearest to the object and a surface nearest to an image of the second lens unit, and
fL denotes a focal length of the wide-angle optical system at the first position.

20. The wide-angle optical system according to claim 1, wherein following conditional expression (13) is satisfied:

$$1.01 < \beta 2F < 1.50 \qquad (13)$$

where,
β2F denotes a magnification of the second lens unit at the first position.

21. The wide-angle optical system according to claim 1, wherein following conditional expression (14) is satisfied:

$$1.01 < \beta 2N/\beta 2F < 1.30 \qquad (14)$$

where,
β2F denotes a magnification of the second lens unit at the first position, and
β2N denotes a magnification of the second lens unit at the second position.

22. The wide-angle optical system according to claim 1, wherein following conditional expression (15) is satisfied:

$$0.10 < (1 - \beta 2F^2) \times \beta 3F^2 < 0.55 \qquad (15)$$

where,
β2F denotes a magnification of the second lens unit at the first position, and
β3F denotes a magnification of the third lens unit at the first position.

23. The wide-angle optical system according to claim 1, wherein following conditional expression (16) is satisfied:

$$0.20 < (1-\beta 2N^2) \times \beta 3N^2 < 0.65 \quad (16)$$

where,
β2N denotes a magnification of the second lens unit at the second position, and
β3N denotes a magnification of the third lens unit at the second position.

24. The wide-angle optical system according to claim 1, wherein the second lens unit includes only a positive lens.

25. The wide-angle optical system according to claim 1, wherein
the first lens unit includes only a plurality of negative single lenses, and
each of the plurality of negative single lenses has Abbe number larger than Abbe number for a positive lens nearest to the object in the third lens unit.

26. The wide-angle optical system according to claim 1, wherein following conditional expression (17) is satisfied:

$$0.20 < SD1/fL < 6.0 \quad (17)$$

where,
SD1 denotes a distance from a vertex nearest an object in the first lens unit up to a vertex nearest to the image in the first lens unit, and
fL denotes a focal length of the wide-angle optical system at the first position.

27. The wide-angle optical system according to claim 1, wherein
the first lens unit includes a fourth lens component and a fifth lens component,
the fourth lens component is a lens component located nearest to the object in the first lens unit,
the fifth lens component is a lens component located second from the object side in the first lens unit,
the fourth lens component includes a negative lens component,
the fifth lens component includes a cemented lens, and
following conditional expression (18) is satisfied:

$$1.0 < fL/R12F_a < 0.5 \quad (18)$$

where,
$R12F_a$ denotes a radius of curvature of a surface on the object side of the fifth lens component, and
fL denotes a focal length of the wide-angle optical system at the first position.

28. The wide-angle optical system according to claim 1, wherein
the first lens unit includes a fourth lens component, a fifth lens component, and a sixth lens component,
the fourth lens component is a lens component located nearest to the object in the first lens unit,
the fifth lens component is a lens component located second from the object side in the first lens unit,
the sixth lens component is a lens component located third from the object side in the first lens unit,
the fourth lens component includes a negative lens component,
the fifth lens component includes a lens component for which an absolute value of a refractive power is smaller than an absolute value of a refractive power of the fourth lens component,
the sixth lens component includes a cemented lens, and
following conditional expression (19) is satisfied:

$$1.0 < fL/R12F_b < 0.5 \quad (19)$$

where,
$R12F_b$ denotes a radius of curvature of a surface on the object side of the sixth lens component, and
fL denotes a focal length of the wide-angle optical system at the first position.

29. The wide-angle optical system according to claim 1, wherein
the first lens unit includes a fourth lens component, a fifth lens component, and a sixth lens component,
the fourth lens component is a lens component located nearest to the object in the first lens unit,
the fifth lens component is a lens component located second from the object side in the first lens unit,
the sixth lens component is a lens component located third from the object side in the first lens unit,
the fourth lens component includes a negative lens component,
the fifth lens component includes a negative lens component,
the sixth lens component includes a positive lens component, and
following conditional expression (20) is satisfied:

$$1.0 < fL/R12F_c < 0.5 \quad (20)$$

where,
$R12F_c$ denotes a radius of curvature of a surface on the object side of the fifth lens component, and
fL denotes a focal length of the wide-angle optical system at the first position.

30. The wide-angle optical system according to claim 1, wherein
the first lens unit includes a negative lens component and a positive lens component, and
following conditional expression (21) is satisfied:

$$0.4 < fL/R12R < 0.02 \quad (21)$$

where,
R12R denotes a radius of curvature of a surface on an image side of the positive lens component, and
fL denotes a focal length of the wide-angle optical system at the first position.

31. The wide-angle optical system according to claim 1, wherein
the first lens unit includes a fourth lens component and a fifth lens component,
the fourth lens component is a lens component located nearest to the object in the first lens unit,
the fifth lens component is a lens component located second from the object side in the first lens unit, and
following conditional expression (22) is satisfied:

$$1.0 < fL/fL12 < 0.4 \quad (22)$$

where,
fL12 denotes a focal length of the fifth lens component, and
fL denotes a focal length of the wide-angle optical system at the first position.

32. The wide-angle optical system according to claim 1, wherein following conditional expression (23) is satisfied:

$$100 \times |f_{fin}| < |R_{fin}| \quad (23)$$

where,
$f_{fin}$ denotes a focal length of an image-side lens component, and
$R_{fin}$ denotes a radius of curvature of a surface on an image side of the image-side lens component, and the image-side lens component, among the plurality of lens components, is a lens component located nearest to an image.

33. The wide-angle optical system according to claim 1, comprising:
an image-side lens component; and
an optical element with zero refractive power, wherein
the image-side lens component is located nearest to an image in the plurality of lens components,
the optical element is located on the image side of the image-side lens component, and
the image-side lens component and the optical element are cemented.

34. The wide-angle optical system according to claim 1, wherein following conditional expression (24) is satisfied:

$$2 \times y_{max} < fL \times \tan \omega_{max} \qquad (24)$$

where,
$y_{max}$ denotes a maximum image height,
$\omega_{max}$ denotes an angle of view corresponding to the maximum image height, and
fL denotes a focal length of the wide-angle optical system at the first position.

35. The wide-angle optical system according to claim 1, wherein following conditional expression (25) is satisfied:

$$ER2 < 4 \times fL/F_{EX} \qquad (25)$$

where,
ER2 denotes an effective radius of a surface nearest to an image of the second lens component,
$F_{EX}$ denotes an effective F-value at the first position, and
fL denotes a focal length of the wide-angle optical system at the first position.

36. An image pickup apparatus comprising:
an optical system; and
an image sensor which is disposed on an image plane, wherein
the image sensor has an image pickup surface, and converts an image formed on the image pickup surface by the optical system to an electric signal, and
the optical system is a wide-angle optical system according to claim 1.

* * * * *